United States Patent [19]

Harless

[11] Patent Number: 5,006,987
[45] Date of Patent: Apr. 9, 1991

[54] AUDIOVISUAL SYSTEM FOR SIMULATION OF AN INTERACTION BETWEEN PERSONS THROUGH OUTPUT OF STORED DRAMATIC SCENES IN RESPONSE TO USER VOCAL INPUT

[76] Inventor: William G. Harless, 4611 Glenbrook Pkwy., Bethesda, Md. 20814

[21] Appl. No.: 843,552

[22] Filed: Mar. 25, 1986

[51] Int. Cl.⁵ ............................................. G06F 15/38
[52] U.S. Cl. .............................. 364/419; 364/513.5; 434/321
[58] Field of Search .............. 364/513.5, 419; 381/43; 434/307-309, 321, 335; 358/342

[56] References Cited

U.S. PATENT DOCUMENTS

| | | | |
|---|---|---|---|
| 3,392,239 | 7/1968 | Johnson | 381/43 |
| 3,939,579 | 2/1976 | Andrews | 434/335 |
| 4,130,881 | 12/1978 | Haessler | 364/415 |
| 4,170,832 | 10/1979 | Zimmerman | |
| 4,305,131 | 12/1981 | Best | 381/43 |
| 4,393,271 | 7/1983 | Fujinami | 381/43 |
| 4,445,187 | 4/1984 | Best | 381/43 |
| 4,449,198 | 5/1984 | Kroon | 358/342 |
| 4,459,114 | 7/1984 | Barwick | 434/307 |
| 4,482,328 | 11/1984 | Ferguson | 434/321 |
| 4,571,640 | 2/1986 | Baer | 358/342 |
| 4,586,905 | 5/1986 | Groff | 434/308 |

OTHER PUBLICATIONS

Gilmore J., Popular Electronics, vol. 13, No. 5, Nov. 1960, pp. 60-61 and 130-132.
Dickson, W. Patrick et al. "A Low-Cost Multimedia Microcomputer System for Educational Research and Development," Educational Technology (Aug. 1984), pp. 20-22.
The Use of Information Technologies for Education in Science, Math and Computers, An Agenda for Research, Educational Technology Center, Cambridge, Mass. (Mar. 1984).,
Friedman, Edward A. "Machine-Mediated Instruction for Work-Force Training and Education," The Information Society (1984), vol. 2, Nos. 3/4, pp. 269-320.
Raymont, Patrick G. "Towards Fifth Generation Training Systems," Proceedings of the IFIP WG 3.4 Working Conference on The Impact of Informatics on Vocational and Continuing Educationan (May 1984).
Raymont, Patrick "Intelligent Interactive Instructional Systems," Microprocessing and Microprogramming (Dec. 1984), 14: 267-272.
Best, Robert M., "Movies That Talk Back," IEEE Transactions on Consumer Electronics, vol. CE-26, Aug. 1980.
Dickson, W. Patrick, "Experimental Software Project: Final Report," Wisconsin Center for Educational Research, University of Wisconsin, Jul. 1986.

Primary Examiner—Michael R. Fleming
Assistant Examiner—Gail O. Hayes
Attorney, Agent, or Firm—Finnegan, Henderson, Farabow, Garrett & Dunner

[57] ABSTRACT

A method and apparatus for producing an interactive video drama employing a personal computer, a voice recognition device, and a programmable videodisc player. A plurality of dramatic scenes are stored on a videodisc and displayed to the user in response to spoken commands. At certain scenes designated as decision points, the next displayed scene is selected based on a probability technique. By storing audiovisual representations of a speaking human being and by selecting scenes for display based on spoken input signals, the apparatus provides the illusion of dialog between a user and prerecorded human characters.

29 Claims, 2 Drawing Sheets

AUDIOVISUAL SYSTEM FOR SIMULATION OF AN INTERACTION BETWEEN PERSONS THROUGH OUTPUT OF STORED DRAMATIC SCENES IN RESPONSE TO USER VOCAL INPUT

BACKGROUND OF THE INVENTION

The invention relates to an interactive audiovisual system and, more particularly, to an interactive audiovisual system employing a voice recognition unit and a programmable videodisc player.

There is an increasing need in various fields of education, and particularly in professional education, to provide learning opportunities in a realistic environment without the risk of harm caused by improper student action. For example, it is extremely desirable for medical students to interact with patients at an early stage in their educational process to develop practical experience and provide a foundation to which the students' academic education can be related. Although traditional forms of medical education allow students to interact with actual patients under the supervision of a physician, in order to avoid risk to the patient the medical student is prohibited from directly making independent decisions involving treatment of the patient.

Various forms of simulation of the student-patient interaction are known in the prior art. For example, existing systems are known which employ a programmable videodisc (player) under the control of a personal computer to receive student input commands through a keyboard or touch-screen CRT input device. Although existing systems can often provide useful educational experiences for the student, it is desirable to provide a more natural means of interaction for the student so as to increase the realism and maximize the effectiveness of the educational method. It is also desirable to provide a continuous audiovisual display of stored dramatic scenes to heighten the illusion of an actual physician-patient relationship. It is further desirable to increase the realism of an interactive audiovisual system such that the outcome of the displayed audiovisual drama will be influenced by, but not completely determined by, student input to the system.

SUMMARY OF THE INVENTION

The invention achieves the aforementioned objectives by providing, in one aspect, an interactive audiovisual system comprising means for storing a plurality of prerecorded audio and video scene signals representative of a speaking human being; means for receiving voice signals and for generating interrupt signals representative of the meaning of words in said voice signals; and means for selectively displaying specific ones of said scene signals in response to said interrupt signals to provide an audiovisual representation of a human being speaking an appropriate response to said received voice signals.

In another aspect, the invention provides a method for providing an interactive drama, comprising the steps of storing a plurality of prerecorded audio and video scene signals representative of a speaking human being; receiving voice signals and generating interrupt signals representative of the meaning of words in said voice signals; and selectively displaying specific ones of said scene signals in response to said interrupt signals to provide an audiovisual representation of a human being speaking an appropriate response to said received voice signals.

DESCRIPTION OF THE PREFERRED EMBODIMENTS

Figure 1:
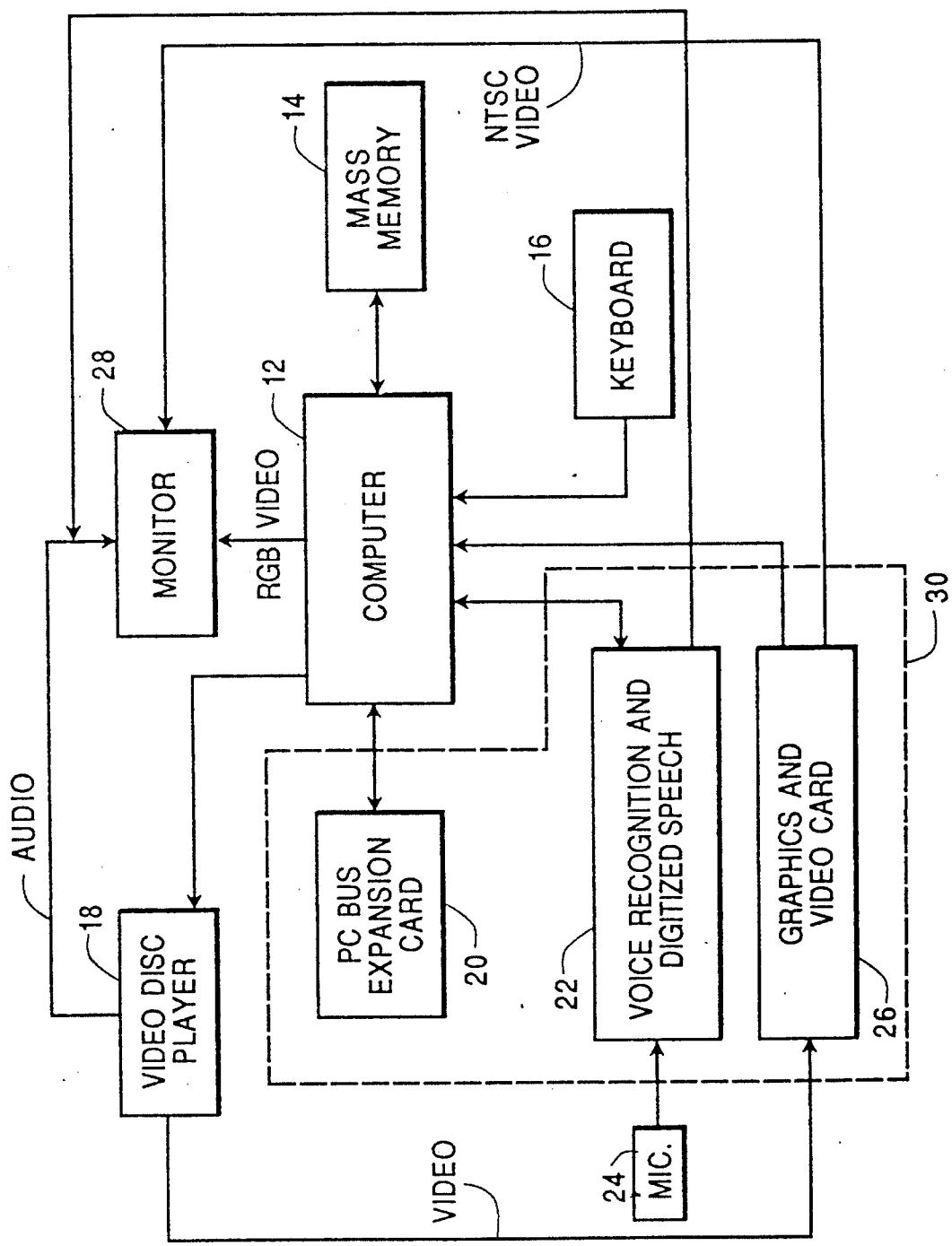
FIG. 1 is a block diagram of apparatus constituting a preferred embodiment of the invention.

Reference will now be made in detail to the present preferred embodiment of the invention, an example of which is illustrated in the accompanying drawings and in which like reference characters refer to corresponding elements.

FIG. 1 is a block diagram of a preferred embodiment of the present invention. As shown in FIG. 1, a computer system 10 includes a computer 12 having a mass memory device 14 and a keyboard 16. In the preferred embodiment, computer 12, mass memory 14, and keyboard 16 are provided by an IBM PC/XT personal computer. A videodisc player 18 is connected through a serial port and RS-232-C connector to computer 12. In the preferred embodiment, videodisc player 18 may be a Pioneer model LD-V6000 programmable videodisc player.

A PC bus expansion card 20 is connected to computer 12. Also connected to computer 12 is a voice recognition and digitized speech unit 22 which includes a microphone 24. Voice recognition and digitized speech unit 22 may be a commercially available product such as the Votan VPC 2000 speech processor card.

A graphics adaptor 26 is also connected to computer 12 and may be, for example, the VAL and Tecmar graphics adaptor combination The output of graphics adapter 26 is supplied to a monitor 28.

The specific components described above can be incorporated into system 10 and computer 12 can be programmed using well-known methods to provide the features and functions to be described hereinafter. However, in the preferred embodiment the functions of PC Bus and expansion card 20, voice recognition and digitized speech unit 22 and graphics adaptor 26 are provided in an integrated computer expansion chassis 30 which is part of an IMSATT model 2000 computer controlled videodisc system. This equipment is commercially available from the IMSATT Corporation of Falls Church, Virginia.

Videodisc player 18 is a read-only device which supplies audio and video signals to monitor 28 from a preprogrammed readonly removable disc. The disc may contain up to 54,000 video still frames or approximately 30 minutes of continuous video information. The disc also includes two tracks of audio associated with the recorded video data. Video disc player 18 may provide single frame or continuous video images to monitor 28 as commanded by computer 12 which transmits address and control commands through a serial port and RS232-C connection to videodisc player 18 to select the desired audio and video signals.

Voice recognition and digitized speech unit 22 provides several capabilities. First of all, voice signals supplied through microphone 24 are interpreted by unit 22 in conjunction with computer 12 to provide specific interrupt signals related to desired words. For example, unit 22 may be programmed to recognize up to ten sets of 75 separate voice patterns. That is, the voice signal representative of the word "begin" may be "taught" to unit 22 such that when a user speaks the word "begin" into microphone 24, unit 22 will generate a unique interrupt signal to computer 12. Each set of 75 words is known as a "vocabulary" and may be stored in computer memory 12 to be switched instantaneously.

Unit 22 also provides the capability to generate human speech by storing digital signals through computer 12 into mass memory 14 in a compressed form such that, under program control, computer 12 may retrieve the digital speech signal from unit 14 and command unit 22 to generate signals to monitor 28 which represent preprogrammed desired voice signals.

Specific connections of videodisc player 18, and unit 30 representing the functions of PC Bus and expansion card, voice recognition and digitized speech unit 22, and graphics adaptor 26 are provided in the IMSATT 2000 User Manual, Version 1.8, February 1986, commercially available from the IMSATT Corporation. Additional details of the voice recognition and digitized speech capability of unit 22 are provided in the Votan VPC 2000 Users Guide, commercially available from the Votan Corporation of Freemont, California. The disclosures contained in these manuals are hereby expressly incorporated by reference.

The invention thus includes means for storing a plurality of prerecorded audio and video scene signals representative of a speaking human being. In the preferred embodiment, such means comprises programmable videodisc player 18.

The invention also includes means for receiving voice signals and for generating interrupt signals representative of the meaning of words in the voice signals. As embodied herein, such means include microphone 24 and voice recognition and digitized speech unit 22.

The invention further includes means for selectively displaying specific ones of the scene signals in response to interrupt signals to provide an audiovisual representation of a human being speaking an appropriate response to the received voice signals. In the preferred embodiment, such means includes computer 12 and monitor 28.

Figure 2:
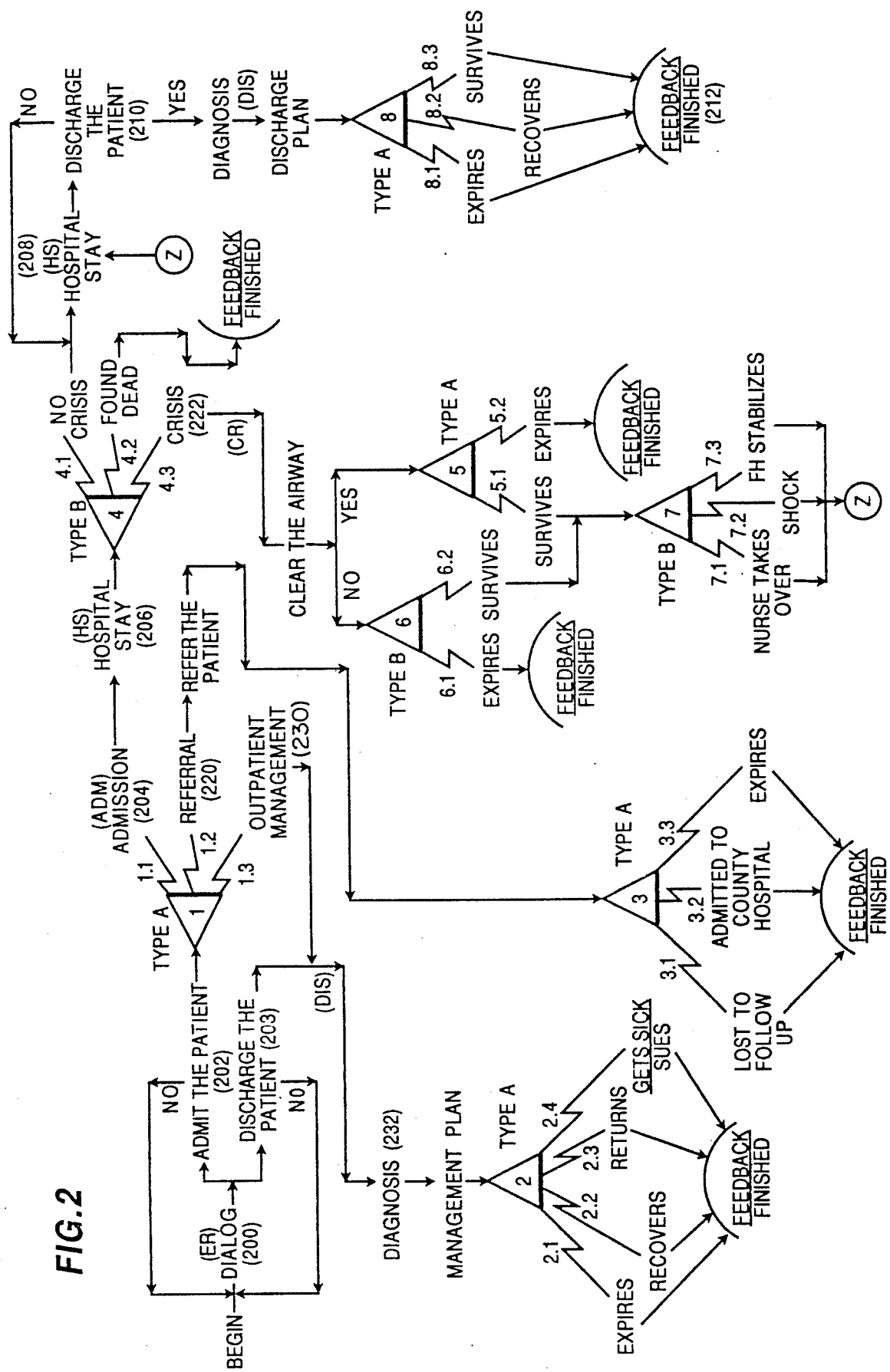
FIG. 2 is a flow diagram of an interactive drama illustrating the principles of the preferred embodiment of the invention.

Referring now to FIG. 2, there is shown a flow diagram of an interactive drama produced using the apparatus and methods of a preferred embodiment of the present invention.

The material required to implement such a video drama consists of a videodisc containing the scenes (motion and still frame) which comprise the story and the characters involved in the drama. This videodisc is the product of a process involving:
1. program planning and design,
2. scripting and content evaluation,
3. auditioning and actor selection,
4. staging and videotaping,
5. tape editing and videodisc pressing.

The resulting videodisc contains color video signals comprising some combination of the approximately 30 minutes of motion or 54,000 still frames, and two channels (approximately 30 minutes each) of audio. Each frame on the disc is addressable and the maximum search time is 3 seconds.

A computer program and related files and graphics are generated to play the disc and establish the interactivity necessary for the drama. The IMSATT development system (commercially available) is the preferred embodiment for this task. This system is described in the previously referenced IMSATT User Manual.

In order to generate the program, disc catalogs and design documentation (additional information useful for programming) must be prepared. The catalog provides the raw data for the computer program; It describes the location of each video scene on the disc by in-and-out-frame number and the spoken voice commands associated with each scene. It also describes graphic overlay and digitized speech requirements when appropriate to a scene. Appendix 1 contains the disc catalogs and design documentation required for generating the interactive drama which will be described below. Appendix 2 contains specific examples of the program which was developed using the IMSATT system and the previously mentioned catalogs and design documentation.

The interactive medical drama of FIG. 2 portrays a situation in the life of a fictitious patient named Frank Hall, who is played by a professional actor. Frank Hall is a 46-year-old man who comes to the emergency room complaining of weakness and abdominal pain following an episode of vomiting blood two days earlier. The simulated patient illustrates the medical content and sociological issues related to a variety of gastroenterology problems confounded by alcoholism.

The Frank Hall drama contains a variety of scenes recorded on a videodisc as scene signals depicting the patient's current experience in the hospital and significant past experiences (through audiovisual flashbacks) related to his present illness. Other scenes depict elements of the physical examination and relevant diagnostic tests and procedures with visuals of x-rays, endoscopic views and so forth, whenever appropriate.

The user (the instructor, in concert with students) assumes the role of the physician in this interactive drama and, through spoken inquiries and commands, interviews the simulated patient and directs the course of action. The system responds instantly to each spoken inquiry and/or command.

Before initiating the drama, the instructor trains the system to recognize 140 spoken command words consisting of medical history concepts (presenting complaint, pain, smoking habits, drinking habits, etc.) and terminology (hematocrit, urinalysis, endoscopy, etc.) to diagnose and manage a patient. A list of these spoken command words is contained in the design documentation of Appendix 1. The process for training takes approximately thirty minutes and is described in detail in the aforementioned IMSATT User Manual. The computer records the way the instructor says each spoken command word in the form of a digitized voice pattern. These patterns are stored and, subsequently, used by the computer to recognize the instructor's inquiries and commands during the presentation, as described in the aforementioned Votan Users Guide. The current Votan system restricts the number of words available at one time to 75, plus synonyms. However, memory switching of a set of vocabulary words during the drama can be accomplished in less than one second, providing virtually unlimited vocabulary.

Once the instructor has trained the system, he/she can act as the teacher, guide, facilitator and/or spokesperson for the class.

Following the start up of the computer in the conventional manner, a still frame of the character, Frank Hall, is presented on monitor 28 with a graphic over title, "The Case of Frank Hall." The system waits for the user to begin the session.

The user speaks the command "begin" into microphone 24. The drama begins with a full color action scene, including background music, of Frank Hall driving a large, battered automobile into the hospital parking lot. The scene changes to a disheveled Frank Hall at the emergency room reception desk.

Frank Hall (to the emergency room (ER) nurse): "I'm sick; I need to see a doctor."

A dialog between Frank and the nurse takes place for approximately 30 seconds; then the action on monitor 28 freezes. This freeze in the action is called a "wait state." It serves as a subtle prompt to the user to take charge and do something.

There are no menus or cues in the interactive drama. The user must rely on personal resources and initiative to determine solutions and courses of action. Meanwhile, the system loads the vocabulary patterns for the dialog section (block 200, FIG. 2) and remains in wait state until a verbal command is given.

To see the patient, the instructor may say, "Mr. Hall," which brings the patient, full face to the screen where he sits looking directly at the class, waiting to respond to questions. Alternatively, the instructor may say, "start the workup," which elicits another action scene of Frank Hall in an examining room having his vital signs taken by the emergency room (ER) nurse. This scene changes to one with the patient in an examining gown, again looking directly at the group and waiting to answer questions. These, too, are wait states where the instructor and students must determine the course of action. In this example they decide to interview the patient.

User: "What's your problem?"

Frank Hall: (looking directly out at the student) "I'm sick. Ive been throwing up blood . . . I'm afraid I might have cancer . . . " (Wait state.)

User: "When did it begin?"

Frank Hall: "Well, it started last week. I was in this restaurant . . . "

The scene becomes a flashback to the restaurant showing Frank Hall talking to the waitress and beginning to feel sick. The patient continues to describe the situation as the flashback scene changes to his bathroom and an episode of vomiting blood; it concludes back in the examining room in a wait state. This user-controlled dialog with the simulated patient can continue through a complete social and medical history or the user may digress to request test procedures or other information.

User "Vital signs."

Values for Frank Hall's temperature, blood pressure, pulse and respiration appear as text over a scene of the nurse taking his vital signs.

To continue talking with the patient, the user simply says the patient's name and he reappears on the screen.

User: "Mr. Hall."

(Frank Hall reappears).

Frank Hall: "Yes."

User: "You mentioned your wife."

Frank Hall: "Rita's my wife . . . er, she was my wife. We're separated now . . . She's filing for divorce. We've been married for 15 years."

The interactive drama allows the class to probe deeper into history concepts to elicit more information from the patient. The user may do this by asking open-ended questions such as: "Is there more?", "Tell me more", "Is that all?" Probing questions concerning Frank Hall's marriage reveal, through flashback, a wife beating incident and other pertinent information about the patient and his relationships.

The patient will continue to respond until he has exhausted his responses about that concept at which time he will say that there is nothing more to say. Further probing by the user about that subject will cause the system to randomly select a generic scene of Frank Hall indicating that no further information is available. This generic response may indicate passiveness, impatience, or other human emotions. This capability provides a realistic uncertainty concerning the character's emotional response to probing that creates dramatic tension and piques interest. The user may also change the subject and later return to it to get additional information. For example, the user may ask about concept A (e.g., smoking habits) and get a response (#A1); then ask about concept B (e.g., drinking habits) and get a response (#B1); then ask for more information about smoking (concept A). The drama, having recorded the display of scene #A1, will not repeat scene #A1 but will select #A2 (or An), the next of the dramatic scenes associated with the spoken command "smoking". All such scenes associated with a specific concept are contiguously recorded on the videodisc so that they can be displayed in a seamless manner, that is, without a blackout which would otherwise occur as a result of the videodisc player initiating a search.

Thus, probing questions never elicit a redundant response from the patient. This feature enhances the believability of the drama and precludes rigid contrivance which has characterized computerized simulations in the past.

This interactivity using natural language (spoken English) voice commands occurs in the dialog section of the drama (block 200). This important section allows the user the capability to engage in direct dialog with the "talking head" of the simulated patient; to view flashbacks at specific times during that dialog, which reveal incidents and aspects of the patient's life that are relevant to the problem at hand; to probe about any concept in the simulated patient's memory without viewing the same scene twice; and, to view immediate textual responses to requests for information about physical examination and diagnostic tests. The interactive drama provides the very powerful illusion of natural conversation between internal character(s) in the video drama and the external character (i.e., the user). The user may act as the problem solver in the drama and, in that role, converse with the internal character(s) and spontaneously intervene in the drama to influence the outcome(s) of the situation being portrayed.

The dialog with the patient will continue until the user either: (1) admits the patient to the hospital (block 202); or (2) dismisses the patient from the hospital (block 203). Should the user speak the command "admit the patient" (block 202), a decision point in the drama is reached.

A decision point is a scene which can lead to any of a plurality of possible outcome scenes. The specific outcome scene which is displayed following a decision point scene is determined, in the present invention, by a probability method. Each outcome scene has associated with it a predetermined probability factor. A random number is generated and compared to the probability factors for each outcome scene. The outcome scene whose probability factor is matched by the random number is the scene which will next be presented to monitor 28.

The probability factors are not unchangeable. Rather, they can be altered by influence factors, that is, specific voice commands entered by the user (all of which are recorded by the system). For example, if the user speaks the command "abdominal exam" this increases the probability that decision point 1 will be followed by outcome 1.1 Admission.

The system generates a random number which is compared to the probability ranges associated with decision point 1 (FIG. 2). Outcomes of decision points are probabilistic rather than deterministic and, therefore, more accurately reflect the real situation. At each decision point in the model there is a probability-based decision table which contains the consensus opinion of experts concerning the level of likelihood of each possible outcome for that point of decision. An outcome may be determined to be unlikely, likely, or very likely depending upon the combination of events which have occurred at the point of decision. For example, if the user has performed a complete abdominal examination for Frank Hall in the examination room, the likelihood of admission will increase. If he has taken a complete medical history as well as an adequate physical examination the likelihood of admission will further increase, etc. Each of the levels of likelihood (very likely, likely and unlikely) has an associated numerical range which is used in comparison with a computer generated random number to determine the outcome in question. The precise numerical range for any likelihood level is dynamically determined during the course of the drama, in a manner to be more completely described. A detailed description of the probability method used in the interactive drama is attached as Appendix 3.

If the user speaks the command "admit the patient," and if the outcome of decision point 1 is Admission (block 204), then vocabularies are switched at block 204 and a dialog ensues between the user and a prerecorded voice from monitor 28. The user is interrogated by the monitor concerning perceived differential diagnoses and desired diagnostic tests for the patient. The system confirms each of the user's verbal entries with onscreen text in the following manner.

User: "Admit the patient."
Monitor voice: "Please state your differential diagnoses, one at a time."
User: "Hemorrhagic gastritis."
Monitor voice: "Is there another?"
User: "Mallory-Weiss Syndrome."
Monitor voice: "Another?"
User: "Cancer."
Monitor voice: "Is there more?"
User: "That's all."

The monitor voice then asks the user to provide, in the same manner, a plan for diagnostic workup and for immediate management.

The system schedules the diagnostic procedures ordered by the user. The system will schedule only one invasive test (liver biopsy, endoscopy, etc.) per day, and no more than three noninvasive tests per day. The results for a test will not be provided until an appropriate amount of time has passed since that test was ordered.

The hospital stay (HS) scenes (Appendix 1) will begin to play sequentially. The instructor and students may simply observe these scenes, watching the patient as he goes through each day, or stop the action by appropriate voice commands to revise the diagnostic workup and/or therapeutic plan. The new requests will be noted and the results of these tests will be available in graphics text form upon command after an appropriate amount of time has passed. The flow of hospital stay scenes will resume when the user commands "continue".

At any time during any scene, the user may use the command word "thoughts" to hear what the patient is thinking. The purpose of this feature is to remind students to be aware of the stresses that patients are coping with, which more often than not are never verbalized and thus remain unknown to the physician. This raises the students' consciousness concerning the patient's mental/emotional state and broaden their perspective of the patient's clinical experience.

"Thoughts" are considered to be remembrances, ideas, and/or concerns of the patient which are not elicited by direct inquiry during the course of the interaction. These thoughts may be auditory (inner voices) or visual (images). Thoughts that are auditory are recorded and stored as scene signals in the form of digital audio in an addressable file on the mass storage device 14 and, when retrieved, played from monitor 28 as human speech signals. Visual thoughts are stored as addressable images, i.e. scene signals on the videodisc. Thoughts that are relative to a playing scene are flagged as such and will be presented if the user speaks the command "thoughts" when that scene is playing. If thoughts are commanded and there are no "thoughts" specifically related to the scene being played, a visual thought is randomly selected from the videodisc or an auditory thought from the mass storage 14 and those scene signals are presented to monitor 28.

Also, the system keeps track of those flashbacks associated with scenes in the dialog section which were not previously presented and assigns such scenes to the random thoughts video database.

Following two days of simulated time in the hospital, decision point 4 (block 207) is reached, and a decision is made by the system through the probability method as to whether there will be a crisis. That is, a random number is generated and compared to the outcome possibilities of decision point 4 of FIG. 2. Outcome 4.1 allows for no crisis to occur and the hospital stay continues (block 208) until the user decides to discharge the patient.

A life threatening crisis (outcome 4.3) occurs if the random number generated for that decision point is in the range associated with the crisis outcome, and a scene is displayed in which Frank Hall vomits blood in the early morning hours while the user is looking on. Tension is created by the hysteria of the roommate. Meanwhile the system loads a vocabulary which allows the user to intervene (or choose not to intervene). This is block 222 of FIG. 2. Should the user not intervene, decision point 6 is reached and Frank Hall either expires (outcome 6.1) or survives (outcome 6.2). If he expires, then the drama ends and feedback is available to the user. If he survives, the aftermath of the crisis occurs with scenes displayed of the nurse doing generic nursing while the user speaks commands to request management procedures and diagnostic tests which are appropriate for the situation.

Decision point 7 comes into play by the passage of time to determine if Frank Hall will stabilize or not. Outcome 7.1 shows the nurse taking over due to perceived inadequacies of the user/physician. Outcome 7.2 shows Frank Hall going into shock following his loss of blood. Outcome 7.3 shows Frank Hall stabilizing. All of these outcomes of decision point 7 lead back to the hospital stay section, which is shown as 208 on FIG. 2.

Should the user intervene at block 222 during the crisis, decision point 5 comes into play to determine if Frank Hall survives or expires. Outcome 5.2 shows Frank Hall expiring, leading to the feedback for the user and the end of the drama. Outcome 5.1 shows Frank Hall surviving and leading into the previously described decision point 7.

The capability of the system to make dynamic unpredictable decisions about certain situations provides a life-like mystery to the drama and offers the opportunity for discovery learning to occur in the classroom. Even the instructor does not know the direction the drama will take nor the outcome of any event.

Ultimately, if Frank Hall survives the crisis, the command word "discharge the patient" will stop the process at block 210 and the system will switch vocabularies, display a freeze frame, and interrogate the user concerning final diagnoses and discharge plan.

Having obtained the discharge plan by spoken commands from the user, the system determines the outcome for the patient by generating a random number and comparing it to the probability values associated with decision point 8. Outcome 8.1 will display a scene where Frank Hall dies. Outcome 8.2 shows a recovery and ultimate positive outcome for Frank Hall. Outcome 8.3 shows Frank Hall as a revolving door patient; that is, a patient who returns to the hospital with essentially the same health problems over and over again.

Each of these outcomes is followed by the feedback section. When the command "feedback" is spoken by the user, performance feedback is provided. The user is scored based on the amount of critical information obtained from Frank Hall, the appropriateness of diagnostic tests and management ordered and hospital cost and medical cost imposed on the patient. These and other feedback parameters are available from a record which is maintained by the system of each scene which has been played during the drama. Feedback is block 212 in FIG. 2.

Referring back to decision point 1 of FIG. 2, outcome 1.2 is a referral where a determination is made that the patient cannot be admitted due to lack of money and/or insurance. The user is apprised of this through a monitor voice at block 220 in FIG. 2.

Referral also provides a freeze frame wait state for the user to decide whether or not he or she will accept referral as an alternative to admission, or whether the user will once again speak the command "admit the patient" to request admission. Acceptance of the referral alternative by the user initiates a decision at decision point 3 to determine the outcome for the patient following referral. Outcome 3.1 provides the user with information that the patient was lost to follow-up. Outcome 3.2 allows the patient to be admitted to County Hospital, which accommodates indigent patients. Outcome 3.3 provides information back to the user that Frank Hall expired. Each of these outcomes is followed by the feedback section, and the drama ends.

Referring back to decision point 1, outcome 1.3 provides a monitor voice informing the user that admission is not allowed and suggesting Frank Hall be treated as an outpatient. Acceptance of this alternative causes the system to switch vocabularies in order to interrogate the user concerning his or her diagnosis and management plan for the patient on an outpatient basis. This is block 232 in FIG. 2.

Following the submission of the final diagnosis and management plan by the user, the system determines the outcome for Frank Hall utilizing a probability method at decision point 2. Outcome 2.1 informs the user that Frank Hall expired. Outcome 2.2 informs the user that Frank Hall recovered and became gainfully employed. Outcome 2.3 shows Frank Hall as a revolving door patient in the hospital. Outcome 2.4 informs the user that Frank Hall went off, got sick, and decided to litigate for malpractice. Each of these outcomes takes the user to the feedback section (block 212).

The interactive drama ends following the outcome scene. At this point the instructor may request feedback from the system, which is presented in the form of charts and graphs describing the group's performance with the patient. The feedback parameters include:
 1. correctness of final diagnoses;
 2. correctness of discharge plan;
 3. percentage of critical information obtained during interaction with the case (according to expert committee), with breakdown;
 4. danger/discomfort index for tests and procedures ordered, with breakdown;
 5. costs incurred by the patient based on procedures ordered and length of hospital stay;
 6. appropriateness and effectiveness of crisis intervention.

These feedback features are implemented by the continuous storing of scene signals which were displayed to the user in response to the user's uncued commands throughout the drama.

Specific features of the invention will now be described in greater detail.

There are eight internal decision points in the drama just described each having multiple associated outcomes. For every decision point there is an associated probability table which contains the influence factors that determine the liklihood levels (likely, unlikely, very likely) for each of the outcomes. These probability tables are included in Appendix 2.

Each decision point scene has multiple associated outcome scenes, one of which is selected by the computer by means of a probability procedure. Each decision point scene is identified and stored by its specific address on the videodisc. The associated outcome scenes are also identified and stored by disc address.

When a decision point is reached during the course of a user interaction, the probability procedure is initiated in the following manner:

The record of scenes displayed and spoken commands is consulted to determine which influence factors have been entered. As an example, reference may be made to decision point 7 of FIG. 2. That is, the patient Frank Hall has survived a crisis, but still faces uncertainty over his ultimate fate. A scene is displayed of the patient lying in bed with a nurse attempting to stabilize his condition. The possible outcome scenes from decision point 7 are:
 7.1 The nurse takes over and orders the proper procedure (i.e., start appropriate medication)
 7.2 Frank Hall goes into shock and dies.
 7.3 Frank Hall stabilizes.

The probabilities of these possible outcomes are influenced by the type of medical procedures which the user has previously ordered by spoken commands. This is shown in Decision Point Table 7 of Appendix 2 which lists the likelihood levels (VL-very likely, UL-unlikely, L-likely) of each outcome for each combination influence factors. The influence factors for decision point 7 are: intravenous (IV) medication ordered, vital signs checked, and transfusion ordered.

It can be seen at influence factor combination address 4 that if no IV has been ordered, if vital signs have not been checked, and if a transfusion has been ordered, it is likely that the nurse will take over, unlikely that the patient will die, and very likely that he will survive. These estimates are entered into the system by experts during development and may be changed by the instructor prior to using the system.

When decision point 7 is reached during the interactive drama, the system converts the L, UL, VL operator-entered likelihood levels to probability ranges $V_1$, $V_2$, $V_3$ equal to 33-66, 0-32, 67-99 respectively. Next, a random number is generated within the range of each V value, for example $V_1=48$, $V_2=5$, and $V_3=93$. Next, the system computes probability ratios for each V value. That is, the probabilities are normalized as shown below and described in Appendix 3.

$$O_1 = (L) = 48/146 = .33 \times 100 = 33$$

$$O_2 = (UL) = 5/146 = .03 \times 100 = 3$$

$$O_3 = (VL) = 93/146 = .64 \times 100 = 64$$

P' ranges for each outcome are then established:

For $O_1$, Prob. range $(P'_1) = 0 - 32$

For $O_2$, Prob. range $(P'_2) = 33 - 35$

For $O_3$, Prob. range $(P'_3) = 36 - 99$

A random number between 0 and 99 is then generated and compared to the P' probability ranges to determine which associated outcome scene $O_c$ is chosen. The disc address for the selected outcome scene $P'_1$, $P'_2$ and $P'_n$ is determined from scene attribute information (generated from disc catalogs and stored in the system) and the selected outcome scene is displayed on the monitor.

Of the dramatic scenes which are stored on the videodisc for a selective display, certain types are of particular interest, as noted below:

Type 1—A scene for which a specific relevant "thoughts" scene is associated. For example, a scene depicting an uncomfortable diagnostic procedure is a type one scene which has associated with it a "thoughts" scene (audio only) expressing pain.

Type 2—A scene for which there is no specifically associated "thoughts" scene. An example of a type two scene is Frank Hall strolling through the hospital gift shop.

Type 3—A "thoughts" scene which is directly associated with a type one scene. An example of a type three scene is the scene expressing pain, noted above.

Type 4—A "thoughts" scene which is not directly related to any type one scene, but which may be displayed in association with a type two scene. Examples of type four scenes are scenes expressing boredom, flashbacks to a previous portion of Frank Hall's life, and a scene expressing concern with the total cost of the hospital stay.

Type 5—A scene of a dialog relating to a specific question or concept. Examples of type five scenes are those in which Frank Hall relates information concerning his marriage. There may be several type five scenes associated with each concept. For example, repeated questions to the character inquiring about his marriage will result in sequential display of a plurality of type five scenes relating different aspects of the character's marriage. All type 5 scenes associated with a specific concept are arranged contiguously on the videodisc to eliminate the need for a videodisc player 18 search which would cause a brief blackout of monitor 28.

Type 6—A generic dialog scene stating that there is no additional information which the character can supply in response to the particular concept. For example, when all of the type five scenes containing information relating to the character's marriage have been displayed, an additional inquiry into marriage will result in the display of a type six scene in which the character states, "I can't tell you any more about that" or "That's all there is."

The invention thus includes means for designating scene signals as type one, type two, type three or type four scene signals and for associating each of the type three scene signals with one of the type one scene signals and for associating each of the type four scene signals with all of the type two scene signals. In the preferred embodiment, such means includes computer 12 programmed in the manner specified.

The invention further includes logic means for selectively presenting specific ones of the scene signals to display means in response to interrupt voice signals, for responding to the interrupt signals during presentation of the type one scene signals to initiate presentation of one of the associated type three scene signals and for responding to the interrupt signals during presentation of the type two scene signals to initiate presentation of one of the type four scene signals. As embodied herein, such logic means comprises computer 12 programmed in the manner specified.

It will be apparent to those skilled in the art that modifications and variations can be made in the interactive video drama apparatus and methods of this invention. The invention and its broader aspects is not limited to the specific details, representative methods and apparatus, and illustrative example shown and described. Departure may be made from such details without departing from the spirit or the scope of the general inventive concept.

UNITED STATES PATENT APPLICATION

OF

WILLIAM G. HARLESS

FOR

INTERACTIVE AUDIOVISUAL METHOD AND APPARATUS

APPENDIX I

Revised 1/6/86

THE CASE OF FRANK HALL -- CLASSROOM VERSION o The command words for Frank Hall 2 are divided into seven (7) vocabulary subsets: 1) History (Hx): 2) Physical Exam (Px); 3) Diagnostic Tests (DxT); 4) Diagnoses (Dx); 5) Management (Mx); 6) Crisis (CR); and 7) System (Sys).

o Each command word will have a response that is in context of the current section of the case. There are five (5) sections: I) Exam Room (ER); II) Admission (ADM); III) Hospital Stay (HS); IV) Crisis (CR) and V) Discharge (DIS). A pointer file is defined for each section.

o Each case section (except CR) will require changing vocabulary subsets at various times, depending on the user request at that time. The potential vocabulary subsets for each section are:

I.   ER:   Hx, Px, DxT, Mx
   II.  ADM:  Dx, DxT, Mx
   III. HS:   DxT, Mx, Px
   IV.  CR:   fixed
   V.   DIS:  Dx, Mx o System command words are resident (30 commands).

Intelligent responses will depend on: 1) recognition by Votan of the pattern of the command ; and 2) the appropriate section Pointer File being loaded to process the command.

The following is a list of commands and conditions which cause _pattern_ files of vocabulary subsets and _pointer_ files of the various sections to be loaded:

| Command/Condition | Action |
|---|---|
| "BEGIN" | Loads ER Pointer file |
| "ADMIT THE PATIENT" | Loads ADM Pointer file |
| Entry into hospital scene (following mgt. plan) | Loads HS Pointer file |
| Probability-random number match | Loads CR Pointer file |
| "DISCHARGE THE PATIENT" | Loads DIS Pointer file |
| "Schedule" | Loads DxT Vocab Subset |
| "Talk" | Loads ER Vocab Subset |
| "Examine" | Loads Px Vocab Subset |
| "Manage" | Loads Mx Vocab Subset |

Revised: 1/6/86

I. Examination Room (ER) Section o  Includes beginning scenes of car in parking lot and reception desk in emergency room.

o   The following vocabulary subsets are relevant and must be available during
    the ER section:

1) Hx
    2) Px
    3) DxT
    4) Mx o   Mainly a history taking (Hx) section through dialog with talking head of
    Frank Hall.

o   Probing within concepts is allowed. There should be no repetition of any
    talking head scene. If the scenes for any concept are exhausted, a scene
    from Probe (x) group should be randomly selected.

o   Also available are Px, DxT and Mx vocabulary subsets. User may request
    information from any of these areas by using the appropriate system command
    word (i.e., "examine," "schedule," "manage").

o   If user admits the patient, the program branches to Admission (ADM)
    Section.

o   Frank Hall may be discharged from the ER. Should the user decide to
    "discharge the patient" from ER, a branch is made to Discharge (DIS)
    Section.

| I. HISTORY VOCABULARY | | IN | OUT | GRAPHICS | AUDIO | OTHER |
|---|---|---|---|---|---|---|
| 1. | Start the workup | 04236 | 04787 | | | |
| 2. | Main complaint | 04790 | 05335 | | | |
| | a) | 05336 | 05639 | | | |
| | b) | 05640 | 05804 | | | |
| 3. | Onset of symptoms | 05806 | 07976 | | | |
| | a) | 07977 | 08285 | | | |
| | b) | 08286 | 08758 | | | |
| | c) | 08759 | 08843 | | | |

I. HISTORY VOCABULARY (CONT'D)

| | IN | OUT |
|---|---|---|
| 4. Marriage | 08844 | 09497 |
| a) | 09498 | 09984 |
| b) | 09985 | 12170 |
| c) | 12171 | 12257 |
| 5. Sally | 26992 | 27186 |
| a) | 27187 | 27350 |
| 6. Employment | 12258 | 12680 |
| a) | 12681 | 13529 |
| b) | 13530 | 14153 |
| c) | 14154 | 14230 |
| 7. Education | ????? | ????? |
| 8. Pain | 14231 | 14534 |
| a) | 14535 | 14971 |
| b) | 14972 | 15060 |
| c) | 15061 | 15194 |
| 9. Family history | 15195 | 15716 |
| a) | 15717 | 16331 |
| b) | 16332 | 16771 |
| c) | 16772 | 16876 |
| 10. Previous illnesses | 16877 | 17254 |
| a) | 17255 | 17476 |
| b) | 17477 | 17580 |
| 11. Medications | 17581 | 18070 |
| a) | 18071 | 18258 |
| b) | 18259 | 18433 |
| 12. Coughing | 18434 | 18921 |
| a) | 18922 | 19169 |
| b) | 19170 | 19318 |
| 13. Smoking | 19319 | 20002 |
| a) | 20003 | 20302 |
| b) | 20303 | 20424 |

I. HISTORY VOCABULARY (CONT'D)    IN    OUT    GRAPHICS    AUDIO    OTHER

| I. HISTORY VOCABULARY (CONT'D) | IN | OUT | GRAPHICS | AUDIO | OTHER |
|---|---|---|---|---|---|
| 14. Indigestion | 20425 | 20780 | | | |
| a) | 20781 | 21290 | | | |
| b) | 21291 | 21973 | | | |
| c) | 21974 | 22419 | | | |
| d) | 22420 | 22546 | | | |
| 15. Tiredness | 22547 | 23035 | | | |
| a) | 23036 | 23295 | | | |
| b) | 23296 | 23444 | | | |
| 16. Numbness/Tingling | 24689 | 24985 | | | |
| a) | 24986 | 25394 | | | |
| b) | 25395 | 25760 | | | |
| c) | 25761 | 25843 | | | |
| 17. Activities | 25844 | 26086 | | | |
| a) | 26087 | 26133 | | | |
| 18. Stools | 26134 | 26329 | | | |
| a) | 26330 | 26701 | | | |
| b) | 26702 | 26762 | | | |
| 19. Liver | 26763 | 26881 | | | |
| a) | 26882 | 26991 | | | |
| 20. Depression | 27351 | 27634 | | | |
| a) | 27635 | 27983 | | | |
| b) | 27984 | 28458 | | | |
| c) | 28459 | 28502 | | | |
| 21. Alcohol | 28503 | 28754 | | | |
| a) | 28755 | 29111 | | | |
| b) | 29112 | 29437 | | | |
| c) | 29438 | 29869 | | | |
| d) | 29870 | 30001 | | | |
| 22. Eating habits | 30002 | 30461 | | | |
| a) | 30462 | 30697 | | | |
| b) | 30698 | 30829 | | | |

I. HISTORY VOCABULARY (CONT'D)

| | | IN | OUT | GRAPHICS | AUDIO | OTHER |
|---|---|---|---|---|---|---|
| 23. | Dizzy/Faint | 30830 | 31339 | | | |
| | a) | 31340 | 31549 | | | |
| | b) | 31550 | 31638 | | | |
| 24. | Childhood diseases | 23445 | 23985 | | | |
| | a) | 23986 | 24450 | | | |
| | b) | 24451 | 24638 | | | |
| | c) | 24639 | 24688 | | | |
| 25. | How are you feeling | ????? | ????? | | | |
| 26. | Mr. Hall | 32157 | 32250 | | | |
| | a) | 31639 | 31688 | | | |
| 27. | Probe (X), where X = 1) | 33418 | 33532 | | | Sincere |
| | 2) | 33533 | 33644 | | | Sincere |
| | 3) | 33056 | 33135 | | | Sincere |
| | 4) | 33910 | 34039 | | | Sincere |
| | 5) | 32700 | 32789 | | | Quick |
| | 6) | 32790 | 32888 | | | Quick |
| | 7) | 34105 | 34167 | | | Quick |
| | 8) | 35104 | 35204 | | | Quick |
| | 9) | 34704 | 34790 | | | Angry |
| | 10) | 34791 | 34912 | | | Angry |
| | 11) | 34913 | 35127 | | | Angry |
| | 12) | 32888 | 33009 | | | Long |
| | 13) | 33135 | 33247 | | | Long |
| | 14) | 33248 | 33417 | | | Long |
| 28. | (I don't understand) 1) | 31993 | 32157 | | | Serious |
| | (No match) 2) | 31993 | 32065 | | | Serious |
| | 3) | 32065 | 32157 | | | Serious |
| 29. | (I don't know) 1) | 31689 | 31769 | | | Sincere |
| | (Ambivalent) 2) | 31770 | 31872 | | | Sincere |
| | 3) | 31872 | 31993 | | | Concern |

I. HISTORY VOCABULARY (CONT'D)

| | | | IN | OUT | GRAPHICS | AUDIO | OTHER |
|---|---|---|---|---|---|---|---|
| | | 4) | 32250 | 32333 | | | Smiling |
| | | 5) | 33646 | 33685 | | | Depress |
| | | 6) | 34442 | 34510 | | | Brash |
| | | 7) | 34540 | 34671 | | | Angry |
| 30. | (Yes/No) | 1) | 33771 | 33875 | | | Yes |
| | | 2) | 34263 | 34353 | | | No |
| 31. | (Non-Verbal) | 1) | 32333 | 32543 | | | Surpris |
| | | 2) | 32543 | 32674 | | | Disapp. |

II. PHYSICAL EXAM VOCABULARY

| | | | IN | OUT | GRAPHICS | AUDIO | OTHER |
|---|---|---|---|---|---|---|---|
| 1. | General | (ER) | 36885 | 37121 | app tx | | |
| | appearance | (HS) | 47254 | 47254 | app tx | | |
| 2. | Vital signs | (ER) | ff | ff | vs tbl | | |
| | | (HS) | | | | | |
| | | (CR) | | | | | |
| 3. | HEENT | (ER) | 35206 | 35343 | hent tx | | |
| | | (HS) | 50901 | 51043 | " | | |
| 4. | Neck | (ER) | 35344 | 35437 | neck tx | | |
| | | (HS) | 51044 | 51137 | " | | |
| 5. | Extremities | (ER) | 36879 | 36879 | extr tx | | |
| | | (HS) | 52211 | 52211 | " | | |
| 6. | Skin | (ER) | 36880 | 36880 | skin tx | | |
| | | (HS) | 47259 | 47259 | | | |
| 7. | Hands | (ER) | 36311 | 36879 | | | |
| | | (HS) | 52011 | 52211 | | | |
| 8. | Abdomen | (ER) | 36205 | 36205 | bely tx | | |
| | | (HS) | 47257 | 47257 | " | | |
| 9. | Chest | (ER) | 35438 | 35438 | ches tx | | |
| | and lungs | (HS) | 51138 | 51138 | " | | |
| 10. | Heart | (ER) | 45738 | 45738 | hart tx | | |
| | | (HS) | ff | ff | | | |

| II PHYSICAL EXAM VOCABULARY (CONT'D) | | IN | OUT | GRAPHICS | AUDIO | OTHER |
|---|---|---|---|---|---|---|
| 11. Neurological | (ER) | 35440 | 35590 | | | |
| | (HS) | 51140 | 51290 | | | |
| 12. Lymph nodes | (ER) | 35439 | 35439 | lymp tx | | |
| | (HS) | 51139 | 51139 | " | | |
| 13. Musculo- | (ER) | ff | ff | bone tx | | |
| skeletal | (HS) | ff | ff | " | | |
| 14. Back | (ER) | 36310 | 36310 | back tx | | |
| | (HS) | 52010 | 52010 | | | |
| 15. Genitourinary | (ER) | 45737 | 45737 | guri tx | | |
| system | (HS) | ff | ff | | | |
| 16. Rectal exam | (ER) | 45744 | 45744 | rect tx | | |
| | (HS) | 47262 | 47262 | | | |
| 17. Proctoscopy | (ER) | ff | ff | sch tx | | SCHEDULER |
| | (HS) | 47263 | 47263 | | | |
| 18. Finger-to-nose | (ER) | 35591 | 36309 | | | |
| | (HS) | 52191 | 52009 | | | |
| 19. Sclera | (ER) | 35206 | 35343 | sclr tx | | |
| | (HS) | 50901 | 51043 | | | |

| III. DIAGNOSTIC TEST VOCABULARY | | IN | OUT | GRAPHIC | AUDIO | OTHER |
|---|---|---|---|---|---|---|
| 1. Amylase | (ER) | ST ff | ff | AMY.1 | | wait state |
| | (ADM) | QR 37483 | 37528 | cnfrm | MV PR | SCHEDULER |
| | (HS) | OR ff | ff | sch tx | | SCHEDULER |
| | | SH none | | | | |
| | | RP ff | ff | AMY.1-6 | | wait state |
| 2. Lipase | (ER) | ST ff | ff | LIP.1 | | wait state |
| | (ADM) | OR 37529 | 37577 | cnfrm | MV PR | SCHEDULER |
| | (HS) | OR ff | ff | sch tx | | SCHEDULER |
| | | SH none | | | | |
| | | RP ff | ff | LIP.1-2 | | wait state |

III. DIAGNOSTIC TEST VOCABULARY (CONT'D)

| # | Test | | IN | OUT | GRAPHIC | AUDIO | OTHER |
|---|---|---|---|---|---|---|---|
| 3. | Serum electrolytes | (ER) | ST ff | ff | LYTE.1 | | wait state |
| | | (ADM) | OR 37578 | 37626 | cnfrm | MV PR | SCHEDULER |
| | | (HS) | OR ff | ff | sch tx | | SCHEDULER |
| | | | SH none | | | | |
| | | | RP ff | ff | LYTE.1-4 | | wait state |
| 4. | PT | (ER) | ST ff | ff | PT.1 | | wait state |
| | | (ADM) | OR 37627 | 37687 | cnfrm | MV PR | SCHEDULER |
| | | (HS) | OR ff | ff | sch tx | | wait state |
| | | | SH none | | | | |
| | | | RP ff | ff | PT.1-2 | | wait state |
| 5. | PTT | (ER) | ST ff | ff | PTT.1 | | wait state |
| | | (ADM) | OR 37688 | 37757 | cnfrm | MV PR | SCHEDULER |
| | | (HS) | OR ff | ff | sch tx | | SCHEDULER |
| | | | SH none | | | | |
| | | | RP ff | ff | PTT.1 | | wait state |
| 6. | CBC | (ER) | ST ff | ff | CBC.1 | | wait state |
| | | (ADM) | OR 37483 | 37528 | cnfrm | MV PR | SCHEDULER |
| | | (HS) | OR ff | ff | sch tx | | SCHEDULER |
| | | | SH vampire scene | | clock | MV ACK | CONTINUE |
| | | | RP ff | ff | CBC.1-4 | | wait state |
| 7. | Hemoglobin | (ER) | ST ff | ff | HEMO.1 | | wait state |
| | | (ADM) | OR 37529 | 37577 | cnfrm | MV PR | SCHEDULER |
| | | (HS) | OR ff | ff | sch tx | | SCHEDULER |
| | | | SH none | | | | |
| | | | RP ff | ff | HEMO.1-4 | | wait state |
| 8. | Hematocrit | (ER) | ST ff | ff | HEMAT.1 | | wait state |
| | | (ADM) | OR 37578 | 37626 | cnfrm | MV PR | SCHEDULER |
| | | (HS) | OR ff | ff | sch tx | | SCHEDULER |
| | | | SH none | | | | |
| | | | RP ff | ff | HEMAT.1-4 | | wait state |

III. DIAGNOSTIC TEST VOCABULARY (CONT'D)

| | | | IN | OUT | GRAPHIC | AUDIO | OTHER |
|---|---|---|---|---|---|---|---|
| 9. | Platelet count | (ER) | ST ff | ff | PLAT.1 | | wait stat |
| | | (ADM) | SH 37529 | 37577 | chfrm | MV PR | SCHEDULER |
| | | (HS) | OR ff | ff | sch tx | | SCHEDULER |
| | | | SH none | | | | |
| | | | RP ff | ff | PLAT.1 | | wait stat |
| 10. | VDRL | (ER) | ST ff | ff | VDRL.1 | | wait state |
| | | (ADM) | OR 37627 | 37687 | cnfrm | MV PR | SCHEDULER |
| | | (HS) | OR ff | ff | sch tx | | SCHEDULER |
| | | | SH 47256 | 47256 | clock | MV RMD | CONTINUE |
| | | | RP ff | ff | VDRL.1 | | wait state |
| 11. | RBC indices | (ER) | ST ff | ff | RBC.1 | | wait state |
| | | (ADM) | OR 37627 | 37687 | cnfrm | MV PR | SCHEDULER |
| | | (HS) | OR ff | ff | sch tx | | SCHEDULER |
| | | | SH none | | | | |
| | | | RP ff | ff | RBC.1 | | wait state |
| 12. | Coagulation panel | (ER) | ST ff | ff | COAG.1 | | wait state |
| | | (ADM) | OR 37627 | 37687 | cnfrm | MV PR | SCHEDULER |
| | | (HS) | OR ff | ff | sch tx | | SCHEDULER |
| | | | SH none | | | | |
| | | | RP ff | ff | COAG.1-2* | | wait state |
| 13. | Sputum culture | (ER) | ST ff | ff | SPUT.1 | | wait sta |
| | | (ADM) | OR 37627 | 37687 | cnfrm | MV PR | SCHEDULER |
| | | (HS) | OR ff | ff | sch tx | | SCHEDULER |
| | | | SH none | | | | |
| | | | RP ff | ff | SPUT.1 | | : sta |
| 14. | Acid-fast smear | (ER) | ST ff | ff | ACID.1 | | wait state |
| | | (ADM) | OR 37529 | 37577 | cnfrm | MV PR | SCHEDULER |
| | | (HS) | OR ff | ff | sch tx | | SCHEDULER |
| | | | SH none | | | | |
| | | | RP ff | ff | ACID.1 | | wait state |
| 15. | Blood gases | (ER) | ST ff | ff | GAS.1 | | wait state |
| | | (ADM) | OR 37529 | 37577 | cnfrm | MV PR | SCHEDULER |

III. DIAGNOSTIC TEST VOCABULARY (CONT'D)

| | | | IN | OUT | GRAPHIC | AUDIO | OTHER |
|---|---|---|---|---|---|---|---|
| | | (HS) | OR ff | ff | shc tx | | SCHEDULER |
| | | | SH none | | | | |
| | | | RP ff | ff | GAS.1-2 | | wait state |
| 16. | Blood alcohol | (ER) | ST ff | ff | ETOH.1 | | wait state |
| | | (ADM) | OR 37529 | 37577 | cnfrm | MV PR | SCHEDULER |
| | | (HS) | OR ff | ff | sch tx | | SCHEDULER |
| | | | SH none | | | | |
| | | | RP ff | ff | ETOH.1 | | wait stat |
| 17. | Serum folate | (ER) | ST ff | ff | FOLIC.1 | | wait stat |
| | | (ADM) | OR 37529 | 37577 | cnfrm | MV PR | SCHEDULER |
| | | (HS) | OR ff | ff | sch tx | | SCHEDULER |
| | | | SH none | | | | |
| | | | RP ff | ff | FOLIC.1 | | wait stat |
| 18. | Serum B12 | (ER) | ST ff | ff | B12.1 | | wait stat |
| | | (ADM) | OR 37529 | 37577 | cnfrm | MV PR | SCHEDULER |
| | | (HS) | OR ff | ff | sch tx | | SCHEDULER |
| | | | SH none | | | | |
| | | | RP ff | ff | B12.1 | | wait stat |
| 19. | Type and | (ER) | ST ff | ff | CROSS.1 | | wait stat |
| | cross match | (ADM) | OR 37627 | 37687 | cnfrm | MV PR | SCHEDULER |
| | | (HS) | OR ff | ff | sch tx | | SCHEDULER |
| | | | SH none | | | | |
| | | | RP ff | ff | CROSS.1 | | wait stat |
| 20. | Type and | (ER) | ST ff | ff | SCREEN.1 | | wait stat |
| | screen/Type | (ADM) | OR 37627 | 37687 | cnfrm | MV PR | SCHEDULER |
| | and hold | (HS) | OR ff | ff | sch tx | | SCHEDULER |
| | | | SH none | | | | |
| | | | RP ff | ff | SCREEN.1 | | wait stat |
| 21. | Liver | (ER) | ST ff | ff | LIVER.1 | | wait stat |
| | function | (ADM) | OR 37627 | 37687 | cnfrm | MV PR | SCHEDULER |
| | | (HS) | OR ff | ff | sch tx | | SHCEDULER |
| | | | SH 47248 | 47248 | | MV RMD | |
| | | | RP ff | ff | LIVER.1-5 | | wait stat |

III. DIAGNOSTIC TEST VOCABULARY (CONT'D)

| | | IN | OUT | GRAPHIC | AUDIO | OTHER |
|---|---|---|---|---|---|---|
| 22. Chem 17 | (ER) | ST ff | ff | CHEM17.1 | | wait stat |
| | (ADM) | OR 37627 | 37687 | cnfrm | MV PR | SCHEDULER |
| | (HS) | OR ff | ff | sch tx | | SCHEDULER |
| | | SH none | | | | |
| | | RP ff | ff | CHEM17.1-5 | | wait stat |
| 23. Urinalysis | (ER) | ST ff | ff | UA.1 | | wait stat |
| | (ADM) | OR 37627 | 37687 | cnfrm | MV PR | SCHEDULER |
| | (HS) | OR ff | ff | sch tx | | SCHEDULER |
| | | SH none | | | | |
| | | RP ff | ff | UA.1 | | wait stat |
| 24. EKG | (ER) | ST ff | ff | EKG.1 | | wait stat |
| | (ADM) | OR 37483 | 37528 | cnfrm | MV PR | SCHEDULER |
| | (HS) | OR ff | ff | sch tx | | SCHEDULER |
| | | SH none | | | | |
| | | RP ff | ff | EKG.1-2* | | wait stat |
| 25. Echocardiogram | (ER) | ST ff | ff | ECHO.1 | | wait stat |
| | (ADM) | OR 37483 | 37528 | cnfrm | MV PR | SCHEDULER |
| | (HS) | OR ff | ff | sch tx | | SCHEDULER |
| | | SH none | | | | |
| | | RP ff | ff | ECHO.1 | | wait stat |
| 26. Chest x-ray | (ER) | ST 45755 | 45755 | CXR.1 | | wait stat |
| | (ADM) | OR 37483 | 37528 | cnfrm | MV PR | SCHEDULER |
| | (HS) | OR ff | ff | sch tx | | SCHEDULER |
| | | SH none | | | | |
| | | RP $&@¢¢ | $&@¢¢ | CXR.1 | | wait stat |
| 27. Abdominal x-ray | (ER) | ST 45756 | 45756 | ABXR.1 | | wait stat |
| | (ADM) | OR 37483 | 37528 | cnfrm | MV PR | SCHEDULER |
| | (HS) | OR ff | ff | sch tx | | SCHEDULER |
| | | SH 38861 | 39234 | clock | MV RMD | CONTINUE |
| | | RP ff | ff | ABXR.1 | | wait stat |
| 28. Colonoscopy | (ER) | OR ff | ff | sch tx | | SCHEDULER |
| | (ADM) | OR 37688 | 37757 | cnfrm | MV PR | SCHEDULER |
| | (HS) | OR ff | ff | sch tx | | SCHEDULER |

III. DIAGNOSTIC TEST VOCABULARY (CONT'D)

| | | IN | OUT | GRAPHIC | AUDIO | OTHER |
|---|---|---|---|---|---|---|
| | | SH 38238 | 38238 | clock | MV RMD | CONTINUE |
| | | RP ff | ff | COLON.1 | | wait stat |
| 29. Liver biopsy | (ER) | OR ff | ff | sch tx | | SCHEDULER |
| | (ADM) | OR 37688 | 37757 | cnfrm | MV PR | SCHEDULER |
| | (HS) | OR ff | ff | sch tx | | SCHEDULER |
| | | SH 41599 | 41918 | clock | MV RMD | CONTINUE |
| | | RP ff | ff | BIOP.1 | | wait stat |
| 30. Endoscopy | (ER) | OR ff | ff | sch tx | | SCHEDULER |
| | (ADM) | OR 37688 | 37757 | cnfrm | MV PR | SCHEDULER |
| | (HS) | OR ff | ff | sch tx | | SCHEDULER |
| | | SH 39235 | 39509 | clock | MV RMD | CONTINUE |
| | | RP 29510 | 39635 | ENDOS.1 | | ws/interp |
| 31. Abdominal CT scan | (ER) | OR ff | ff | sch tx | | SCHEDULER |
| | (ADM) | OR 37688 | 37757 | cnfrm | MV PR | SCHEDULER |
| | (HS) | OR ff | ff | sch tx | | SCHEDULER |
| | | SH 40759 | 41238 | clock | MV PR | CONTINUE |
| | | RP 53669 | 53669 | CAT.1 | | wait stat |
| 32. Upper GI | (ER) | OR ff | ff | sch tx | | SCHEDULER |
| | (ADM) | OR 37688 | 37757 | cnfrm | MV PR | SCHEDULER |
| | (HS) | OR ff | ff | sch tx | | SCHEDULER |
| | | SH none | | | | |
| | | RP 53667 | 53667 | UGI.1 | | wait stat |
| 33. Lower GI | (ER) | OR ff | ff | sch tx | | SCHEDULER |
| | (ADM) | OR 37578 | 37626 | cnfrm | MV PR | SCHEDULER |
| | (HS) | OR ff | ff | sch tx | | SCHEDULER |
| | | SH 47255 | 47255 | clock | MV RMD | pause/cor |
| | | RP 53668 | 53668 | LGI.1 | | wait stat |
| 34. NG aspirate | (ER) | OR ff | ff | sch tx | MV NG | SCHEDULER |
| | (ADM) | OR 37578 | 37626 | cnfrm | MV PR | SCHEDULER |
| | (HS) | OR ff | ff | sch tx | | SCHEDULER |
| | | SH 47253 | 47253 | clock | MV RMD | pause/cor |
| | | RP 47252 | 47252 | ASPIR.1 | | wait stat |

III. DIAGNOSTIC TEST VOCABULARY (CONT'D)

| | | | IN | OUT | GRAPHIC | AUDIO | OTHER |
|---|---|---|---|---|---|---|---|
| 35. | Abdominal sonogram | (ER) | ST ff | ff | SONO.1 | | wait sta |
| | | (ADM) | OR 37578 | 37626 | cnfrm | MV PR | SCHEDULEI |
| | | (HS) | OR ff | ff | sch tx | | SCHEDULEI |
| | | | SH none | | | | |
| | | | RP ff | ff | SONO.1 | | wait sta |
| 36. | Alkaline phosphatase | (ER) | ST ff | ff | ALK.1-2 | | wait sta |
| | | (ADM) | OR 37578 | 37626 | cnfrm | MV PR | SCHEDULEF |
| | | (HS) | OR ff | ff | sch tx | | SCHEDULEF |
| | | | SH none | | | | |
| | | | RP ff | ff | ALK.1 | | wait sta |
| 37. | SGPT | (ER) | ST ff | ff | SGPT.1 | | wait state |
| | | (ADM) | OR 37578 | 37626 | cnfrm | MV PR | SCHEDULER |
| | | (HS) | OR ff | ff | sch tx | | SCHEDULER |
| | | | SH none | | | | |
| | | | RP ff | ff | SGPT.1 | | wait state |
| 38. | Bilirubin | (ER) | ST ff | ff | BILR.1 | | wait state |
| | | (ADM) | OR 37529 | 37577 | cnfrm | MV PR | SCHEDULER |
| | | (HS) | OR ff | ff | sch tx | | SCHEDULER |
| | | | SH none | | | | |
| | | | RP ff | ff | BILR.1 | | wait state |
| 39. | Chem 6 | (ER) | ST ff | ff | CHEM6.1 | | wait state |
| | | (ADM) | OR 37529 | 37577 | cnfrm | MV PR | SCHEDULER |
| | | (HS) | OR ff | ff | sch tx | | SCHEDULER |
| | | | SH none | | | | |
| | | | RP ff | ff | CHEM6.1-4 | | wait state |

IV. DIAGNOSIS VOCABULARY

| | | | IN | OUT | GRAPHIC | AUDIO | OTHER |
|---|---|---|---|---|---|---|---|
| 1. | Bleeding duodenal ulcer | (ADM) | 37122 | 37158 | cnfrm | MV PR | |
| | | (DIS) ER | 39174 | 39230 | " | MV T2 | |
| | | HS | 52212 | 52258 | " | MV T2 | |

IV. DIAGNOSIS VOCABULARY (CONT'D)

| | | | IN | OUT | GRAPHIC | AUDIO | OTHER |
|---|---|---|---|---|---|---|---|
| 2. | Bleeding gastric ulcer | (ADM) | 37122 | 37158 | cnfrm | MV PR | |
| | | (DIS) | ER 39231 | 39283 | " | MV T2 | |
| | | | HS 52212 | 52258 | " | MV T2 | |
| 3. | Gastritis | (ADM) | 37159 | 37215 | cnfrm | MV PR | |
| | | (DIS) | ER 39284 | 39328 | " | MV T2 | |
| | | | HS 52212 | 52258 | " | MV T2 | |
| 4. | Hiatus hernia | (ADM) | 37216 | 37267 | cnfrm | MV PR | |
| | | (DIS) | ER 39329 | 39387 | " | MV T2 | |
| | | | HS 52259 | 52309 | " | MV T2 | |
| 5. | Mallory-Weiss syndrome | (ADM) | 37268 | 37340 | cnfrm | MV PR | |
| | | (DIS) | ER 39388 | 39454 | " | MV T2 | |
| | | | HS 52259 | 52309 | " | MV T2 | |
| 6. | Esophageal varices | (ADM) | 37341 | 37397 | cnfrm | MV PR | |
| | | (DIS) | ER 39388 | 39454 | " | MV T2 | |
| | | | HS 52259 | 52309 | " | MV T2 | |
| 7. | Cancer | (ADM) | 37216 | 37267 | cnfrm | MV PR | |
| | | (DIS) | ER 39329 | 39384 | " | MV T2 | |
| | | | HS 52310 | 52361 | " | MV T2 | |
| 8. | Pancreatitis (Acute?) | (ADM) | 37268 | 37340 | cnfrm | MV PR | |
| | | (DIS) | ER 39284 | 39323 | " | MV T2 | |
| | | | HS 52310 | 52361 | " | MV T2 | |
| 9. | Posterior penetrating duodenal ulcer | (ADM) | 37341 | 37397 | cnfrm | MV PR | |
| | | (DIS) | ER 39284 | 39328 | " | MV T2 | |
| | | | HS 52362 | 52427 | " | MV T2 | |
| 10. | Chronic bronchitis | (ADM) | 37268 | 37340 | cnfrm | MV PR | |
| | | (DIS) | ER 39329 | 39387 | " | MV T2 | |
| | | | HS 52362 | 52427 | " | MV T2 | |
| 11. | COPD | (ADM) | 37216 | 37267 | cnfrm | MV PR | |
| | | (DIS) | ER 39388 | 39454 | " | MV T2 | |
| | | | HS 52362 | 52427 | " | MV T2 | |
| 12. | Alcoholism (Chronic?) | (ADM) | 37159 | 37215 | cnfrm | MV PR | |
| | | (DIS) | ER 39174 | 39230 | " | MV T2 | |
| | | | HS 52428 | 52487 | " | MV T2 | |

IV. DIAGNOSIS VOCABULARY (CONT'D) | IN | OUT | GRAPHIC | AUDIO | OTHER

| | | | IN | OUT | GRAPHIC | AUDIO | OTHER |
|---|---|---|---|---|---|---|---|
| 13. | Depression | (ADM) | 37122 | 37158 | cnfrm | MV PR | |
| | | (DIS) | ER 39174 | 39230 | " | MV T2 | |
| | | | HS 52428 | 52487 | " | MV T2 | |
| 14. | Alcoholic liver disease | (ADM) | 37159 | 37215 | cnfrm | MV PR | |
| | | (DIS) | ER 39174 | 39230 | " | MV T2 | |
| | | | HS 52428 | 52487 | " | MV T2 | |
| 15. | Hypersplenism | (ADM) | 37216 | 37267 | cnfrm | MV PR | |
| | | (DIS) | ER 39231 | 39283 | " | MV T2 | |
| | | | HS 52428 | 52487 | " | MV T2 | |
| 16. | Tuberculosis | (ADM) | 37268 | 37340 | cnfrm | MV PR | |
| | | (DIS) | ER 39231 | 39283 | " | MV T2 | |
| | | | HS 52212 | 52258 | " | MV T2 | |
| 17. | Perforated ulcer | (ADM) | 37341 | 37397 | cnfrm | MV PR | |
| | | (DIS) | ER 39284 | 39328 | " | MV T2 | |
| | | | HS 52259 | 52309 | " | MV T2 | |
| 18. | Chronic liver disease | (ADM) | 37216 | 37267 | cnfrm | MV PR | |
| | | (DIS) | ER 39284 | 39328 | " | MV T2 | |
| | | | HS 52310 | 52361 | " | MV T2 | |
| 19. | Pneumonia | (ADM) | 37122 | 37158 | cnfrm | MV PR | |
| | | (DIS) | ER 39284 | 39328 | " | MV T2 | |
| | | | HS 52259 | 52309 | " | MV T2 | |
| 20. | Zollinger-Ellison Syndrone | (ADM) | 37341 | 37397 | cnfrm | MV PR | |
| | | (DIS) | ER 39174 | 39230 | " | MV T2 | |
| | | | HS 52310 | 52361 | " | MV T2 | |
| 21. | Pseudoxanthoma Elasticum | (ADM) | 37268 | 37340 | cnfrm | MV PR | |
| | | (DIS) | ER 39174 | 39230 | " | MV T2 | |
| | | | HS 52259 | 52309 | " | MV T2 | |
| 22. | "That's all" | (ADM) | 37397 | 37481 | | MV PR | |
| | | (DIS) | ER 39455 | 39540 | | MV T2 | |
| | | | HS 52488 | 52540 | | MV T2 | |

(FH Responds)

V. MANAGEMENT VOCABULARY

| | | | IN | OUT | GRAPHIC | AUDIO | OTHER |
|---|---|---|---|---|---|---|---|
| 1. IV fluids | (ER) | | OR ff | ff | IV TX | MV IV | SCHED (HS) |
| | (ADM) | | OR 37122 | 37158 | confrm | MV PR | SCHED (HS) |
| | (HS) | | OR ff | ff | IV TX | MV IV | SCHED |
| | | | SH none | | | | |
| | | | RP ff | ff | IV.1 | IVRSP | SCHED |
| 2. NG suction | (ER) | | OR ff | ff | NG TX | MV NG | SCHED (HS |
| | (ADM) | | OR 37122 | 37158 | confrm | MV PR | SCHED |
| | (HS) | | OR ff | ff | NG TX | MV NG | SCHED |
| | | | SH 47252 | 47252 | | MV NGSC | |
| | | | RP ff | ff | NGRSP | | |
| 3. Antacids | (ER) | | OR ff | ff | ANT TX | MV ANT | SCHED |
| | (ADM) | | OR 37122 | 37158 | confrm | MV PR | SCHED |
| | (HS) | | OR ff | ff | ANT TX | MV ANT | SCHED |
| | | | SH none | | | | |
| | | | RP ff | ff | ANT.1 | ANTRSP | |
| | (DIS) | (ER) | OR 39174 | 39230 | confrm | MV PR | |
| | | (HS) | OR 52212 | 52258 | confrm | MV PR | |
| 4. Cimetidine IV | (ER) | | OR ff | ff | CIMIV-TX | MV IV | SCHED |
| | (ADM) | | OR 37122 | 37158 | Cnfrm | MV PR | SCHED |
| | (HS) | | OR | | CIMIV-TX | MV CIMIV | SCHED |
| | | | SH | | | | |
| | | | RP | | CIMIV.1 | CIMIVRSP | |
| 5. Cimetidine PO | (ER) | | OR ff | ff | CIMPO-TX | MV CIMPO | SCHED |
| | (ADM) | | OR 37122 | 37158 | Cnfrm | MV PR | SCHED |
| | (HS) | | OR | | CIMPO-TX | MV CIMPO | SCHED |
| | | | SH | | | | |
| | | | RP | | CIMPO.1 | CIMPORSP | |
| | (DIS) | ER | OR | | Cnfrm | | |
| | | HS | OR | | | | |
| 6. Bed rest | (ER) | | OR ff | ff | BRSP | | SCHED |
| | (ADM) | | OR 37122 | 37158 | MV BR | Confrm | SCHED |
| | (HS) | | OR ff | ff | BR TX | | SCHED |

| V. MANAGEMENT VOCABULARY (CONT'D) | | | IN | OUT | GRAPHIC | AUDIO | OTHER |
|---|---|---|---|---|---|---|---|
| | | | SH NONE | | | | |
| | | | RP  ff | ff | BRSP.1 | | |
| | (DIS) | ER | OR 39174 | 39230 | Confrm | MV PR | |
| | | HS | OR 52212 | 52258 | Confrm | MV PR | |
| 7. Oxygen | (ER) | | OR ff | ff | OXY TX | MV OXY | SCHED |
| | (ADM) | | OR 37268 | 37340 | Confirm | MV CIMPO | SCHED |
| | (HS) | | OR | | OXY TX | MV OXY | SCHED |
| | | | SH none | | | | |
| | | | RP | | OXY.1 | oxyrsp | |
| 8. Frequent vital | (ER) | | OR ff | ff | FVX TX | MV FVS | SCHED |
| | (ADM) | | OR 37268 | 37340 | Cnfrm | MV PR | SCHED |
| | (HS) | | OR | | FVS TX | MV FVS | SCHED |
| | | | SH | | | | |
| | | | RP | | FVS.1 | FVSRSP | |
| 9. Frequent | (ER) | | OR ff | ff | FUD TX | MV FUD | SCHED |
| urine output | (ADM) | | OR 37268 | 37340 | Cnfrm | MV PR | SCHED |
| | (HS) | | OR | | FUD TX | MV FUD | SCHED |
| | | | SH | | | | |
| | | | RP | | FUD.1 | FUDRSP | |
| 10. Demerol | (ER) | | OR ff | ff | DEM TX | MV DEM | SCHED |
| | (ADM) | | OR 37341 | 37397 | Cnfrm | MV PR | SCHED |
| | (HS) | | OR | | DEM TX | MV DEM | SCHED |
| | | | SH | | | | |
| | | | RP | | DEM.1 | DEMRSP | |
| | (DIS) | ER | OR | | Cnfrm | | |
| | | HS | OR | | | | |
| 11. Surgery | (ER) | | OR ff | ff | SURG TX | MV SURG | SCHED |
| | (ADM) | | OR 37341 | 37397 | Cnfrm | MV PR | SCHED |
| | (HS) | | OR | | SURG TX | MV SURG | SCHED |
| | | | SH | | | | |
| | | | RP | | SURG.1 | SURGRSP | |
| | (DIS) | ER | OR | | Cnfrm | | |
| | | HS | OR | | | | |

| V. MANAGEMENT VOCABULARY (CONT'D) | | | IN | OUT | GRAPHIC | AUDIO | OTHER |
|---|---|---|---|---|---|---|---|
| 12. Surgical consult | (ER) | | OR ff | ff | CNSLT.1 | CNSLRSP | |
| | (ADM) | | OR | | Cnfrm | MV PR | SCHED |
| | (HS) | | OR | | CNSLT TX | MV CNSLT | SCHED |
| | | | SH | | | | |
| | | | RP | | CNSLT.1 | CNSLTRSP | |
| | (DIS) | ER | OR | | Cnfrm | | |
| | | HS | OR | | | | |
| 13. Transfusion | (ER) | | OR ff | ff | TRANS TX | MV TRANS | SCHED |
| | (ADM) | | OR 37159 | 37215 | Cnfrm | MV PR | SCHED |
| | (HS) | | OR | | TRANS TX | MV TRANS | SCHED |
| | | | SH | | | | |
| | | | RP | | TRANS.1 | TRANSRSP | |
| 14. Alcohol counseling | (ER) | | OR ff | ff | ALCO TX | MV ALCO | SCHED |
| | (ADM) | | OR 37159 | 37215 | Cnfrm | MV PR | SCHED |
| | (HS) | | OR | | ALCO TX | MV ALCO | SCHED |
| | | | SH | | | | |
| | | | RP | | ALCO.1 | ALCORSP | |
| | (DIS) | ER | OR | | Cnfrm | | |
| | | HS | OR | | | | |
| 15. Nutrition counseling | (ER) | | OR ff | ff | NUTR TX | MV NUTR | SCHED |
| | (ADM) | | OR 37159 | 37215 | Cnfrm | MV PR | SCHED |
| | (HS) | | OR | | NUTR TX | MV NUTR | SCHED |
| | | | SH | | | | |
| | | | RP | | NUTR.1 | NUTRRSP | |
| | (DIS) | ER | OR | | Cnfrm | | |
| | | HS | OR | | | | |
| 16. Psycho. counseling | (ER) | | OR ff | ff | PSYC TX | MV PSYC | SCHED |
| | (ADM) | | OR 37216 | 37267 | Cnfrm | MV PR | SCHED |
| | (HS) | | OR | | PSYC TX | MV PSYC | SCHED |
| | | | SH | | | | |
| | | | RP | | PSYC.1 | PSYCRSP | |
| | (DIS) | ER | OR | | Cnfrm | | |
| | | HS | OR | | | | |

V. MANAGEMENT VOCABULARY (CONT'D) | | | IN | OUT | GRAPHIC | AUDIO | OTHER

| # | Term | Code | Sub | IN | OUT | GRAPHIC | AUDIO | OTHER |
|---|---|---|---|---|---|---|---|---|
| 17. | Family counseling | (ER) | | OR ff | ff | FAM TX | MV TX | SCHED |
| | | (ADM) | | OR 37216 | 37267 | Cnfrm | MV PR | SCHED |
| | | (HS) | | OR | | FAM TX | MV FAM | SCHED |
| | | | | SH | | | | |
| | | | | RP | | FAM.1 | FAMRSP | |
| | | (DIS) | ER | OR | | Cnfrm | | |
| | | | HS | OR | | | | |
| 18. | Bland diet | (ER) | | OR ff | ff | DIET TX | MV TX | SCHED |
| | | (ADM) | | OR 37216 | 37267 | Cnfrm | MV PR | SCHED |
| | | (HS) | | OR | | DIET TX | MV DIET | SCHED |
| | | | | SH | | | | |
| | | | | RP | | DIET.1 | DIETRSP | |
| | | (DIS) | ER | OR | | Cnfrm | | |
| | | | HS | OR | | | | |
| 19. | Librium | (ER) | | OR ff | ff | LIB TX | MV LIB | SCHED |
| | | (ADM) | | OR 37341 | 37397 | Cnfrm | MV PR | SCHED |
| | | (HS) | | OR | | LIB TX | MV LIB | SCHED |
| | | | | SH | | | | |
| | | | | RP | | LIB.1 | LIBRSP | |
| | | (DIS) | ER | OR | | Cnfrm | | |
| | | | HS | OR | | | | |
| 20. | Close medical | (DIS) | ER | OR | | Cnfrm | | |
| | | | HS | OR | | | | |
| 21. | Thiamine | (ER) | | OR ff | ff | THIA TX | MV THIA | SCHED |
| | | (ADM) | | OR 37341 | 37397 | Cnfrm | MV PR | SCHED |
| | | (HS) | | OR ff | ff | THIA TX | MV THIA | SCHED |
| | | | | SH none | | | | |
| | | | | RP ff | ff | THIA.1 | THIARSP | |
| | | (DIS) | ER | OR | | Cnfrm | | |
| | | | HS | OR | | Cnfrm | | |

| V. MANAGEMENT VOCABULARY (CONT'D) | | IN | OUT | GRAPHIC | AUDIO | OTHER |
|---|---|---|---|---|---|---|
| 22. NPO | (ER) | OR ff | ff | NPO TX | MV NPO | SCHED |
| | (ADM) | OR 37341 | 37397 | Cnfrm | MV PR | SCHED |
| | (HS) | OR ff | ff | NPO TX | MV NPO | SCHED |
| | | SH none | | | | |
| | | RP ff | ff | NPO.1 | NPORSF | |

| VII. SYSTEM WORDS | | IN | OUT | GRAPHIC | AUDIO | OTHER |
|---|---|---|---|---|---|---|
| 1. | Begin | 00030 | 04235 | | | wait stat |
| 2. | Finished | ER 43349 | 45713 | | | |
| | | HS 44878 | 47243 | | | |
| 3. | Feedback | ER 40071 | 40071 | | | |
| | | HS 52374 | 52374 | | | |
| 4. | Credits | ER 43349 | 45713 | | | |
| | | HS 44878 | 47243 | | | |
| 5. | End the case | Shuts down sys...ret to DOS | | | | |
| 6. | Stop | ff | ff | | | wait stat |
| 7. | Continue | See Intelligent Continue Stmt descr. | | | | |
| 8. | Sound | Activate Track 1... | | | | |
| 9. | Quiet | Shut down both tracks... | | | | |
| 10. | Admit the patient | 37122 | 37481 | | MV Msg | See ADM |
| 11. | (Schedule) a procedure | ff | ff | | MV Msg | See HS |
| 12. | (Talk) to Mr. Hall | ER 31639 | 31688 | | | See HS |
| 13. | (Examine) the patient | ff | ff | | MV Msg | See ER/HS |
| 14. | (Manage) the patient | ff | ff | | MV Msg | See ER/HS |
| 15. | Morning | Br to middle seg of next morning... | | | | |
| 16. | Afternoon | Br to middle seg of next afternoon... | | | | |
| 17. | Evening | Br to middle seg of next evening... | | | | |
| 18. | Night | Br to middle seg of next night... | | | | |
| 19. | Results | ff | ff | | MV Msg | |
| 20. | Status | ff | ff | | MV Msg | |

VII. SYSTEM WORDS CONT'D)

| | | IN | OUT | GRAPHIC | AUDIO | OTHER |
|---|---|---|---|---|---|---|
| 21. Discharge the patient | | ER 39174 | 39540 | | MV TI | See DIS |
| | | HS 52212 | 52575 | | MV TI | See DIS |
| 22. Outcome | (ER) | 1) 40481 | 40970 | | T1 | See DIS |
| | | 2) 40481 | 40970 | | T2 | See DIS |
| | | 3) 43018 | 43348 | | MV Compr | |
| | (HS) | 1) 41919 | 43522 | | T1 | See DIS |
| | | 2) 41919 | 43522 | | T2 | See DIS |
| | | 3) 41919 | 43054 | | | Br 43523 |
| | | 43523 | 43854 | | T1 | |
| 23. Instruction | | ER 45760 | 53546 | | | Neuro Ex |
| | | HS 48709 | 50900 | | | Heart EX |
| 24. Thoughts | | ff | ff | | MV Compr | |
| 25. Interpretation | (ER) | 41180 | 42219 | | MV TI | ENDOS |
| | (HS) | 39635 | 40674 | | MV TI | ENDOS |
| 26. Probability | | Not developed yet... | | | | |
| 27. Yes | | | | | | |
| 28. No | | | | | | |
| 29. Mistake | | Delete last entry in tracking... | | | | |
| 30. Try again | | Not developed yet... | | | | |

DISCHARGE THE PATIENT
(FROM EXAMINATION ROOM) (Disc 1)

| | | IN | OUT | GRAPHIC | AUDIO | OTHER |
|---|---|---|---|---|---|---|
| 1. State your final diagnoses ... | | 39174 | 39540 | | T1 | |
| more? | a) | 39174 | 39230 | | T2 | |
| more? | b) | 39231 | 39283 | | T2 | |
| more? | c) | 39284 | 39328 | | T2 | |
| more? | d) | 39329 | 39387 | | T2 | |
| more? | e) | 39388 | 39454 | | T2 | |
| ok! | f) | 39455 | 39540 | | T2 | BR 39541 |
| 2. FH responds to diagones ... | | 39541 | 39655 | | | BR 39656 |

| DISCHARGE THE PATIENT<br>(FROM EXAMINATION ROOM)(Disc 1)(CONT'D) | IN | OUT | GRAPHIC | AUDIO | OTHER |
|---|---|---|---|---|---|
| 3. State your discharge plan ... | | 39656 | 39991 | T1 | |
| more? | a) | 39656 | 39708 | T2 | |
| more? | b) | 39709 | 39765 | T2 | |
| more? | c) | 39766 | 39816 | T2 | |
| more? | d) | 39817 | 39877 | T2 | |
| more? | e) | 39878 | 39944 | T2 | |
| ok! | f) | 39945 | 39991 | T2 | BR 39996 |
| 4. FH responds to discharge plan ... | | 39996 | 40493 | | wait sta· |
| 5. "Outcome" | 1) | 40481 | 40970 | MV OT | wait sta· |
| | 2) | 40481 | 40803 | T2 | wait sta· |
| | 3) | 43018 | 43348 | T1 | wait sta· |

Alternate response by FH ... requires
compressed audio

| | | IN | OUT | | AUDIO | |
|---|---|---|---|---|---|---|
| Mx 1 | | 39996 | 40061 | | MR PR | |
| Mx 2 | | 40062 | 40145 | | MV PR | |
| Mx 3 | | 40146 | 40272 | | MV PR | |
| Mx 4 | | 40273 | 40337 | | MV PR | |
| Mx 5 | | 40338 | 40393 | | MV PR | |
| Mx 6 | | 40394 | 40480 | | MV PR | |
| Mx n | | ff | ff | | MV PR | |

| DISCHARGE THE PATIENT<br>(FROM HOSPITAL) (Disc 2) | IN | OUT | GRAPHIC | AUDIO | OTHER |
|---|---|---|---|---|---|
| 1. State your final diagnoses ... | | 52212 | 52575 | T1 | |
| more? | a) | 52212 | 52258 | T2 | |
| more? | b) | 52259 | 52309 | T2 | |
| more? | c) | 52310 | 52361 | T2 | |

DISCHARGE THE PATIENT
(FROM HOSPITAL) (Disc 2)(CONT'D)

| | | | IN | OUT | GRAPHIC | AUDIO | OTHER |
|---|---|---|---|---|---|---|---|
| 1. | State your final diagnoses ... | | 52212 | 52575 | | T1 | |
| | more? | a) | 52212 | 52258 | | T2 | |
| | more? | b) | 52259 | 52309 | | T2 | |
| | more? | c) | 52310 | 52361 | | T2 | |
| | more? | d) | 52362 | 52427 | | T2 | |
| | more? | e) | 52428 | 52487 | | T2 | |
| | ok! | f) | 52488 | 52540 | | T2 | BR 52576 |
| 2. | FH responds ... | | 52576 | 52804 | | | BR 52810 |
| 3. | State your discharge plan ... | | 52810 | 53035 | | T1 | BR 52212 |
| | more? | a) | 52212 | 52258 | | T2 | |
| | more? | b) | 52259 | 52309 | | T2 | |
| | more? | c) | 52310 | 52361 | | T2 | |
| | more? | d) | 52363 | 52427 | | T2 | |
| | more? | e) | 52428 | 52487 | | T2 | |
| | ok! | f) | 52488 | 52540 | | T2 | BR 52576 |
| 4. | FH responds | | 52576 | 52804 | | | wait sta |
| 5. | "Outcome" | 1) | 41919 | 43522 | | T1 | wait sta |
| | | 2) | 41919 | 43054 | | MV OT | wait sta |
| | | 3) | 41989 | 43054 | | | - 43523 |
| | | | 43523 | 43854 | | MV C* | |

OUTCOME

Hospital

| CRISIS TRAVELING SCENES | IN | OUT | GRAPHICS | AUDIO | OTHER INFO |
|---|---|---|---|---|---|
| 1. FH asleep..RNG..a hit... | 00050 | 02041 | | MV SU | Br-Cmd/Prob |
| | | | | | Occur A or B |

(Probability Occurrence A: NO HELP)

| CRISIS TRAVELING SCENES (CONT'D) | IN | OUT | GRAPHICS | AUDIO | OTHER INFO |
|---|---|---|---|---|---|
| 2. Harry calls Nurse who listens.. | 02042 | 02336 | blue tx | MV FB | case ends |

(Probability Occurrence B: NURSE HELPS)

| | | | | | |
|---|---|---|---|---|---|
| 3. Harry calls Nurse who lifts FH.. | 02678 | 03051 | | | ff/Br 04775 |

(Command Intervention: USER HELPS)

| | | | | | |
|---|---|---|---|---|---|
| 4. User calls nurse for help.. | 47894 | 48708 | | | ff/Br 04775 |

Command Words:

Nurse!

Emergency!

Help in 317!

Code Blue!

II. Admission (ADM) Section o    User is required to provide the system with: a) differential dx; b) requests for diagnostic tests and procedures for patient; and c) a plan for managing the patient during hospital stay.

o    Items are entered one at a time and confirmed by the system. The Monitor Voice (MV) prompts the user until there are no more requests.

o    Three vocabulary subsets must be downloaded for this section: Dx, DxT and Mx.

o    When the user completes his/her entry of management commands (signified by saying "no" to MV prompt), the program branches to HS section and "traveling scenes" ensue.

IV. DIAGNOSIS VOCABULARY

| | | | IN | OUT | GRAPHIC | AUDIO | OTHER |
|---|---|---|---|---|---|---|---|
| 1. | Bleeding duodenal ulcer | (ADM) | 37122 | 37158 | cnfrm | MV PR | |
| | | (DIS) | ER 39174 | 39230 | " | MV T2 | |
| | | | HS 52212 | 52258 | " | MV T2 | |
| 2. | Bleeding gastric ulcer | (ADM) | 37122 | 37158 | cnfrm | MV PR | |
| | | (DIS) | ER 39231 | 39283 | " | MV T2 | |
| | | | HS 52212 | 52258 | " | MV T2 | |
| 3. | Gastritis | (ADM) | 37159 | 37215 | cnfrm | MV PR | |
| | | (DIS) | ER 39284 | 39328 | " | MV T2 | |
| | | | HS 52212 | 52258 | " | MV T2 | |
| 4. | Hiatus hernia | (ADM) | 37216 | 37267 | cnfrm | MV PR | |
| | | (DIS) | ER 39329 | 39387 | " | MV T2 | |
| | | | HS 52259 | 52309 | " | MV T2 | |
| 5. | Mallory-Weiss syndrome | (ADM) | 37268 | 37340 | cnfrm | MV PR | |
| | | (DIS) | ER 39388 | 39454 | " | MV T2 | |
| | | | HS 52259 | 52309 | " | MV T2 | |
| 6. | Esophageal varices | (ADM) | 37341 | 37397 | cnfrm | MV PR | |
| | | (DIS) | ER 39388 | 39454 | " | MV T2 | |
| | | | HS 52259 | 52309 | " | MV T2 | |
| 7. | Cancer | (ADM) | 37216 | 37267 | cnfrm. | MV PR | |
| | | (DIS) | ER 39329 | 39384 | " | MV T2 | |
| | | | HS 52310 | 52361 | " | MV T2 | |
| 8. | Pancreatitis (Acute?) | (ADM) | 37268 | 37340 | cnfrm | MV PR | |
| | | (DIS) | ER 39284 | 39328 | " | MV T2 | |
| | | | HS 52310 | 52361 | " | MV T2 | |
| 9. | Posterior penetrating duodenal ulcer | (ADM) | 37341 | 37397 | cnfrm | MV PR | |
| | | (DIS) | ER 39284 | 39328 | " | MV T2 | |
| | | | HS 52362 | 52427 | " | MV T2 | |
| 10. | Chronic bronchitis | (ADM) | 37268 | 37340 | cnfrm | MV PR | |
| | | (DIS) | ER 39329 | 39387 | " | MV T2 | |
| | | | HS 52362 | 52427 | " | MV T2 | |
| 11. | COPD | (ADM) | 37216 | 37267 | cnfrm | MV PR | |
| | | (DIS) | ER 39388 | 39454 | " | MV T2 | |
| | | | HS 52362 | 52427 | " | MV T2 | |

IV. DIAGNOSIS VOCABULARY (CONT'D)

| | | | IN | OUT | GRAPHIC | AUDIO | OTHER |
|---|---|---|---|---|---|---|---|
| 12. | Alcoholism (Chronic?) | (ADM) | 37159 | 37215 | cnfrm | MV PR | |
| | | (DIS) ER | 39174 | 39230 | " | MV T2 | |
| | | HS | 52428 | 52487 | " | MV T2 | |
| 13. | Depression | (ADM) | 37122 | 37158 | cnfrm | MV PR | |
| | | (DIS) ER | 39174 | 39230 | " | MV T2 | |
| | | HS | 52428 | 52487 | " | MV T2 | |
| 14. | Alcoholic liver disease | (ADM) | 37159 | 37215 | cnfrm | MV PR | |
| | | (DIS) ER | 39174 | 39230 | " | MV T2 | |
| | | HS | 52428 | 52487 | " | MV T2 | |
| 15. | Hypersplenism | (ADM) | 37216 | 37267 | cnfrm | MV PR | |
| | | (DIS) ER | 39231 | 39283 | " | MV T2 | |
| | | HS | 52428 | 52487 | " | MV T2 | |
| 16. | Tuberculosis | (ADM) | 37268 | 37340 | cnfrm | MV PR | |
| | | (DIS) ER | 39231 | 39283 | " | MV T2 | |
| | | HS | 52212 | 52258 | " | MV T2 | |
| 17. | Perforated ulcer | (ADM) | 37341 | 37397 | cnfrm | MV PR | |
| | | (DIS) ER | 39284 | 39328 | " | MV T2 | |
| | | HS | 52259 | 52309 | " | MV T2 | |
| 18. | Chronic liver disease | (ADM) | 37216 | 37267 | cnfrm | MV PR | |
| | | (DIS) ER | 39284 | 39328 | " | MV T2 | |
| | | HS | 52310 | 52361 | " | MV T2 | |
| 19. | Pneumonia | (ADM) | 37122 | 37158 | cnfrm | MV PR | |
| | | (DIS) ER | 39284 | 39328 | " | MV T2 | |
| | | HS | 52259 | 52309 | " | MV T2 | |
| 20. | Zollinger-Ellison Syndrone | (ADM) | 37341 | 37397 | cnfrm | MV PR | |
| | | (DIS) ER | 39174 | 39230 | " | MV T2 | |
| | | HS | 52310 | 52361 | " | MV T2 | |
| 21. | Pseudoxanthoma Elasticum | (ADM) | 37268 | 37340 | cnfrm | MV PR | |
| | | (DIS) ER | 39174 | 39230 | " | MV T2 | |
| | | HS | 52259 | 52309 | " | MV T2 | |
| 22. | "That's all" | (ADM) | 37397 | 37481 | | MV PR | |
| | | (DIS) ER | 39455 | 39540 | | MV T2 | |
| | | HS | 52488 | 52540 | | MV T2 | |

(FH Responds)

III. DIAGNOSTIC TEST VOCABULARY

| | | IN | OUT | GRAPHIC | AUDIO | OTHER |
|---|---|---|---|---|---|---|
| 1. Amylase | (ER) | ST ff | ff | AMY.1 | | wait state |
| | (ADM) | OR 37483 | 37528 | cnfrm | MV PR | SCHEDULER |
| | (HS) | OR ff | ff | sch tx | | SCHEDULER |
| | | SH none | | | | |
| | | RP ff | ff | AMY.1-6 | | wait state |
| 2. Lipase | (ER) | ST ff | ff | LIP.1 | | wait state |
| | (ADM) | OR 37529 | 37577 | cnfrm | MV PR | SCHEDULER |
| | (HS) | OR ff | ff | sch tx | | SCHEDULER |
| | | SH none | | | | |
| | | RP ff | ff | LIP.1-2 | | wait state |
| 3. Serum electrolytes | (ER) | ST ff | ff | LYTE.1 | | wait state |
| | (ADM) | OR 37578 | 37626 | cnfrm | MV PR | SCHEDULER |
| | (HS) | OR ff | ff | sch tx | | SCHEDULER |
| | | SH none | | | | |
| | | RP ff | ff | LYTE.1-4 | | wait state |
| 4. PT | (ER) | ST ff | ff | PT.1 | | wait state |
| | (ADM) | OR 37627 | 37687 | cnfrm | MV PR | SCHEDULER |
| | (HS) | OR ff | ff | sch tx | | wait state |
| | | SH none | | | | |
| | | RP ff | ff | PT.1-2 | | wait state |
| 5. PTT | (ER) | ST ff | ff | PTT.1 | | wait state |
| | (ADM) | OR 37688 | 37757 | cnfrm | MV PR | SCHEDULER |
| | (HS) | OR ff | ff | sch tx | | SCHEDULER |
| | | SH none | | | | |
| | | RP ff | ff | PTT.1 | | wait state |
| 6. CBC | (ER) | ST ff | ff | CBC.1 | | wait state |
| | (ADM) | OR 37483 | 37528 | cnfrm | MV PR | SCHEDULER |
| | (HS) | OR ff | ff | sch tx | | SCHEDULER |
| | | SH vampire scene | | clock | MV ACK | CONTINUE |
| | | RP ff | ff | CBC.1-4 | | wait state |

III. DIAGNOSTIC TEST VOCABULARY (CONT'D)

| | | | IN | OUT | GRAPHIC | AUDIO | OTHER |
|---|---|---|---|---|---|---|---|
| 7. | Hemoglobin | (ER) | ST ff | ff | HEMO.1 | | wait state |
| | | (ADM) | OR 37529 | 37577 | cnfrm | MV PR | SCHEDULER |
| | | (HS) | OR ff | ff | sch tx | | SCHEDULER |
| | | | SH none | | | | |
| | | | RP ff | ff | HEMO.1-4 | | wait state |
| 8. | Hematocrit | (ER) | ST ff | ff | HEMAT.1 | | wait state |
| | | (ADM) | OR 37578 | 37626 | cnfrm | MV PR | SCHEDULER |
| | | (HS) | OR ff | ff | sch tx | | SCHEDULER |
| | | | SH none | | | | |
| | | | RP ff | ff | HEMAT.1-4 | | wait state |
| 9. | Platelet | (ER) | ST ff | ff | PLAT.1 | | wait state |
| | count | (ADM) | SH 37529 | 37577 | cnfrm | MV PR | SCHEDULER |
| | | (HS) | OR ff | ff | sch tx | | SCHEDULER |
| | | | SH none | | | | |
| | | | RP ff | ff | PLAT.1 | | wait stat |
| 10. | VDRL | (ER) | ST ff | ff | VDRL.1 | | wait state |
| | | (ADM) | OR 37627 | 37687 | cnfrm | MV PR | SCHEDULER |
| | | (HS) | OR ff | ff | sch tx | | SCHEDULER |
| | | | SH 47256 | 47256 | clock | MV RMD | CONTINUE |
| | | | RP ff | ff | VDRL.1 | | wait state |
| 11. | RBC indices | (ER) | ST ff | ff | RBC.1 | | wait state |
| | | (ADM) | OR 37627 | 37687 | cnfrm | MV PR | SCHEDULER |
| | | (HS) | OR ff | ff | sch tx | | SCHEDULER |
| | | | SH none | | | | |
| | | | RP ff | ff | RBC.1 | | wait state |
| 12. | Coagulation | (ER) | ST ff | ff | COAG.1 | | wait state |
| | panel | (ADM) | OR 37627 | 37687 | cnfrm | MV PR | SCHEDULER |
| | | (HS) | OR ff | ff | sch tx | | SCHEDULER |
| | | | SH none | | | | |
| | | | RP ff | ff | COAG.1-2* | | wait state |
| 13. | Sputum | (ER) | ST ff | ff | SPUT.1 | | wait stat |
| | culture | (ADM) | OR 37627 | 37687 | cnfrm | MV PR | SCHEDULER |

III. DIAGNOSTIC TEST VOCABULARY (CONT'D)

| | | IN | OUT | GRAPHIC | AUDIO | OTHER |
|---|---|---|---|---|---|---|
| | (HS) | OR ff | ff | sch tx | | ⋯EDULEF |
| | | SH none | | | | |
| | | RP ff | ff | SPUT.1 | | ⋯t sta⋯ |
| 14. Acid-fast | (ER) | ST ff | ff | ACID.1 | | wait state |
| smear | (ADM) | OR 37529 | 37577 | cnfrm | MV PR | SCHEDULER |
| | (HS) | OR ff | ff | sch tx | | SCHEDULER |
| | | SH none | | | | |
| | | RP ff | ff | ACID.1 | | wait stat |
| 15. Blood gases | (ER) | ST ff | ff | GAS.1 | | wait stat |
| | (ADM) | OR 37529 | 37577 | cnfrm | MV PR | SCHEDULER |
| | (HS) | OR ff | ff | shc tx | | SCHEDULER |
| | | SH none | | | | |
| | | RP ff | ff | GAS.1-2 | | wait stat |
| 16. Blood alcohol | (ER) | ST ff | ff | ETOH.1 | | wait stat |
| | (ADM) | OR 37529 | 37577 | cnfrm | MV PR | SCHEDULER |
| | (HS) | OR ff | ff | sch tx | | SCHEDULER |
| | | SH none | | | | |
| | | RP ff | ff | ETOH.1 | | wait stat |
| 17. Serum folate | (ER) | ST ff | ff | FOLIC.1 | | wait stat |
| | (ADM) | OR 37529 | 37577 | cnfrm | MV PR | SCHEDULER |
| | (HS) | OR ff | ff | sch tx | | SCHEDULER |
| | | SH none | | | | |
| | | RP ff | ff | FOLIC.1 | | wait stat |
| 18. Serum B12 | (ER) | ST ff | ff | B12.1 | | wait stat |
| | (ADM) | OR 37529 | 37577 | cnfrm | MV PR | SCHEDULER |
| | (HS) | OR ff | ff | sch tx | | ⋯EDULEF |
| | | SH none | | | | |
| | | RP ff | ff | B12.1 | | ⋯t stat |
| 19. Type and | (ER) | ST ff | ff | CROSS.1 | | wait stat |
| cross match | (ADM) | OR 37627 | 37687 | cnfrm | MV PR | SCHEDULER |
| | (HS) | OR ff | ff | sch tx | | SCHEDULER |
| | | SH none | | | | |
| | | RP ff | ff | CROSS.1 | | wait stat |

III. DIAGNOSTIC TEST VOCABULARY (CONT'D)    IN         OUT        GRAPHIC        AUDIO      OTHER

| # | Test | Setting | IN | OUT | GRAPHIC | AUDIO | OTHER |
|---|---|---|---|---|---|---|---|
| 20. | Type and screen/Type and hold | (ER) | ST ff | ff | SCREEN.1 | | wait stat |
| | | (ADM) | OR 37627 | 37687 | cnfrm | MV PR | SCHEDULER |
| | | (HS) | OR ff | ff | sch tx | | SCHEDULER |
| | | | SH none | | | | |
| | | | RP ff | ff | SCREEN.1 | | wait stat |
| 21. | Liver function | (ER) | ST ff | ff | LIVER.1 | | wait stat |
| | | (ADM) | OR 37627 | 37687 | cnfrm | MV PR | SCHEDULER |
| | | (HS) | OR ff | ff | sch tx | | SHCEDULER |
| | | | SH 47248 | 47248 | | MV RMD | |
| | | | RP ff | ff | LIVER.1-5 | | wait stat |
| 22. | Chem 17 | (ER) | ST ff | ff | CHEM17.1 | | wait stat |
| | | (ADM) | OR 37627 | 37687 | cnfrm | MV PR | SCHEDULER |
| | | (HS) | OR ff | ff | sch tx | | SCHEDULER |
| | | | SH none | | | | |
| | | | RP ff | ff | CHEM17.1-5 | | wait stat |
| 23. | Urinalysis | (ER) | ST ff | ff | UA.1 | | wait stat |
| | | (ADM) | OR 37627 | 37687 | cnfrm | MV PR | SCHEDULER |
| | | (HS) | OR ff | ff | sch tx | | SCHEDULER |
| | | | SH none | | | | |
| | | | RP ff | ff | UA.1 | | wait stat |
| 24. | EKG | (ER) | ST ff | ff | EKG.1 | | wait stat |
| | | (ADM) | OR 37483 | 37528 | cnfrm | MV PR | SCHEDULER |
| | | (HS) | OR ff | ff | sch tx | | SCHEDULER |
| | | | SH none | | | | |
| | | | RP ff | ff | EKG.1-2* | | wait stat |
| 25. | Echocardiogram | (ER) | ST ff | ff | ECHO.1 | | wait stat |
| | | (ADM) | OR 37483 | 37528 | cnfrm | MV PR | SCHEDULER |
| | | (HS) | OR ff | ff | sch tx | | SCHEDULER |
| | | | SH none | | | | |
| | | | RP ff | ff | ECHO.1 | | wait stat |
| 26. | Chest x-ray | (ER) | ST 45755 | 45755 | CXR.1 | | wait stat |
| | | (ADM) | OR 37483 | 37528 | cnfrm | MV PR | SCHEDULER |

III. DIAGNOSTIC TEST VOCABULARY (CONT'D)

| | | IN | OUT | GRAPHIC | AUDIO | OTHER |
|---|---|---|---|---|---|---|
| | (HS) | OR ff | ff | sch tx | | SCHEDULER |
| | | SH none | | | | |
| | | RP $&@¢¢ | $&@¢¢ | CXR.1 | | wait stat |
| 27. Abdominal | (ER) | ST 45756 | 45756 | ABXR.1 | | wait stat |
| x-ray | (ADM) | OR 37483 | 37528 | cnfrm | MV PR | SCHEDULER |
| | (HS) | OR ff | ff | sch tx | | SCHEDULER |
| | | SH 38861 | 39234 | clock | MV RMD | CONTINUE |
| | | RP ff | ff | ABXR.1 | | wait stat |
| 28. Colonoscopy | (ER) | OR ff | ff | sch tx | | SCHEDULER |
| | (ADM) | OR 37688 | 37757 | cnfrm | MV PR | SCHEDULER |
| | (HS) | OR ff | ff | sch tx | | SCHEDULER |
| | | SH 38238 | 38238 | clock | MV RMD | CONTINUE |
| | | RP ff | ff | COLON.1 | | wait stat |
| 29. Liver biopsy | (ER) | OR ff | ff | sch tx | | SCHEDULER |
| | (ADM) | OR 37688 | 37757 | cnfrm | MV PR | SCHEDULER |
| | (HS) | OR ff | ff | sch tx | | SCHEDULER |
| | | SH 41599 | 41918 | clock | MV RMD | CONTINUE |
| | | RP ff | ff | BIOP.1 | | wait stat |
| 30. Endoscopy | (ER) | OR ff | ff | sch tx | | SCHEDULER |
| | (ADM) | OR 37688 | 37757 | cnfrm | MV PR | SCHEDULER |
| | (HS) | OR ff | ff | sch tx | | SCHEDULER |
| | | SH 39235 | 39509 | clock | MV RMD | CONTINUE |
| | | RP 29510 | 39635 | ENDOS.1 | | ws/interp |
| 31. Abdominal | (ER) | OR ff | ff | sch tx | | SCHEDULER |
| CT scan | (ADM) | OR 37688 | 37757 | cnfrm | MV PR | SCHEDULER |
| | (HS) | OR ff | ff | sch tx | | SCHEDULER |
| | | SH 40759 | 41238 | clock | MV PR | CONTINUE |
| | | RP 53669 | 53669 | CAT.1 | | wait stat |
| 32. Upper GI | (ER) | OR ff | ff | sch tx | | SCHEDULER |
| | (ADM) | OR 37688 | 37757 | cnfrm | MV PR | SCHEDULER |
| | (HS) | OR ff | ff | sch tx | | SCHEDULER |
| | | SH none | | | | |
| | | RP 53667 | 53667 | UGI.1 | | wait stat |

III. DIAGNOSTIC TEST VOCABULARY (CONT'D)

| | | IN | OUT | GRAPHIC | AUDIO | OTHER |
|---|---|---|---|---|---|---|
| 33. Lower GI | (ER) | OR ff | ff | sch tx | | SCHEDULER |
| | (ADM) | OR 37578 | 37626 | cnfrm | MV PR | SCHEDULER |
| | (HS) | OR ff | ff | sch tx | | SCHEDULER |
| | | SH 47255 | 47255 | clock | MV RMD | pause/cor |
| | | RP 53668 | 53668 | LGI.1 | | wait stat |
| 34. NG aspirate | (ER) | OR ff | ff | sch tx | MV NG | SCHEDULER |
| | (ADM) | OR 37578 | 37626 | cnfrm | MV PR | SCHEDULER |
| | (HS) | OR ff | ff | sch tx | | SCHEDULER |
| | | SH 47253 | 47253 | clock | MV RMD | pause/cor |
| | | RP 47252 | 47252 | ASPIR.1 | | wait stat |
| 35. Abdominal | (ER) | ST ff | ff | SONO.1 | | wait stat |
| sonogram | (ADM) | OR 37578 | 37626 | cnfrm | MV PR | SCHEDULER |
| | (HS) | OR ff | ff | sch tx | | SCHEDULER |
| | | SH none | | | | |
| | | RP ff | ff | SONO.1 | | wait sta |
| 36. Alkaline | (ER) | ST ff | ff | ALK.1-2 | | wait sta |
| phosphatase | (ADM) | OR 37578 | 37626 | cnfrm | MV PR | SCHEDULER |
| | (HS) | OR ff | ff | sch tx | | SCHEDULER |
| | | SH none | | | | |
| | | RP ff | ff | ALK.1 | | wait sta |
| 37. SGPT | (ER) | ST ff | ff | SGPT.1 | | wait state |
| | (ADM) | OR 37578 | 37626 | cnfrm | MV PR | SCHEDULER |
| | (HS) | OR ff | ff | sch tx | | SCHEDULER |
| | | SH none | | | | |
| | | RP ff | ff | SGPT.1 | | wait state |
| 38. Bilirubin | (ER) | ST ff | ff | BILR.1 | | wait state |
| | (ADM) | OR 37529 | 37577 | cnfrm | MV PR | SCHEDULER |
| | (HS) | OR ff | ff | sch tx | | SCHEDULER |
| | | SH none | | | | |
| | | RP ff | ff | BILR.1 | | wait state |
| 39. Chem 6 | (ER) | ST ff | ff | CHEM6.1 | | wait state |
| | (ADM) | OR 37529 | 37577 | cnfrm | MV PR | SCHEDULER |

III. DIAGNOSTIC TEST VOCABULARY (CONT'D)

| | | IN | OUT | GRAPHIC | AUDIO | OTHER |
|---|---|---|---|---|---|---|
| | (HS) | OR ff | ff | sch tx | | SCHEDULER |
| | | SH none | | | | |
| | | RP ff | ff | CHEM6.1-4 | | wait state |

V. MANAGEMENT VOCABULARY

| | | | IN | OUT | GRAPHIC | AUDIO | OTHER |
|---|---|---|---|---|---|---|---|
| 1. | IV fluids | (ER) | OR ff | ff | IV TX | MV IV | SCHED (HS) |
| | | (ADM) | OR 37122 | 37158 | confrm | MV PR | SCHED (HS) |
| | | (HS) | OR ff | ff | IV TX | MV IV | SCHED |
| | | | SH none | | | | |
| | | | RP ff | ff | IV.1 | IVRSP | SCHED |
| 2. | NG suction | (ER) | OR ff | ff | NG TX | MV NG | SCHED (HS |
| | | (ADM) | OR 37122 | 37158 | confrm | MV PR | SCHED |
| | | (HS) | OR ff | ff | NG TX | MV NG | SCHED |
| | | | SH 47252 | 47252 | | MV NGSC | |
| | | | RP ff | ff | NGRSP | | |
| 3. | Antacids | (ER) | OR ff | ff | ANT TX | MV ANT | SCHED |
| | | (ADM) | OR 37122 | 37158 | confrm | MV PR | SCHED |
| | | (HS) | OR ff | ff | ANT TX | MV ANT | SCHED |
| | | | SH none | | | | |
| | | | RP ff | ff | ANT.1 | ANTRSP | |
| | (DIS) | (ER) | OR 39174 | 39230 | confrm | MV PR | |
| | | (HS) | OR 52212 | 52258 | confrm | MV PR | |
| 4. | Cimetidine IV | (ER) | OR ff | ff | CIMIV-TX | MV IV | SCHED |
| | | (ADM) | OR 37122 | 37158 | Cnfrm | MV PR | SCHED |
| | | (HS) | OR | | CIMIV-TX | MV CIMIV | SCHED |
| | | | SH | | | | |
| | | | RP | | CIMIV.1 | CIMIVRSP | |
| 5. | Cimetidine PO | (ER) | OR ff | ff | CIMPO-TX | MV CIMPO | SCHED |
| | | (ADM) | OR 37122 | 37158 | Cnfrm | MV PR | SCHED |
| | | (HS) | OR | | CIMPO-TX | MV CIMPO | SCHED |
| | | | SH | | | | |

| V. MANAGEMENT VOCABULARY (CONT'D) | | | IN | OUT | GRAPHIC | AUDIO | OTHER |
|---|---|---|---|---|---|---|---|
| | | | RP | | CIMPO.1 | CIMPORSP | |
| | (DIS) | ER | OR | | Cnfrm | | |
| | | HS | OR | | | | |
| 6. Bed rest | (ER) | | OR ff | ff | BRSP | | SCHED |
| | (ADM) | | OR 37122 | 37158 | MV BR | Confrm | SCHED |
| | (HS) | | OR ff | ff | BR TX | | SCHED |
| | | | SH NONE | | | | |
| | | | RP ff | ff | BRSP.1 | | |
| | (DIS) | ER | OR 39174 | 39230 | Confrm | MV PR | |
| | | HS | OR 52212 | 52258 | Confrm | MV PR | |
| 7. Oxygen | (ER) | | OR ff | ff | OXY TX | MV OXY | SCHED |
| | (ADM) | | OR 37268 | 37340 | Confirm | MV CIMPO | SCHED |
| | (HS) | | OR | | OXY TX | MV OXY | SCHED |
| | | | SH none | | | | |
| | | | RP | | OXY.1 | oxyrsp | |
| 8. Frequent vital | (ER) | | OR ff | ff | FVX TX | MV FVS | SCHED |
| | (ADM) | | OR 37268 | 37340 | Cnfrm | MV PR | SCHED |
| | (HS) | | OR | | FVS TX | MV FVS | SCHED |
| | | | SH | | | | |
| | | | RP | | FVS.1 | FVSRSP | |
| 9. Frequent urine output | (ER) | | OR ff | ff | FUD TX | MV FUD | SCHED |
| | (ADM) | | OR 37268 | 37340 | Cnfrm | MV PR | SCHED |
| | (HS) | | OR | | FUD TX | MV FUD | SCHED |
| | | | SH | | | | |
| | | | RP | | FUD.1 | FUDRSP | |
| 10. Demerol | (ER) | | OR ff | ff | DEM TX | MV DEM | SCHED |
| | (ADM) | | OR 37341 | 37397 | Cnfrm | MV PR | SCHED |
| | (HS) | | OR | | DEM TX | MV DEM | SCHED |
| | | | SH | | | | |
| | | | RP | | DEM.1 | DEMRSP | |
| | (DIS) | ER | OR | | Cnfrm | | |
| | | HS | OR | | | | |

| V. MANAGEMENT VOCABULARY (CONT'D) | | | | OUT | GRAPHIC | AUDIO | OTHER |
|---|---|---|---|---|---|---|---|
| 11. Surgery | (ER) | | OR ff | ff | SURG TX | MV SURG | SCHED |
| | (ADM) | | OR 37341 | 37397 | Cnfrm | MV PR | SCHED |
| | (HS) | | OR | | SURG TX | MV SURG | SCHED |
| | | | SH | | | | |
| | | | RP | | SURG.1 | SURGRSP | |
| | (DIS) | ER | OR | | Cnfrm | | |
| | | HS | OR | | | | |
| 12. Surgical consult | (ER) | | OR ff | ff | CNSLT.1 | CNSLRSP | |
| | (ADM) | | OR | | Cnfrm | MV PR | SCHED |
| | (HS) | | OR | | CNSLT TX | MV CNSLT | SCHED |
| | | | SH | | | | |
| | | | RP | | CNSLT.1 | CNSLTRSP | |
| | (DIS) | ER | OR | | Cnfrm | | |
| | | HS | OR | | | | |
| 13. Transfusion | (ER) | | OR ff | ff | TRANS TX | MV TRANS | SCHED |
| | (ADM) | | OR 37159 | 37215 | Cnfrm | MV PR | SCHED |
| | (HS) | | OR | | TRANS TX | MV TRANS | SCHED |
| | | | SH | | | | |
| | | | RP | | TRANS.1 | TRANSRSP | |
| 14. Alcohol counseling | (ER) | | OR ff | ff | ALCO TX | MV ALCO | SCHED |
| | (ADM) | | OR 37159 | 37215 | Cnfrm | MV PR | SCHED |
| | (HS) | | OR | | ALCO TX | MV ALCO | SCHED |
| | | | SH | | | | |
| | | | RP | | ALCO.1 | ALCORSP | |
| | (DIS) | ER | OR | | Cnfrm | | |
| | | HS | OR | | | | |
| 15. Nutrition counseling | (ER) | | OR ff | ff | NUTR TX | MV NUTR | SCHED |
| | (ADM) | | OR 37159 | 37215 | Cnfrm | MV PR | SCHED |
| | (HS) | | OR | | NUTR TX | MV NUTR | SCHED |
| | | | SH | | | | |
| | | | RP | | NUTR.1 | NUTRRSP | |
| | (DIS) | ER | OR | | Cnfrm | | |
| | | HS | OR | | | | |

| V. MANAGEMENT VOCABULARY (CONT'D) | | | IN | OUT | GRAPHIC | AUDIO | OTHER |
|---|---|---|---|---|---|---|---|
| 16. Psycho. | (ER) | | OR ff | ff | PSYC TX | MV PSYC | SCHED |
| counseling | (ADM) | | OR 37216 | 37267 | Cnfrm | MV PR | SCHED |
| | (HS) | | OR | | PSYC TX | MV PSYC | SCHED |
| | | | SH | | | | |
| | | | RP | | PSYC.1 | PSYCRSP | |
| | (DIS) | ER | OR | | Cnfrm | | |
| | | HS | OR | | | | |
| 17. Family | (ER) | | OR ff | ff | FAM TX | MV TX | SCHED |
| counseling | (ADM) | | OR 37216 | 37267 | Cnfrm | MV PR | SCHED |
| | (HS) | | OR | | FAM TX | MV FAM | SCHED |
| | | | SH | | | | |
| | | | RP | | FAM.1 | FAMRSP | |
| | (DIS) | ER | OR | | Cnfrm | | |
| | | HS | OR | | | | |
| 18. Bland diet | (ER) | | OR ff | ff | DIET TX | MV TX | SCHED |
| | (ADM) | | OR 37216 | 37267 | Cnfrm | MV PR | SCHED |
| | (HS) | | OR | | DIET TX | MV DIET | SCHED |
| | | | SH | | | | |
| | | | RP | | DIET.1 | DIETRSP | |
| | (DIS) | ER | OR | | Cnfrm | | |
| | | HS | OR | | | | |
| 19. Librium | (ER) | | OR ff | ff | LIB TX | MV LIB | SCHED |
| | (ADM) | | OR 37341 | 37397 | Cnfrm | MV PR | SCHED |
| | (HS) | | OR | | LIB TX | MV LIB | SCHED |
| | | | SH | | | | |
| | | | RP | | LIB.1 | LIBRSP | |
| | (DIS) | ER | OR | | Cnfrm | | |
| | | HS | OR | | | | |
| 20. Close medical | (DIS) | ER | OR | | Cnfrm | | |
| | | HS | OR | | | | |

| V. MANAGEMENT VOCABULARY (CONT'D) | | | IN | OUT | GRAPHIC | AUDIO | OTHER |
|---|---|---|---|---|---|---|---|
| 21. Thiamine | (ER) | | OR ff | ff | THIA TX | MV THIA | SCHED |
| | (ADM) | | OR 37341 | 37397 | Cnfrm | MV PR | SCHED |
| | (HS) | | OR ff | ff | THIA TX | MV THIA | SCHED |
| | | | SH none | | | | |
| | | | RP ff | ff | THIA.1 | THIARSP | |
| | (DIS) | ER | OR | | Cnfrm | | |
| | | HS | OR | | Cnfrm | | |
| 22. NPO | (ER) | | OR ff | ff | NPO TX | MV NPO | SCHED |
| | (ADM) | | OR 37341 | 37397 | Cnfrm | MV PR | SCHED |
| | (HS) | | OR ff | ff | NPO TX | MV NPO | SCHED |
| | | | SH none | | | | |
| | | | RP ff | ff | NPO.1 | NPORSP | |

| VII. SYSTEM WORDS | | IN | OUT | GRAPHIC | AUDIO | OTHER |
|---|---|---|---|---|---|---|
| 1. | Begin | 00030 | 04235 | | | wait stat |
| 2. | Finished | ER 43349 | 45713 | | | |
| | | HS 44878 | 47243 | | | |
| 3. | Feedback | ER 40071 | 40071 | | | |
| | | HS 52374 | 52374 | | | |
| 4. | Credits | ER 43349 | 45713 | | | |
| | | HS 44878 | 47243 | | | |
| 5. | End the case | Shuts down sys...ret to DOS | | | | |
| 6. | Stop | ff | ff | | | wait sta |
| 7. | Continue | See Intelligent Continue Stmt descr. | | | | |
| 8. | Sound | Activate Track 1... | | | | |
| 9. | Quiet | Shut down both tracks... | | | | |
| 10. | Admit the patient | 37122 | 37481 | | MV Msg | See ADM |
| 11. | (Schedule) a procedure | ff | ff | | MV Msg | See HS |
| 12. | (Talk) to Mr. Hall | ER 31639 | 31688 | | | See HS |
| 13. | (Examine) the patient | ff | ff | | MV Msg | See ER/H |

VII. SYSTEM WORDS CONT'D) | IN | OUT | GRAPHIC | AUDIO | OTHER
---|---|---|---|---|---
14. (Manage) the patient | ff | ff | | MV Msg | See ER/HS
15. Morning | Br to middle seg of next morning... | | | |
16. Afternoon | Br to middle seg of next afternoon... | | | |
17. Evening | Br to middle seg of next evening... | | | |
18. Night | Br to middle seg of next night... | | | |
19. Results | ff | ff | | MV Msg |
20. Status | ff | ff | | MV Msg |
21. Discharge the patient | ER 39174 | 39540 | | MV TI | See DIS
 | HS 52212 | 52575 | | MV TI | See DIS
22. Outcome (ER) | 1) 40481 | 40970 | | T1 | See DIS
 | 2) 40481 | 40970 | | T2 | See DIS
 | 3) 43018 | 43348 | | MV Compr |
 (HS) | 1) 41919 | 43522 | | T1 | See DIS
 | 2) 41919 | 43522 | | T2 | See DIS
 | 3) 41919 | 43054 | | | Br 43523
 | 43523 | 43854 | | T1 |
23. Instruction | ER 45760 | 53546 | | | Neuro Ex
 | HS 48709 | 50900 | | | Heart EX
24. Thoughts | ff | ff | | MV Compr |
25. Interpretation (ER) | 41180 | 42219 | | MV TI | ENDOS
 (HS) | 39635 | 40674 | | MV TI | ENDOS
26. Probability | Not developed yet... | | | |
27. Yes | | | | |
28. No | | | | |
29. Mistake | Delete last entry in tracking... | | | |
30. Try again | Not developed yet... | | | |

DISCHARGE THE PATIENT
(FROM EXAMINATION ROOM) (Disc 1)

| | IN | OUT | GRAPHIC | AUDIO | OTHER |
|---|---|---|---|---|---|
| 1. State your final diagnoses ... | 39174 | 39540 | | T1 | |

| DISCHARGE THE PATIENT (FROM EXAMINATION ROOM) | IN | OUT | GRAPHIC | AUDIO | OTHER |
|---|---|---|---|---|---|
| more? | a) 39174 | 39230 | | T2 | |
| more? | b) 39231 | 39283 | | T2 | |
| more? | c) 39284 | 39328 | | T2 | |
| more? | d) 39329 | 39387 | | T2 | |
| more? | e) 39388 | 39454 | | T2 | |
| ok! | f) 39455 | 39540 | | T2 | BR 39541 |
| 2. FH responds to diagones ... | 39541 | 39655 | | | BR 39656 |
| 3. State your discharge plan ... | 39656 | 39991 | | T1 | |
| more? | a) 39656 | 39708 | | T2 | |
| more? | b) 39709 | 39765 | | T2 | |
| more? | c) 39766 | 39816 | | T2 | |
| more? | d) 39817 | 39877 | | T2 | |
| more? | e) 39878 | 39944 | | T2 | |
| ok! | f) 39945 | 39991 | | T2 | BR 39996 |
| 4. FH responds to discharge plan ... | 39996 | 40493 | | | wait sta· |
| 5. "Outcome" | 1) 40481 | 40970 | | MV OT | wait sta· |
| | 2) 40481 | 40803 | | T2 | wait sta· |
| | 3) 43018 | 43348 | | T1 | wait sta· |

Alternate response by FH ... requires compressed audio

| | | | | | |
|---|---|---|---|---|---|
| Mx 1 | 39996 | 40061 | | MR PR | |
| Mx 2 | 40062 | 40145 | | MV PR | |
| Mx 3 | 40146 | 40272 | | MV PR | |
| Mx 4 | 40273 | 40337 | | MV PR | |
| Mx 5 | 40338 | 40393 | | MV PR | |
| Mx 6 | 40394 | 40480 | | MV PR | |
| Mx n | ff | ff | | MV PR | |

DISCHARGE THE PATIENT
(FROM HOSPITAL) (Disc 2)

| | | IN | OUT | GRAPHIC | AUDIO | OTHER |
|---|---|---|---|---|---|---|
| 1. | State your final diagnoses ... | 52212 | 52575 | | T1 | |
| | more? a) | 52212 | 52258 | | T2 | |
| | more? b) | 52259 | 52309 | | T2 | |
| | more? c) | 52310 | 52361 | | T2 | |
| | more? d) | 52362 | 52427 | | T2 | |
| | more? e) | 52428 | 52487 | | T2 | |
| | ok! f) | 52488 | 52540 | | T2 | BR 52576 |
| 2. | FH responds ... | 52576 | 52804 | | | BR 52810 |
| 3. | State your discharge plan ... | 52810 | 53035 | | T1 | BR 52212 |
| | more? a) | 52212 | 52258 | | T2 | |
| | more? b) | 52259 | 52309 | | T2 | |
| | more? c) | 52310 | 52361 | | T2 | |
| | more? d) | 52363 | 52427 | | T2 | |
| | more? e) | 52428 | 52487 | | T2 | |
| | ok! f) | 52488 | 52540 | | T2 | BR 52576 |
| 4. | FH responds | 52576 | 52804 | | | wait sta' |
| 5. | "Outcome" 1) | 41919 | 43522 | | T1 | wait sta' |
| | 2) | 41919 | 43054 | | MV OT | wait sta' |
| | 3) | 41989 | 43054 | | | -- 43523 |
| | | 43523 | 43854 | | MV C* | |

OUTCOME

Hospital

| CRISIS TRAVELING SCENES | IN | OUT | GRAPHICS | AUDIO | OTHER INFO |
|---|---|---|---|---|---|
| 1. FH asleep..RNG..a hit... | 00050 | 02041 | | MV SU | Br-Cmd/Prob Occur A or B |

(Probability Occurrence A: NO HELP)

2. Harry calls Nurse who listens..    02042    02336    blue tx    MV FB    case ends (Probability Occurrence B: NURSE HELPS)

3. Harry calls Nurse who lifts FH..    02678    03051                        ff/Br 04775

(Command Intervention: USER HELPS)

4. User calls nurse for help..    47894    48708                        ff/Br 04775
   Command Words:
   Nurse!
   Emergency!
   Help in 317!
   Code Blue!

III. Hospital Stay (HS) Section o   Involves traveling scenes through a possible seven day hospital stay with a probable crisis, which adds two extra days.

o   Diagnostic tests, physical examination and management procedures may be requested at any time by user.

o   A clock is initiated to keep track of the four parts of the day (morning, afternoon, evening and night).

o   Results of tests ordered and status of patient may be requested at any time.

o   A crisis may occur depending on the comparison of a randomly generated number to a probability value. Should there be a match, a branch is made to the crisis (CR) section.

o  User must decide when to "discharge" patient. At this time there is a branch to Discharge (DIS) section.

| III. DIAGNOSTIC TEST VOCABULARY | | IN | OUT | GRAPHIC | AUDIO | OTHER |
|---|---|---|---|---|---|---|
| 1. Amylase | (ER) | ST ff | ff | AMY.1 | | wait state |
| | (ADM) | OR 37483 | 37528 | cnfrm | MV PR | SCHEDULER |
| | (HS) | OR ff | ff | sch tx | | SCHEDULER |
| | | SH none | | | | |
| | | RP ff | ff | AMY.1-6 | | wait state |
| 2. Lipase | (ER) | ST ff | ff | LIP.1 | | wait state |
| | (ADM) | OR 37529 | 37577 | cnfrm | MV PR | SCHEDULER |
| | (HS) | OR ff | ff | sch tx | | SCHEDULER |
| | | SH none | | | | |
| | | RP ff | ff | LIP.1-2 | | wait state |
| 3. Serum electrolytes | (ER) | ST ff | ff | LYTE.1 | | wait state |
| | (ADM) | OR 37578 | 37626 | cnfrm | MV PR | SCHEDULER |
| | (HS) | OR ff | ff | sch tx | | SCHEDULER |
| | | SH none | | | | |
| | | RP ff | ff | LYTE.1-4 | | wait state |
| 4. PT | (ER) | ST ff | ff | PT.1 | | wait state |
| | (ADM) | OR 37627 | 37687 | cnfrm | MV PR | SCHEDULER |
| | (HS) | OR ff | ff | sch tx | | wait state |
| | | SH none | | | | |
| | | RP ff | ff | PT.1-2 | | wait state |
| 5. PTT | (ER) | ST ff | ff | PTT.1 | | wait state |
| | (ADM) | OR 37688 | 37757 | cnfrm | MV PR | SCHEDULER |
| | (HS) | OR ff | ff | sch tx | | SCHEDULER |
| | | SH none | | | | |
| | | RP ff | ff | PTT.1 | | wait state |

| | | | 99 | | 100 | | |
|---|---|---|---|---|---|---|---|
| 6. | CBC | (ER) | ST ff | ff | CBC.1 | | wait state |
| | | (ADM) | OR 37483 | 37528 | cnfrm | MV PR | SCHEDULER |
| | | (HS) | OR ff | ff | sch tx | | SCHEDULER |
| | | | SH vampire scene | | clock | MV ACK | CONTINUE |
| | | | RP ff | ff | CBC.1-4 | | wait state |
| 7. | Hemoglobin | (ER) | ST ff | ff | HEMO.1 | | wait state |
| | | (ADM) | OR 37529 | 37577 | cnfrm | MV PR | SCHEDULER |
| | | (HS) | OR ff | ff | sch tx | | SCHEDULER |
| | | | SH none | | | | |
| | | | RP ff | ff | HEMO.1-4 | | wait state |
| 8. | Hematocrit | (ER) | ST ff | ff | HEMAT.1 | | wait state |
| | | (ADM) | OR 37578 | 37626 | cnfrm | MV PR | SCHEDULER |
| | | (HS) | OR ff | ff | sch tx | | SCHEDULER |
| | | | SH none | | | | |
| | | | RP ff | ff | HEMAT.1-4 | | wait state |
| 9 | Platelet count | (ER) | ST ff | ff | PLAT.1 | | wait state |
| | | (ADM) | SH 37529 | 37577 | cnfrm | MV PR | SCHEDULER |
| | | (HS) | OR ff | ff | sch tx | | SCHEDULER |
| | | | SH none | | | | |
| | | | RP ff | ff | PLAT.1 | | wait stat |
| 10. | VDRL | (ER) | ST ff | ff | VDRL.1 | | wait state |
| | | (ADM) | OR 37627 | 37687 | cnfrm | MV PR | SCHEDULER |
| | | (HS) | OR ff | ff | sch tx | | SCHEDULER |
| | | | SH 47256 | 47256 | clock | MV RMD | CONTINUE |
| | | | RP ff | ff | VDRL.1 | | wait state |
| 11. | RBC indices | (ER) | ST ff | ff | RBC.1 | | wait state |
| | | (ADM) | OR 37627 | 37687 | cnfrm | MV PR | SCHEDULER |
| | | (HS) | OR ff | ff | sch tx | | SCHEDULER |
| | | | SH none | | | | |
| | | | RP ff | ff | RBC.1 | | wait state |
| 12. | Coagulation panel | (ER) | ST ff | ff | COAG.1 | | wait state |
| | | (ADM) | OR 37627 | 37687 | cnfrm | MV PR | SCHEDULER |
| | | (HS) | OR ff | ff | sch tx | | SCHEDULER |

| | 101 | | | | 102 | | |
|---|---|---|---|---|---|---|---|
| | | | SH none | | | | |
| | | | RP ff | ff | COAG.1-2* | | wait state |
| 13. | Sputum | (ER) | ST ff | ff | SPUT.1 | | wait stat |
| | culture | (ADM) | OR 37627 | 37687 | cnfrm | MV PR | SCHEDULER |
| | | (HS) | OR ff | ff | sch tx | | SCHEDULER |
| | | | SH none | | | | |
| | | | RP ff | ff | SPUT.1 | | wait stat |
| 14. | Acid-fast | (ER) | ST ff | ff | ACID.1 | | wait state |
| | smear | (ADM) | OR 37529 | 37577 | cnfrm | MV PR | SCHEDULER |
| | | (HS) | OR ff | ff | sch tx | | SCHEDULER |
| | | | SH none | | | | |
| | | | RP ff | ff | ACID.1 | | wait state |
| 15. | Blood gases | (ER) | ST ff | ff | GAS.1 | | wait stat |
| | | (ADM) | OR 37529 | 37577 | cnfrm | MV PR | SCHEDULER |
| | | (HS) | OR ff | ff | shc tx | | SCHEDULER |
| | | | SH none | | | | |
| | | | RP ff | ff | GAS.1-2 | | wait stat |
| 16. | Blood alcohol | (ER) | ST ff | ff | ETOH.1 | | wait stat |
| | | (ADM) | OR 37529 | 37577 | cnfrm | MV PR | SCHEDULER |
| | | (HS) | OR ff | ff | sch tx | | SCHEDULER |
| | | | SH none | | | | |
| | | | RP ff | ff | ETOH.1 | | wait stat |
| 17. | Serum folate | (ER) | ST ff | ff | FOLIC.1 | | wait stat |
| | | (ADM) | OR 37529 | 37577 | cnfrm | MV PR | SCHEDULER |
| | | (HS) | OR ff | ff | sch tx | | SCHEDULER |
| | | | SH none | | | | |
| | | | RP ff | ff | FOLIC.1 | | wait stat |
| 18. | Serum B12 | (ER) | ST ff | ff | B12.1 | | wait stat |
| | | (ADM) | OR 37529 | 37577 | cnfrm | MV PR | SCHEDULER |
| | | (HS) | OR ff | ff | sch tx | | SCHEDULER |
| | | | SH none | | | | |
| | | | RP ff | ff | B12.1 | | wait stat |

|   |   | 103 |   |   | 104 |   |   |
|---|---|---|---|---|---|---|---|
| 19. | Type and | (ER) | ST ff | ff | CROSS.1 |  | wait stat |
|  | cross match | (ADM) | OR 37627 | 37687 | cnfrm | MV PR | SCHEDULER |
|  |  | (HS) | OR ff | ff | sch tx |  | SCHEDULER |
|  |  |  | SH none |  |  |  |  |
|  |  |  | RP ff | ff | CROSS.1 |  | wait stat |
| 20. | Type and | (ER) | ST ff | ff | SCREEN.1 |  | wait stat |
|  | screen/Type | (ADM) | OR 37627 | 37687 | cnfrm | MV PR | SCHEDULER |
|  | and hold | (HS) | OR ff | ff | sch tx |  | SCHEDULER |
|  |  |  | SH none |  |  |  |  |
|  |  |  | RP ff | ff | SCREEN.1 |  | wait stat |
| 21. | Liver | (ER) | ST ff | ff | LIVER.1 |  | wait stat |
|  | function | (ADM) | OR 37627 | 37687 | cnfrm | MV PR | SCHEDULER |
|  |  | (HS) | OR ff | ff | sch tx |  | SHCEDULER |
|  |  |  | SH 47248 | 47248 |  | MV RMD |  |
|  |  |  | RP ff | ff | LIVER.1-5 |  | wait stat |
| 22. | Chem 17 | (ER) | ST ff | ff | CHEM17.1 |  | wait stat |
|  |  | (ADM) | OR 37627 | 37687 | cnfrm | MV PR | SCHEDULER |
|  |  | (HS) | OR ff | ff | sch tx |  | SCHEDULER |
|  |  |  | SH none |  |  |  |  |
|  |  |  | RP ff | ff | CHEM17.1-5 |  | wait sta |
| 23. | Urinalysis | (ER) | ST ff | ff | UA.1 |  | wait sta |
|  |  | (ADM) | OR 37627 | 37687 | cnfrm | MV PR | CHEDULE |
|  |  | (HS) | OR ff | ff | sch tx |  | SCHEDULE |
|  |  |  | SH none |  |  |  |  |
|  |  |  | RP ff | ff | UA.1 |  | wait sta |
| 24. | EKG | (ER) | ST ff | ff | EKG.1 |  | wait stat |
|  |  | (ADM) | OR 37483 | 37528 | cnfrm | MV PR | SCHEDULER |
|  |  | (HS) | OR ff | ff | sch tx |  | SCHEDULER |
|  |  |  | SH none |  |  |  |  |
|  |  |  | RP ff | ff | EKG.1-2* |  | wait stat |
| 25. | Echocardiogram | (ER) | ST ff | ff | ECHO.1 |  | wait stat |
|  |  | (ADM) | OR 37483 | 37528 | cnfrm | MV PR | SCHEDULER |
|  |  | (HS) | OR ff | ff | sch tx |  | SCHEDULER |

|     |     |     |     |     |     |     |     |
| --- | --- | --- | --- | --- | --- | --- | --- |
|     |     |     | SH none |     |     |     |     |
|     |     |     | RP ff | ff | ECHO.1 |     | wait stat |
| 26. | Chest x-ray | (ER) | ST 45755 | 45755 | CXR.1 |     | wait stat |
|     |     | (ADM) | OR 37483 | 37528 | cnfrm | MV PR | SCHEDULER |
|     |     | (HS) | OR ff | ff | sch tx |     | SCHEDULER |
|     |     |     | SH none |     |     |     |     |
|     |     |     | RP $&@¢¢ | $&@¢¢ | CXR.1 |     | wait stat |
| 27. | Abdominal | (ER) | ST 45756 | 45756 | ABXR.1 |     | wait stat |
|     | x-ray | (ADM) | OR 37483 | 37528 | cnfrm | MV PR | SCHEDULER |
|     |     | (HS) | OR ff | ff | sch tx |     | SCHEDULER |
|     |     |     | SH 38861 | 39234 | clock | MV RMD | CONTINUE |
|     |     |     | RP ff | ff | ABXR.1 |     | wait stat |
| 28. | Colonoscopy | (ER) | OR ff | ff | sch tx |     | SCHEDULER |
|     |     | (ADM) | OR 37688 | 37757 | cnfrm | MV PR | SCHEDULER |
|     |     | (HS) | OR ff | ff | sch tx |     | SCHEDULER |
|     |     |     | SH 38238 | 38238 | clock | MV RMD | CONTINUE |
|     |     |     | RP ff | ff | COLON.1 |     | wait stat |
| 29. | Liver biopsy | (ER) | OR ff | ff | sch tx |     | SCHEDULER |
|     |     | (ADM) | OR 37688 | 37757 | cnfrm | MV PR | SCHEDULER |
|     |     | (HS) | OR ff | ff | sch tx |     | SCHEDULER |
|     |     |     | SH 41599 | 41918 | clock | MV RMD | CONTINUE |
|     |     |     | RP ff | ff | BIOP.1 |     | wait stat |
| 30. | Endoscopy | (ER) | OR ff | ff | sch tx |     | SCHEDULER |
|     |     | (ADM) | OR 37688 | 37757 | cnfrm | MV PR | SCHEDULER |
|     |     | (HS) | OR ff | ff | sch tx |     | SCHEDULER |
|     |     |     | SH 39235 | 39509 | clock | MV RMD | CONTINUE |
|     |     |     | RP 29510 | 39635 | ENDOS.1 |     | ws/interp |
| 31. | Abdominal | (ER) | OR ff | ff | sch tx |     | SCHEDULER |
|     | CT scan | (ADM) | OR 37688 | 37757 | cnfrm | MV PR | SCHEDULER |
|     |     | (HS) | OR ff | ff | sch tx |     | SCHEDULER |
|     |     |     | SH 40759 | 41238 | clock | MV PR | CONTINUE |
|     |     |     | RP 53669 | 53669 | CAT.1 |     | wait stat |

| | | | | | | | |
|---|---|---|---|---|---|---|---|
| 32. | Upper GI | (ER) | OR ff | ff | sch tx | | SCHEDULER |
| | | (ADM) | OR 37688 | 37757 | cnfrm | MV PR | SCHEDULER |
| | | (HS) | OR ff | ff | sch tx | | SCHEDULER |
| | | | SH none | | | | |
| | | | RP 53667 | 53667 | UGI.1 | | wait stat |
| 33. | Lower GI | (ER) | OR ff | ff | sch tx | | SCHEDULER |
| | | (ADM) | OR 37578 | 37626 | cnfrm | MV PR | SCHEDULER |
| | | (HS) | OR ff | ff | sch tx | | SCHEDULER |
| | | | SH 47255 | 47255 | clock | MV RMD | pause/cor |
| | | | RP 53668 | 53668 | LGI.1 | | wait stat |
| 34. | NG aspirate | (ER) | OR ff | ff | sch tx | MV NG | SCHEDULER |
| | | (ADM) | OR 37578 | 37626 | cnfrm | MV PR | SCHEDULER |
| | | (HS) | OR ff | ff | sch tx | | SCHEDULER |
| | | | SH 47253 | 47253 | clock | MV RMD | pause/cor |
| | | | RP 47252 | 47252 | ASPIR.1 | | wait stat |
| 35. | Abdominal | (ER) | ST ff | ff | SONO.1 | | wait stat |
| | sonogram | (ADM) | OR 37578 | 37626 | cnfrm | MV PR | SCHEDULER |
| | | (HS) | OR ff | ff | sch tx | | SCHEDULER |
| | | | SH none | | | | |
| | | | RP ff | ff | SONO.1 | | wait sta |
| 36. | Alkaline | (ER) | ST ff | ff | ALK.1-2 | | wait sta |
| | phosphatase | (ADM) | OR 37578 | 37626 | cnfrm | MV PR | SCHEDULER |
| | | (HS) | OR ff | ff | sch tx | | SCHEDULER |
| | | | SH none | | | | |
| | | | RP ff | ff | ALK.1 | | wait sta |
| 37. | SGPT | (ER) | ST ff | ff | SGPT.1 | | wait state |
| | | (ADM) | OR 37578 | 37626 | cnfrm | MV PR | SCHEDULER |
| | | (HS) | OR ff | ff | sch tx | | SCHEDULER |
| | | | SH none | | | | |
| | | | RP ff | ff | SGPT.1 | | wait state |
| 38. | Bilirubin | (ER) | ST ff | ff | BILR.1 | | wait state |
| | | (ADM) | OR 37529 | 37577 | cnfrm | MV PR | SCHEDULER |

|     |         |       | 109    |        |          | 110      |        |            |
|-----|---------|-------|--------|--------|----------|----------|--------|------------|
|     |         | (HS)  | OR ff  | ff     |          | sch tx   |        | SCHEDULER  |
|     |         |       | SH none|        |          |          |        |            |
|     |         |       | RP ff  | ff     |          | BILR.1   |        | wait state |
| 39. | Chem 6  | (ER)  | ST ff  | ff     |          | CHEM6.1  |        | wait state |
|     |         | (ADM) | OR 37529| 37577 |          | cnfrm    | MV PR  | SCHEDULER  |
|     |         | (HS)  | OR ff  | ff     |          | sch tx   |        | SCHEDULER  |
|     |         |       | SH none|        |          |          |        |            |
|     |         |       | RP ff  | ff     |          | CHEM6.1-4|        | wait state |

PR = prompt  
OR = order test  
SH = show scene

RP = report result  
RMD = remind  
Ack = acknowledge

| V. | MANAGEMENT VOCABULARY | | IN | OUT | GRAPHIC | AUDIO | OTHER |
|----|----|----|----|----|----|----|----|
| 1. | IV fluids | (ER)  | OR ff    | ff    | IV TX   | MV IV   | SCHED (HS) |
|    |           | (ADM) | OR 37122 | 37158 | confrm  | MV PR   | SCHED (HS) |
|    |           | (HS)  | OR ff    | ff    | IV TX   | MV IV   | SCHED |
|    |           |       | SH none  |       |         |         |       |
|    |           |       | RP ff    | ff    | IV.1    | IVRSP   | SCHED |
| 2. | NG suction | (ER)  | OR ff    | ff    | NG TX   | MV NG   | SCHED (HS) |
|    |            | (ADM) | OR 37122 | 37158 | confrm  | MV PR   | SCHED |
|    |            | (HS)  | OR ff    | ff    | NG TX   | MV NG   | SCHED |
|    |            |       | SH 47252 | 47252 |         | MV NGSC |       |
|    |            |       | RP ff    | ff    | NGRSP   |         |       |
| 3. | Antacids  | (ER)  | OR ff    | ff    | ANT TX  | MV ANT  | SCHED |
|    |           | (ADM) | OR 37122 | 37158 | confrm  | MV PR   | SCHED |
|    |           | (HS)  | OR ff    | ff    | ANT TX  | MV ANT  | SCHED |
|    |           |       | SH none  |       |         |         |       |
|    |           |       | RP ff    | ff    | ANT.1   | ANTRSP  |       |
|    | (DIS)     | (ER)  | OR 39174 | 39230 | confrm  | MV PR   |       |
|    |           | (HS)  | OR 52212 | 52258 | confrm  | MV PR   |       |

| | | 111 | | | 112 | | |
|---|---|---|---|---|---|---|---|
| 4. Cimetidine IV | (ER) | | OR ff | ff | CIMIV-TX | MV IV | SCHED |
| | (ADM) | | OR 37122 | 37158 | Cnfrm | MV PR | SCHED |
| | (HS) | | OR | | CIMIV-TX | MV CIMIV | SCHED |
| | | | SH | | | | |
| | | | RP | | CIMIV.1 | CIMIVRSP | |
| 5. Cimetidine PO | (ER) | | OR ff | ff | CIMPO-TX | MV CIMPO | SCHED |
| | (ADM) | | OR 37122 | 37158 | Cnfrm | MV PR | SCHED |
| | (HS) | | OR | | CIMPO-TX | MV CIMPO | SCHED |
| | | | SH | | | | |
| | | | RP | | CIMPO.1 | CIMPORSP | |
| | (DIS) | ER | OR | | Cnfrm | | |
| | | HS | OR | | | | |
| 6. Bed rest | (ER) | | OR ff | ff | BRSP | | SCHED |
| | (ADM) | | OR 37122 | 37158 | MV BR | Confrm | SCHED |
| | (HS) | | OR ff | ff | BR TX | | SCHED |
| | | | SH NONE | | | | |
| | | | RP ff | ff | BRSP.1 | | |
| | (DIS) | ER | OR 39174 | 39230 | Confrm | MV PR | |
| | | HS | OR 52212 | 52258 | Confrm | MV PR | |
| 7. Oxygen | (ER) | | OR ff | ff | OXY TX | MV OXY | SCHED |
| | (ADM) | | OR 37268 | 37340 | Confirm | MV CIMPO | SCHED |
| | (HS) | | OR | | OXY TX | MV OXY | SCHED |
| | | | SH none | | | | |
| | | | RP | | OXY.1 | oxyrsp | |
| 8. Frequent vital | (ER) | | OR ff | ff | FVX TX | MV FVS | SCHED |
| | (ADM) | | OR 37268 | 37340 | Cnfrm | MV PR | SCHED |
| | (HS) | | OR | | FVS TX | MV FVS | SCHED |
| | | | SH | | | | |
| | | | RP | | FVS.1 | FVSRSP | |
| 9. Frequent | (ER) | | OR ff | ff | FUD TX | MV FUD | SCHED |
| urine output | (ADM) | | OR 37268 | 37340 | Cnfrm | MV PR | SCHED |
| | (HS) | | OR | | FUD TX | MV FUD | SCHED |
| | | | SH | | | | |
| | | | RP | | FUD.1 | FUDRSP | |

|     |     |     |     |     |     |     |     |     |
| --- | --- | --- | --- | --- | --- | --- | --- | --- |
|     |     |     | 113 |     |     |     | 114 |     |
| 10. | Demerol | (ER) |     | OR ff | ff | DEM TX | MV DEM | SCHED |
|     |     | (ADM) |     | OR 37341 | 37397 | Cnfrm | MV PR | SCHED |
|     |     | (HS) |     | OR |     | DEM TX | MV DEM | SCHED |
|     |     |     |     | SH |     |     |     |     |
|     |     |     |     | RP |     | DEM.1 | DEMRSP |     |
|     |     | (DIS) | ER  | OR  |     | Cnfrm |     |     |
|     |     |     | HS  | OR  |     |     |     |     |
| 11. | Surgery | (ER) |     | OR ff | ff | SURG TX | MV SURG | SCHED |
|     |     | (ADM) |     | OR 37341 | 37397 | Cnfrm | MV PR | SCHED |
|     |     | (HS) |     | OR |     | SURG TX | MV SURG | SCHED |
|     |     |     |     | SH |     |     |     |     |
|     |     |     |     | RP |     | SURG.1 | SURGRSP |     |
|     |     | (DIS) | ER  | OR  |     | Cnfrm |     |     |
|     |     |     | HS  | OR  |     |     |     |     |
| 12. | Surgical | (ER) |     | OR ff | ff | CNSLT.1 | CNSLRSP |     |
|     | consult | (ADM) |     | OR |     | Cnfrm | MV PR | SCHED |
|     |     | (HS) |     | OR |     | CNSLT TX | MV CNSLT | SCHED |
|     |     |     |     | SH |     |     |     |     |
|     |     |     |     | RP |     | CNSLT.1 | CNSLTRSP |     |
|     |     | (DIS) | ER  | OR  |     | Cnfrm |     |     |
|     |     |     | HS  | OR  |     |     |     |     |
| 13. | Transfusion | (ER) |     | OR ff | ff | TRANS TX | MV TRANS | SCHED |
|     |     | (ADM) |     | OR 37159 | 37215 | Cnfrm | MV PR | SCHED |
|     |     | (HS) |     | OR |     | TRANS TX | MV TRANS | SCHED |
|     |     |     |     | SH |     |     |     |     |
|     |     |     |     | RP |     | TRANS.1 | TRANSRSP |     |
| 14. | Alcohol | (ER) |     | OR ff | ff | ALCO TX | MV ALCO | SCHED |
|     | counseling | (ADM) |     | OR 37159 | 37215 | Cnfrm | MV PR | SCHED |
|     |     | (HS) |     | OR |     | ALCO TX | MV ALCO | SCHED |
|     |     |     |     | SH |     |     |     |     |
|     |     |     |     | RP |     | ALCO.1 | ALCORSP |     |
|     |     | (DIS) | ER  | OR  |     | Cnfrm |     |     |
|     |     |     | HS  | OR  |     |     |     |     |

|     |                     | 115   |    |          |       | 116      |          |       |
| --- | ------------------- | ----- | -- | -------- | ----- | -------- | -------- | ----- |
| 15. | Nutrition           | (ER)  |    | OR ff    | ff    | NUTR TX  | MV NUTR  | SCHED |
|     | counseling          | (ADM) |    | OR 37159 | 37215 | Cnfrm    | MV PR    | SCHED |
|     |                     | (HS)  |    | OR       |       | NUTR TX  | MV NUTR  | SCHED |
|     |                     |       |    | SH       |       |          |          |       |
|     |                     |       |    | RP       |       | NUTR.1   | NUTRRSP  |       |
|     |                     | (DIS) | ER | OR       |       | Cnfrm    |          |       |
|     |                     |       | HS | OR       |       |          |          |       |
| 16. | Psycho.             | (ER)  |    | OR ff    | ff    | PSYC TX  | MV PSYC  | SCHED |
|     | counseling          | (ADM) |    | OR 37216 | 37267 | Cnfrm    | MV PR    | SCHED |
|     |                     | (HS)  |    | OR       |       | PSYC TX  | MV PSYC  | SCHED |
|     |                     |       |    | SH       |       |          |          |       |
|     |                     |       |    | RP       |       | PSYC.1   | PSYCRSP  |       |
|     |                     | (DIS) | ER | OR       |       | Cnfrm    |          |       |
|     |                     |       | HS | OR       |       |          |          |       |
| 17. | Family              | (ER)  |    | OR ff    | ff    | FAM TX   | MV TX    | SCHED |
|     | counseling          | (ADM) |    | OR 37216 | 37267 | Cnfrm    | MV PR    | SCHED |
|     |                     | (HS)  |    | OR       |       | FAM TX   | MV FAM   | SCHED |
|     |                     |       |    | SH       |       |          |          |       |
|     |                     |       |    | RP       |       | FAM.1    | FAMRSP   |       |
|     |                     | (DIS) | ER | OR       |       | Cnfrm    |          |       |
|     |                     |       | HS | OR       |       |          |          |       |
| 18. | Bland diet          | (ER)  |    | OR ff    | ff    | DIET TX  | MV TX    | SCHED |
|     |                     | (ADM) |    | OR 37216 | 37267 | Cnfrm    | MV PR    | SCHED |
|     |                     | (HS)  |    | OR       |       | DIET TX  | MV DIET  | SCHED |
|     |                     |       |    | SH       |       |          |          |       |
|     |                     |       |    | RP       |       | DIET.1   | DIETRSP  |       |
|     |                     | (DIS) | ER | OR       |       | Cnfrm    |          |       |
|     |                     |       | HS | OR       |       |          |          |       |
| 19. | Librium             | (ER)  |    | OR ff    | ff    | LIB TX   | MV LIB   | SCHED |
|     |                     | (ADM) |    | OR 37341 | 37397 | Cnfrm    | MV PR    | SCHED |
|     |                     | (HS)  |    | OR       |       | LIB TX   | MV LIB   | SCHED |
|     |                     |       |    | SH       |       |          |          |       |

| 117 | | | | | 118 | | |
|---|---|---|---|---|---|---|---|
| | | RP | | | LIB.1 | LIBRSP | |
| | (DIS) ER | OR | | | Cnfrm | | |
| | HS | OR | | | | | |
| 20. Close medical (DIS) ER | | OR | | | Cnfrm | | |
| | HS | OR | | | | | |
| | | | | | | | |
| 21. Thiamine (ER) | | OR | ff | ff | THIA TX | MV THIA | SCHED |
| (ADM) | | OR | 37341 | 37397 | Cnfrm | MV PR | SCHED |
| (HS) | | OR | ff | ff | THIA TX | MV THIA | SCHED |
| | | SH | none | | | | |
| | | RP | ff | ff | THIA.1 | THIARSP | |
| (DIS) ER | | OR | | | Cnfrm | | |
| | HS | OR | | | Cnfrm | | |
| | | | | | | | |
| 22. NPO (ER) | | OR | ff | ff | NPO TX | MV NPO | SCHED |
| (ADM) | | OR | 37341 | 37397 | Cnfrm | MV PR | SCHED |
| (HS) | | OR | ff | ff | NPO TX | MV NPO | SCHED |
| | | SH | none | | | | |
| | | RP | ff | ff | NPO.1 | NPORSP | |

| II. PHYSICAL EXAM VOCABULARY | | IN | OUT | GRAPHICS | AUDIO | OTHER |
|---|---|---|---|---|---|---|
| 1. General | (ER) | 36885 | 37121 | app tx | | |
| appearance | (HS) | 47254 | 47254 | app tx | | |
| 2. Vital signs | (ER) | ff | ff | vs tbl | | |
| | (HS) | | | | | |
| | (CR) | | | | | |
| 3. HEENT | (ER) | 35206 | 35343 | hent tx | | |
| | (HS) | 50901 | 51043 | " | | |
| 4. Neck | (ER) | 35344 | 35437 | neck tx | | |
| | (HS) | 51044 | 51137 | " | | |
| 5. Extremities | (ER) | 36879 | 36879 | extr tx | | |
| | (HS) | 52211 | 52211 | " | | |

|     |              |      | 119   | | 120     |           |
| --- | ------------ | ---- | ----- | ----- | ------- | --------- |
| 6.  | Skin         | (ER) | 36880 | 36880 | skin tx |           |
|     |              | (HS) | 47259 | 47259 |         |           |
| 7.  | Hands        | (ER) | 36311 | 36879 |         |           |
|     |              | (HS) | 52011 | 52211 |         |           |
| 8.  | Abdomen      | (ER) | 36205 | 36205 | bely tx |           |
|     |              | (HS) | 47257 | 47257 | "       |           |
| 9.  | Chest        | (ER) | 35438 | 35438 | ches tx |           |
|     | and lungs    | (HS) | 51138 | 51138 | "       |           |
| 10. | Heart        | (ER) | 45738 | 45738 | hart tx |           |
|     |              | (HS) | ff    | ff    |         |           |
| 11. | Neurological | (ER) | 35440 | 35590 |         |           |
|     |              | (HS) | 51140 | 51290 |         |           |
| 12. | Lymph nodes  | (ER) | 35439 | 35439 | lymp tx |           |
|     |              | (HS) | 51139 | 51139 | "       |           |
| 13. | Musculo-     | (ER) | ff    | ff    | bone tx |           |
|     | skeletal     | (HS) | ff    | ff    | "       |           |
| 14. | Back         | (ER) | 36310 | 36310 | back tx |           |
|     |              | (HS) | 52010 | 52010 |         |           |
| 15. | Genitourinary| (ER) | 45737 | 45737 | guri tx |           |
|     | system       | (HS) | ff    | ff    |         |           |
| 16. | Rectal exam  | (ER) | 45744 | 45744 | rect tx |           |
|     |              | (HS) | 47262 | 47262 |         |           |
| 17. | Proctoscopy  | (ER) | ff    | ff    | sch tx  | SCHEDULER |
|     |              | (HS) | 47263 | 47263 |         |           |
| 18. | Finger-to-nose | (ER) | 35591 | 36309 |       |           |
|     |              | (HS) | 52191 | 52009 |         |           |
| 19. | Sclera       | (ER) | 35206 | 35343 | sclr tx |           |
|     |              | (HS) | 50901 | 51043 |         |           |

5,006,987

| 121 HOSPITAL STAY TRAVEL SCENES | IN | OUT | 122 GRAPHIC | AUDIO | OTHER |
|---|---|---|---|---|---|
| DAY 1 | | | | | |
| Morning (period) | 20224 | 22175 | | | |
| Afternoon | 22176 | 22972 | | | |
| Evening | 22973 | 23678 | | | |
| Night | 24107 | 24379 | | | |
| DAY 2 | | | | | |
| Morning | 24380 | 24853 | | | |
| " | 23679 | 24106 | | | |
| Afternoon | 24854 | 26495 | | | |
| Evening | 29129 | 29862 | | | |
| " | 26747 | 27930 | | | |
| Night | 26496 | 26746 | | | |
| " | 28020 | 28190 | | | |
| DAY 3 | | | | | |
| Morning | 28230 | 28510 | | | |
| " | 28511 | 28728 | | | |
| " | 28729 | 28928 | | | |
| Afternoon | 28929 | 29100 | | | |
| " | 36892 | 37090 | | | |
| " | 30149 | 30413 | | | |
| Evening/Night | 30431 | 31103 | | | |
| DAY 4 | | | | | |
| Morning | 31104 | 31303 | | | |
| Afternoon | 31304 | 31685 | | | |
| Evening/Night | 31686 | 32040 | | | |
| " | 32041 | 32349 | | | |
| " | 32350 | 32465 | | | |
| " | 32466 | 32647 | | | |
| DAY 5 | | | | | |
| Morning | 32648 | 32944 | | | |
| Afternoon | 32945 | 33294 | | | |
| Evening/Night | 33295 | 33536 | | | |

*2 scenes/period for first 3 period's; 1 scene for per. 4.*

DAY 6

| | | |
|---|---|---|
| Morning | 33537 | 33766 |
| Aft/Even/Night | 33767 | 33974 |

DAY 7

| | | |
|---|---|---|
| Morn/Aft/Even/Night | 33975 | 34484 |

VII. SYSTEM WORDS

| | | IN | OUT | GRAPHIC | AUDIO | OTHER |
|---|---|---|---|---|---|---|
| 1. | Begin | 00030 | 04235 | | | wait stat |
| 2. | Finished | ER 43349 | 45713 | | | |
| | | HS 44878 | 47243 | | | |
| 3. | Feedback | ER 40071 | 40071 | | | |
| | | HS 52374 | 52374 | | | |
| 4. | Credits | ER 43349 | 45713 | | | |
| | | HS 44878 | 47243 | | | |
| 5. | End the case | Shuts down sys...ret to DOS | | | | |
| 6. | Stop | ff | ff | | | wait stat |
| 7. | Continue | See Intelligent Continue Stmt descr. | | | | |
| 8. | Sound | Activate Track 1... | | | | |
| 9. | Quiet | Shut down both tracks... | | | | |
| 10. | Admit the patient | 37122 | 37481 | | MV Msg | See ADM |
| 11. | (Schedule) a procedure | ff | ff | | MV Msg | See HS |
| 12. | (Talk) to Mr. Hall | ER 31639 | 31688 | | | See HS |
| 13. | (Examine) the patient | ff | ff | | MV Msg | See ER/HS |
| 14. | (Manage) the patient | ff | ff | | MV Msg | See ER/HS |
| 15. | Morning | Br to middle seg of next morning... | | | | |
| 16. | Afternoon | Br to middle seg of next afternoon... | | | | |
| 17. | Evening | Br to middle seg of next evening... | | | | |
| 18. | Night | Br to middle seg of next night... | | | | |
| 19. | Results | ff | ff | | MV Msg | |
| 20. | Status | ff | ff | | MV Msg | |
| 21. | Discharge the patient | ER 39174 | 39540 | | MV TI | See DIS |
| | | HS 52212 | 52575 | | MV TI | See DIS |

| | | | | | | |
|---|---|---|---|---|---|---|
| 22. Outcome | (ER) | 1) 40481 | 40970 | T1 | See DIS | |
| | | 2) 40481 | 40970 | T2 | See DIS | |
| | | 3) 43018 | 43348 | MV Compr | | |
| | (HS) | 1) 41919 | 43522 | T1 | See DIS | |
| | | 2) 41919 | 43522 | T2 | See DIS | |
| | | 3) 41919 | 43054 | | Br 43523 | |
| | | 43523 | 43854 | T1 | | |
| 23. Instruction | | ER 45760 | 53546 | | Neuro Ex | |
| | | HS 48709 | 50900 | | Heart EX | |
| 24. Thoughts | | ff | ff | MV Compr | | |
| 25. Interpretation | (ER) | 41180 | 42219 | MV TI | ENDOS | |
| | (HS) | 39635 | 40674 | MV TI | ENDOS | |
| 26. Probability | | Not developed yet... | | | | |
| 27. Yes | | | | | | |
| 28. No | | | | | | |
| 29. Mistake | | Delete last entry in tracking... | | | | |
| 30. Try again | | Not developed yet... | | | | |

DISCHARGE THE PATIENT        IN  OUT   GRAPHIC   AUDIO   OTHER
(FROM EXAMINATION ROOM) (Disc 1)

| | | | | | |
|---|---|---|---|---|---|
| 1. | State your final diagnoses ... | 39174 | 39540 | T1 | |
| | more? | a) 39174 | 39230 | T2 | |
| | more? | b) 39231 | 39283 | T2 | |
| | more? | c) 39284 | 39328 | T2 | |
| | more? | d) 39329 | 39387 | T2 | |
| | more? | e) 39388 | 39454 | T2 | |
| | ok! | f) 39455 | 39540 | T2 | BR 39541 |
| 2. | FH responds to diagones ... | 39541 | 39655 | | BR 39656 |

|   |   |   |   |   |   |
|---|---|---|---|---|---|
| 3. | State your discharge plan ... | 39656 | 39991 | T1 |   |
|   | more? | a) 39656 | 39708 | T2 |   |
|   | more? | b) 39709 | 39765 | T2 |   |
|   | more? | c) 39766 | 39816 | T2 |   |
|   | more? | d) 39817 | 39877 | T2 |   |
|   | more? | e) 39878 | 39944 | T2 |   |
|   | ok! | f) 39945 | 39991 | T2 | BR 39996 |
| 4. | FH responds to discharge plan ... | 39996 | 40493 |   | wait sta· |
| 5. | "Outcome" | 1) 40481 | 40970 | MV OT | wait sta· |
|   |   | 2) 40481 | 40803 | T2 | wait sta· |
|   |   | 3) 43018 | 43348 | T1 | wait sta· |

Alternate response by FH ... requires compressed audio

|   |   |   |   |
|---|---|---|---|
| Mx 1 | 39996 | 40061 | MR PR |
| Mx 2 | 40062 | 40145 | MV PR |
| Mx 3 | 40146 | 40272 | MV PR |
| Mx 4 | 40273 | 40337 | MV PR |
| Mx 5 | 40338 | 40393 | MV PR |
| Mx 6 | 40394 | 40480 | MV PR |
| Mx n | ff | ff | MV PR |

| DISCHARGE THE PATIENT (FROM HOSPITAL) (Disc 2) | IN | OUT | GRAPHIC | AUDIO | OTHER |
|---|---|---|---|---|---|
| 1. State your final diagnoses ... | 52212 | 52575 |   | T1 |   |
| more? | a) 52212 | 52258 |   | T2 |   |
| more? | b) 52259 | 52309 |   | T2 |   |
| more? | c) 52310 | 52361 |   | T2 |   |
| more? | d) 52362 | 52427 |   | T2 |   |
| more? | e) 52428 | 52487 |   | T2 |   |
| ok! | f) 52488 | 52540 |   | T2 | BR 52576 |

| | | | | | | |
|---|---|---|---|---|---|---|
| 2. | FH responds ... | | 52576 | 52804 | | BR 52810 |
| 3. | State your discharge plan ... | | 52810 | 53035 | T1 | BR 52212 |
| | more? | a) | 52212 | 52258 | T2 | |
| | more? | b) | 52259 | 52309 | T2 | |
| | more? | c) | 52310 | 52361 | T2 | |
| | more? | d) | 52363 | 52427 | T2 | |
| | more? | e) | 52428 | 52487 | T2 | |
| | ok! | f) | 52488 | 52540 | T2 | BR 52576 |
| 4. | FH responds | | 52576 | 52804 | | wait stat |
| 5. | "Outcome" | 1) | 41919 | 43522 | T1 | wait sta· |
| | | 2) | 41919 | 43054 | MV OT | wait sta· |
| | | 3) | 41989 | 43054 | | ·· 43523 |
| | | | 43523 | 43854 | MV C· | |

OUTCOME

Hospital

| CRISIS TRAVELING SCENES | IN | OUT | GRAPHICS | AUDIO | OTHER INFO |
|---|---|---|---|---|---|
| 1. FH asleep..RNG..a hit... | 00050 | 02041 | | MV SU | Br-Cmd/Prob Occur A or B |

(Probability Occurrence A: NO HELP)

| | | | | | |
|---|---|---|---|---|---|
| 2. Harry calls Nurse who listens.. | 02042 | 02336 | blue tx | MV FB | case ends |

(Probability Occurrence B: NURSE HELPS)

| | | | | | |
|---|---|---|---|---|---|
| 3. Harry calls Nurse who lifts FH.. | 02678 | 03051 | | | ff/Br 04775 |

(Command Intervention: USER HELPS)

4. User calls nurse for help..         47894    48708                                ff/Br 04775

Command Words:

Nurse!

Emergency!

Help in 317!

Code Blue!

IV. Crisis (CR) Section o   Crisis occurrence is determined by comparison of random number to the predetermined probability level.

o   Crisis situation triggers a 3-1 minute clock which runs continuously for ten real minutes (30 simulated minutes). The clock runs through wait states.

o   A wait state ends after 30 simulated seconds and the next scene begins.

o   Crisis vocabulary is fixed so that no switching occurs after the crisis vocabulary subset is downloaded.

o   After 30 simulated minutes, the program branches to the crisis traveling scenes and the clock reverts to the four parts of the day.

o   After the second day post crisis, program branches to HS traveling scenes -- unless user forces a discharge, at which time program branches to DIS.

| VI. CRISIS VOCABULARY | IN | OUT | GRAPHICS | AUDIO | OTHER INFO |
|---|---|---|---|---|---|
| (Cursory Physical Exam) | | | | | |
| 1. Vital signs | 14819 | 14970 | | | 80/40 50 thr |
|    "   " | a) 14971 | 15232 | | | 80/40 50 |
|    "   " | b) 15233 | 15433 | | | 90/50 100 |

|   |   |   |   |   |   |   |
|---|---|---|---|---|---|---|
| " " | c) | 13915 | 14010 | vs tx | | w/o gown,wild |
| " " | d) | 11869 | 12222 | vs tx | | w/gown...calm |
| 2. Extremities | | 13299 | 13521 | | | Tina head |
| 3. Neck | | 17051 | 17144 | | | Tina responds |
| 4. Skin | | 13522 | 13662 | | | Tina responds |
| 5. Abdomen | | 11111 | 11236 | | | Tina responds |
| 6. Pain | | 10879 | 10974 | | | Tina asks |
| 7. Circulation | | 16591 | 17025 | | | Tina responds |
| 8. What have you eaten? | | 20044 | 20223 | | | FH responds |
| 9. How are you feeling? | | 19492 | 20043 | | | FH responds |
| | a) | 19365 | 19492 | | | FH responds |
| 10. Is the airway clear? | | 03127 | 03340 | | | Tina looks |

(Immediate Diagnostic Tests)

|   |   |   |   |   |   |
|---|---|---|---|---|---|
| 11. CBC | 18164 | 18471 | cbc tx | | Tina calls |
| 12. Hemoglobin | 16058 | 16539 | H&H tx | | Tina calls |
| 13. Hematocrit | 16058 | 16539 | H&H tx | | Tina calls |
| 14. Serum electrolytes | 16591 | 16880 | ser tx | | Tina calls |

(Management)

|   |   |   |   |   |   |
|---|---|---|---|---|---|
| 15. IV fluids | 17175 | 17518 | | | Tina calls |
| 16. NG suction | 19058 | 19092 | sch tx | | SCHEDULER |
| 17. Antacids | 19058 | 19092 | ant tx | | Tina responds |
| 18. Cimetidine, IV | 18930 | 19037 | cim tx | | Tina responds |
| 19. Oxygen | 15466 | 16000 | sch tx | | SCHEDULER |
| 20. Frequent vitals | 18798 | 18849 | | | SCHEDULER |
| 21. Frequent urine output | 18850 | 18899 | | | SCHEDULER |
| 22. Demerol | 18485 | 18602 | | MV NO | ck w/super |
| 23. Librium | 18930 | 19037 | lib tx | | Tina responds |
| 24. Bland diet | 19058 | 19092 | nut tx | | Tina responds |
| 25. Transfusion | 17746 | 18125 | sch tx | | SCHEDULER |
| 26. Surgical consult | 14668 | 14818 | | | SCHEDULER |
| 27. Endoscopy | 13020 | 13167 | sch tx | MV OK | SCHEDULER |
| 28. Upper GI | 13020 | 13167 | sch tx | MV OK | SCHEDULER |

|     | 135                         |      |       | 136 |       |              |
| --- | --------------------------- | ---- | ----- | --- | ----- | ------------ |
| 29. | Valium/Sedatives            | 14529 | 14667 |     | MV NO | ck w/super   |
| 30. | Endotracheal tube           | 18607 | 18779 |     |       | BR SEG 14011 |
|     | a)                          | 14011 | 14528 |     | MV NO | bkgr laughter |
| 31. | Surgery                     | 13020 | 13167 |     | MV NO | ck w/super   |

| CRISIS AFTERMATH TRAVELING SCENES | IN | OUT | GRAPHICS | AUDIO | OTHER INFO |
| --- | --- | --- | --- | --- | --- |
| 1. FH coughing..Tina gets towels | 04775 | 05221 | | | ff/clk runs |
| 2. Can you do anything? | 03578 | 03694 | | | ff/clk runs |
| 3. FH cold..Tina crosses | 13663 | 13914 | | | ff/clk runs |
| 4. Take gown, check neck | 05222 | 05482 | | | ff/clk runs |
| 5. Wild eyed FH gets scared | 03353 | 03518 | | | ff/clk runs |
| 6. Harry pops in..excuse me Dr. | 05483 | 06153 | | | ff/clk runs |
| 7. FH...am I dying? | 03519 | 03577 | | | ff/clk runs |
| 8. Tina wants new gown | 06154 | 06445 | | | ff/clk runs |
| 9. Tina will stay... | 07388 | 07624 | | | ff/clk runs |
| 10. FH can't have a drink | 07625 | 07984 | | | ff/clk runs |
| 11. Tina talks to FH | 07985 | 08347 | | | ff/clk runs |
| 12. Include the Dr. | 10079 | 10878 | | | ff/clk runs |
| 13. Tina takes BP..talks to FH | 12182 | 12977 | | | ff/clk runs |
| 14. FH silly grin..Tina talks | 11237 | 11606 | | | ff/clk runs |
| 15. FH has fast heart beat | 04709 | 04774 | | | ff/clk runs |
| 16. Tina wants to start IV | 09264 | 09347 | | | ff/clk runs |
| 17. Tina starts the IV... | 09348 | 10078 | | | ff/gro clk, Er 34485 |

| POST CRISIS TRAVELING SCENES | IN | OUT | GRAPHICS | AUDIO | OTHER INFO |
| --- | --- | --- | --- | --- | --- |

DAY 1

| | | IN | OUT | GRAPHICS | | |
| --- | --- | --- | --- | --- | --- | --- |
| 1. | Morning | 34485 | 34728 | cl | | |
| 2. | Afternoon | 34729 | 34991 | cl | | |
| 3. | Evening/Night | 34992 | 35162 | cl | | |
| 4. | " | 35163 | 35483 | | | |
| 5. | " | 36294 | 36592 | cl | | |

DAY 2

| | | | | |
|---|---|---|---|---|
| 6. | Morning | 38074 | 38237 | cl |
| 7. | Afternoon | 35757 | 35935 | cl |
| 8. | Evening | 35936 | 36054 | cl |
| 9. | Night | 36055 | 36293 | cl |

DAY 3

| | | | | |
|---|---|---|---|---|
| 10. | Morning | 36593 | 36891 | cl |
| 11. | " | 37091 | 37640 | cl |
| 12. | " | 37641 | 38073 | cl |

| III. DIAGNOSTIC VOCABULARY | | IN | OUT | GRAPHIC | AUDIO | OTHER |
|---|---|---|---|---|---|---|
| 1. Amylase | (ER) | ST ff | ff | AMY.1 | | wait state |
| | (ADM) | OR 37483 | 37528 | cnfrm | MV PR | SCHEDULER |
| | (HS) | OR ff | ff | sch tx | | SCHEDULER |
| | | SH none | | | | |
| | | RP ff | ff | AMY.1-6 | | wait state |
| 2. Lipase | (ER) | ST ff | ff | LIP.1 | | wait state |
| | (ADM) | OR 37529 | 37577 | cnfrm | MV PR | SCHEDULER |
| | (HS) | OR ff | ff | sch tx | | SCHEDULER |
| | | SH none | | | | |
| | | RP ff | ff | LIP.1-2 | | wait state |
| 3. Serum electrolytes | (ER) | ST ff | ff | LYTE.1 | | wait state |
| | (ADM) | OR 37578 | 37626 | cnfrm | MV PR | SCHEDULER |
| | (HS) | OR ff | ff | sch tx | | SCHEDULER |
| | | SH none | | | | |
| | | RP ff | ff | LYTE.1-4 | | wait state |
| 4. PT | (ER) | ST ff | ff | PT.1 | | wait state |
| | (ADM) | OR 37627 | 37687 | cnfrm | MV PR | SCHEDULER |
| | (HS) | OR ff | ff | sch tx | | wait state |

|  |  |  |  |  |  |  |  |
|---|---|---|---|---|---|---|---|
|  |  |  | SH none |  |  |  |  |
|  |  |  | RP ff | ff | PT.1-2 |  | wait state |
| 5. | PTT | (ER) | ST ff | ff | PTT.1 |  | wait state |
|  |  | (ADM) | OR 37688 | 37757 | cnfrm | MV PR | SCHEDULER |
|  |  | (HS) | OR ff | ff | sch tx |  | SCHEDULER |
|  |  |  | SH none |  |  |  |  |
|  |  |  | RP ff | ff | PTT.1 |  | wait state |
| 6. | CBC | (ER) | ST ff | ff | CBC.1 |  | wait state |
|  |  | (ADM) | OR 37483 | 37528 | cnfrm | MV PR | SCHEDULER |
|  |  | (HS) | OR ff | ff | sch tx |  | SCHEDULER |
|  |  |  | SH vampire scene |  | clock | MV ACK | CONTINUE |
|  |  |  | RP ff | ff | CBC.1-4 |  | wait state |
| 7. | Hemoglobin | (ER) | ST ff | ff | HEMO.1 |  | wait state |
|  |  | (ADM) | OR 37529 | 37577 | cnfrm | MV PR | SCHEDULER |
|  |  | (HS) | OR ff | ff | sch tx |  | SCHEDULER |
|  |  |  | SH none |  |  |  |  |
|  |  |  | RP ff | ff | HEMO.1-4 |  | wait state |
| 8. | Hematocrit | (ER) | ST ff | ff | HEMAT.1 |  | wait state |
|  |  | (ADM) | OR 37578 | 37626 | cnfrm | MV PR | SCHEDULER |
|  |  | (HS) | OR ff | ff | sch tx |  | SCHEDULER |
|  |  |  | SH none |  |  |  |  |
|  |  |  | RP ff | ff | HEMAT.1-4 |  | wait state |
| 9. | Platelet | (ER) | ST ff | ff | PLAT.1 |  | wait state |
|  | count | (ADM) | SH 37529 | 37577 | cnfrm | MV PR | SCHEDULER |
|  |  | (HS) | OR ff | ff | sch tx |  | SCHEDULER |
|  |  |  | SH none |  |  |  |  |
|  |  |  | RP ff | ff | PLAT.1 |  | wait stat |
| 10. | VDRL | (ER) | ST ff | ff | VDRL.1 |  | wait state |
|  |  | (ADM) | OR 37627 | 37687 | cnfrm | MV PR | SCHEDULER |
|  |  | (HS) | OR ff | ff | sch tx |  | SCHEDULER |
|  |  |  | SH 47256 | 47256 | clock | MV RMD | CONTINUE |
|  |  |  | RP ff | ff | VDRL.1 |  | wait state |
| 11. | RBC indices | (ER) | ST ff | ff | RBC.1 |  | wait state |

|     |                   |       | 141     |       |          |       |           |
|-----|-------------------|-------|---------|-------|----------|-------|-----------|
|     |                   | (ADM) | OR 37627| 37687 | cnfrm    | MV PR | SCHEDULER |
|     |                   | (HS)  | OR ff   | ff    | sch tx   |       | SCHEDULER |
|     |                   |       | SH none |       |          |       |           |
|     |                   |       | RP ff   | ff    | RBC.1    |       | wait state |
| 12. | Coagulation       | (ER)  | ST ff   | ff    | COAG.1   |       | wait state |
|     | panel             | (ADM) | OR 37627| 37687 | cnfrm    | MV PR | SCHEDULER |
|     |                   | (HS)  | OR ff   | ff    | sch tx   |       | SCHEDULER |
|     |                   |       | SH none |       |          |       |           |
|     |                   |       | RP ff   | ff    | COAG.1-2* |      | wait state |
| 13. | Sputum            | (ER)  | ST ff   | ff    | SPUT.1   |       | wait state |
|     | culture           | (ADM) | OR 37627| 37687 | cnfrm    | MV PR | SCHEDULER |
|     |                   | (HS)  | OR ff   | ff    | sch tx   |       | SCHEDULER |
|     |                   |       | SH none |       |          |       |           |
|     |                   |       | RP ff   | ff    | SPUT.1   |       | wait state |
| 14. | Acid-fast         | (ER)  | ST ff   | ff    | ACID.1   |       | wait state |
|     | smear             | (ADM) | OR 37529| 37577 | cnfrm    | MV PR | SCHEDULER |
|     |                   | (HS)  | OR ff   | ff    | sch tx   |       | SCHEDULER |
|     |                   |       | SH none |       |          |       |           |
|     |                   |       | RP ff   | ff    | ACID.1   |       | wait state |
| 15. | Blood gases       | (ER)  | ST ff   | ff    | GAS.1    |       | wait state |
|     |                   | (ADM) | OR 37529| 37577 | cnfrm    | MV PR | SCHEDULER |
|     |                   | (HS)  | OR ff   | ff    | shc tx   |       | SCHEDULER |
|     |                   |       | SH none |       |          |       |           |
|     |                   |       | RP ff   | ff    | GAS.1-2  |       | wait stat |
| 16. | Blood alcohol     | (ER)  | ST ff   | ff    | ETOH.1   |       | wait stat |
|     |                   | (ADM) | OR 37529| 37577 | cnfrm    | MV PR | SCHEDULER |
|     |                   | (HS)  | OR ff   | ff    | sch tx   |       | SCHEDULER |
|     |                   |       | SH none |       |          |       |           |
|     |                   |       | RP ff   | ff    | ETOH.1   |       | wait stat |
| 17. | Serum folate      | (ER)  | ST ff   | ff    | FOLIC.1  |       | wait stat |
|     |                   | (ADM) | OR 37529| 37577 | cnfrm    | MV PR | SCHEDULER |
|     |                   | (HS)  | OR ff   | ff    | sch tx   |       | SCHEDULER |
|     |                   |       | SH none |       |          |       |           |

|     |                          |       |           |       |            |       |           |
|-----|--------------------------|-------|-----------|-------|------------|-------|-----------|
|     |                          |       | RP ff     | ff    | FOLIC.1    |       | wait stat |
| 18. | Serum B12                | (ER)  | ST ff     | ff    | B12.1      |       | wait stat |
|     |                          | (ADM) | OR 37529  | 37577 | cnfrm      | MV PR | SCHEDULER |
|     |                          | (HS)  | OR ff     | ff    | sch tx     |       | SCHEDULER |
|     |                          |       | SH none   |       |            |       |           |
|     |                          |       | RP ff     | ff    | B12.1      |       | wait stat |
| 19. | Type and cross match     | (ER)  | ST ff     | ff    | CROSS.1    |       | wait stat |
|     |                          | (ADM) | OR 37627  | 37687 | cnfrm      | MV PR | SCHEDULER |
|     |                          | (HS)  | OR ff     | ff    | sch tx     |       | SCHEDULER |
|     |                          |       | SH none   |       |            |       |           |
|     |                          |       | RP ff     | ff    | CROSS.1    |       | wait stat |
| 20. | Type and screen/Type and hold | (ER)  | ST ff     | ff    | SCREEN.1   |       | wait stat |
|     |                          | (ADM) | OR 37627  | 37687 | cnfrm      | MV PR | SCHEDULER |
|     |                          | (HS)  | OR ff     | ff    | sch tx     |       | SCHEDULER |
|     |                          |       | SH none   |       |            |       |           |
|     |                          |       | RP ff     | ff    | SCREEN.1   |       | wait stat |
| 21. | Liver function           | (ER)  | ST ff     | ff    | LIVER.1    |       | wait stat |
|     |                          | (ADM) | OR 37627  | 37687 | cnfrm      | MV PR | SCHEDULER |
|     |                          | (HS)  | OR ff     | ff    | sch tx     |       | SHCEDULER |
|     |                          |       | SH 47248  | 47248 |            | MV RMD |          |
|     |                          |       | RP ff     | ff    | LIVER.1-5  |       | wait stat |
| 22. | Chem 17                  | (ER)  | ST ff     | ff    | CHEM17.1   |       | wait stat |
|     |                          | (ADM) | OR 37627  | 37687 | cnfrm      | MV PR | SCHEDULER |
|     |                          | (HS)  | OR ff     | ff    | sch tx     |       | SCHEDULER |
|     |                          |       | SH none   |       |            |       |           |
|     |                          |       | RP ff     | ff    | CHEM17.1-5 |       | wait stat |
| 23. | Urinalysis               | (ER)  | ST ff     | ff    | UA.1       |       | wait stat |
|     |                          | (ADM) | OR 37627  | 37687 | cnfrm      | MV PR | SCHEDULER |
|     |                          | (HS)  | OR ff     | ff    | sch tx     |       | SCHEDULER |
|     |                          |       | SH none   |       |            |       |           |
|     |                          |       | RP ff     | ff    | UA.1       |       | wait stat |
| 24. | EKG                      | (ER)  | ST ff     | ff    | EKG.1      |       | wait stat |
|     |                          | (ADM) | OR 37483  | 37528 | cnfrm      | MV PR | SCHEDULER |

|     |     |      |          |        |         |       |           |
| --- | --- | ---- | -------- | ------ | ------- | ----- | --------- |
|     |     | (HS) | OR ff    | ff     | sch tx  |       | SCHEDULER |
|     |     |      | SH none  |        |         |       |           |
|     |     |      | RP ff    | ff     | EKG.1-2*|       | wait stat |
| 25. | Echocardiogram | (ER) | ST ff | ff | ECHO.1 |      | wait stat |
|     |     | (ADM)| OR 37483 | 37528  | cnfrm   | MV PR | SCHEDULER |
|     |     | (HS) | OR ff    | ff     | sch tx  |       | SCHEDULER |
|     |     |      | SH none  |        |         |       |           |
|     |     |      | RP ff    | ff     | ECHO.1  |       | wait stat |
| 26. | Chest x-ray | (ER) | ST 45755 | 45755 | CXR.1  |      | wait stat |
|     |     | (ADM)| OR 37483 | 37528  | cnfrm   | MV PR | SCHEDULER |
|     |     | (HS) | OR ff    | ff     | sch tx  |       | SCHEDULER |
|     |     |      | SH none  |        |         |       |           |
|     |     |      | RP $&@¢¢ | $&@¢¢  | CXR.1   |       | wait stat |
| 27. | Abdominal | (ER) | ST 45756 | 45756 | ABXR.1  |      | wait stat |
|     | x-ray | (ADM)| OR 37483 | 37528  | cnfrm   | MV PR | SCHEDULER |
|     |     | (HS) | OR ff    | ff     | sch tx  |       | SCHEDULER |
|     |     |      | SH 38861 | 39234  | clock   | MV RMD| CONTINUE  |
|     |     |      | RP ff    | ff     | ABXR.1  |       | wait stat |
| 28. | Colonoscopy | (ER) | OR ff | ff  | sch tx  |       | SCHEDULER |
|     |     | (ADM)| OR 37688 | 37757  | cnfrm   | MV PR | SCHEDULER |
|     |     | (HS) | OR ff    | ff     | sch tx  |       | SCHEDULER |
|     |     |      | SH 38238 | 38238  | clock   | MV RMD| CONTINUE  |
|     |     |      | RP ff    | ff     | COLON.1 |       | wait stat |
| 29. | Liver biopsy | (ER) | OR ff | ff  | sch tx  |       | SCHEDULER |
|     |     | (ADM)| OR 37688 | 37757  | cnfrm   | MV PR | SCHEDULER |
|     |     | (HS) | OR ff    | ff     | sch tx  |       | SCHEDULER |
|     |     |      | SH 41599 | 41918  | clock   | MV RMD| CONTINUE  |
|     |     |      | RP ff    | ff     | BIOP.1  |       | wait stat |
| 30. | Endoscopy | (ER) | OR ff  | ff    | sch tx  |       | SCHEDULER |
|     |     | (ADM)| OR 37688 | 37757  | cnfrm   | MV PR | SCHEDULER |
|     |     | (HS) | OR ff    | ff     | sch tx  |       | SCHEDULER |
|     |     |      | SH 39235 | 39509  | clock   | MV RMD| CONTINUE  |
|     |     |      | RP 29510 | 39635  | ENDOS.1 |       | ws/interp |

| | | 147 | | | 148 | |
|---|---|---|---|---|---|---|
| 31. Abdominal CT scan | (ER) | OR ff | ff | sch tx | | SCHEDULER |
| | (ADM) | OR 37688 | 37757 | cnfrm | MV PR | SCHEDULER |
| | (HS) | OR ff | ff | sch tx | | SCHEDULER |
| | | SH 40759 | 41238 | clock | MV PR | CONTINUE |
| | | RP 53669 | 53669 | CAT.1 | | wait stat |
| 32. Upper GI | (ER) | OR ff | ff | sch tx | | SCHEDULER |
| | (ADM) | OR 37688 | 37757 | cnfrm | MV PR | SCHEDULER |
| | (HS) | OR ff | ff | sch tx | | SCHEDULER |
| | | SH none | | | | |
| | | RP 53667 | 53667 | UGI.1 | | wait stat |
| 33. Lower GI | (ER) | OR ff | ff | sch tx | | SCHEDULER |
| | (ADM) | OR 37578 | 37626 | cnfrm | MV PR | SCHEDULER |
| | (HS) | OR ff | ff | sch tx | | SCHEDULER |
| | | SH 47255 | 47255 | clock | MV RMD | pause/con |
| | | RP 53668 | 53668 | LGI.1 | | wait stat |
| 34. NG aspirate | (ER) | OR ff | ff | sch tx | MV NG | SCHEDULER |
| | (ADM) | OR 37578 | 37626 | cnfrm | MV PR | SCHEDULER |
| | (HS) | OR ff | ff | sch tx | | SCHEDULER |
| | | SH 47253 | 47253 | clock | MV RMD | pause/con |
| | | RP 47252 | 47252 | ASPIR.1 | | wait stat |
| 35. Abdominal sonogram | (ER) | ST ff | ff | SONO.1 | | wait stat |
| | (ADM) | OR 37578 | 37626 | cnfrm | MV PR | SCHEDULER |
| | (HS) | OR ff | ff | sch tx | | SCHEDULER |
| | | SH none | | | | |
| | | RP ff | ff | SONO.1 | | wait sta |
| 36. Alkaline phosphatase | (ER) | ST ff | ff | ALK.1-2 | | wait sta |
| | (ADM) | OR 37578 | 37626 | cnfrm | MV PR | SCHEDULER |
| | (HS) | OR ff | ff | sch tx | | SCHEDULER |
| | | SH none | | | | |
| | | RP ff | ff | ALK.1 | | wait sta |
| 37. SGPT | (ER) | ST ff | ff | SGPT.1 | | wait state |
| | (ADM) | OR 37578 | 37626 | cnfrm | MV PR | SCHEDULER |
| | (HS) | OR ff | ff | sch tx | | SCHEDULER |

|   |   |   |   |   |   |   |   |
|---|---|---|---|---|---|---|---|
|   |   |   | SH none |   |   |   |   |
|   |   |   | RP ff | ff | SGPT.1 |   | wait state |
| 38. | Bilirubin | (ER) | ST ff | ff | BILR.1 |   | wait state |
|   |   | (ADM) | OR 37529 | 37577 | cnfrm | MV PR | SCHEDULER |
|   |   | (HS) | OR ff | ff | sch tx |   | SCHEDULER |
|   |   |   | SH none |   |   |   |   |
|   |   |   | RP ff | ff | BILR.1 |   | wait state |
| 39. | Chem 6 | (ER) | ST ff | ff | CHEM6.1 |   | wait state |
|   |   | (ADM) | OR 37529 | 37577 | cnfrm | MV PR | SCHEDULER |
|   |   | (HS) | OR ff | ff | sch tx |   | SCHEDULER |
|   |   |   | SH none |   |   |   |   |
|   |   |   | RP ff | ff | CHEM6.1-4 |   | wait state |

| HOSPITAL STAY TRAVELING SCENES | IN | OUT | GRAPHIC | AUDIO | OTHER |
|---|---|---|---|---|---|
| DAY 1 |   |   |   |   |   |
| Morning *(period)* | 20224 | 22175 |   |   |   |
| Afternoon | 22176 | 22972 |   |   |   |
| Evening | 22973 | 23678 |   |   |   |
| Night | 24107 | 24379 |   |   |   |
| DAY 2 |   |   |   |   |   |
| Morning | 24380 | 24853 |   |   |   |
| " | 23679 | 24106 |   |   |   |
| Afternoon | 24854 | 26495 |   |   |   |
| Evening | 29129 | 29862 |   |   |   |
| " | 26747 | 27930 |   |   |   |
| Night | 26496 | 26746 |   |   |   |
| " | 28020 | 28190 |   |   |   |
| DAY 3 |   |   |   |   |   |
| Morning | 28230 | 28510 |   |   |   |
| " | 28511 | 28728 |   |   |   |
| " | 28729 | 28928 |   |   |   |

*(handwritten note: 2 scenes/period for first 3 period; 1 scene for per. 4.)*

|  |  |  |  |  |  |
|---|---|---|---|---|---|
| Afternoon | 28929 | 29100 | | | |
| " | 36892 | 37090 | | | |
| " | 30149 | 30413 | | | |
| Evening/Night | 30431 | 31103 | | | |
| DAY 4 | | | | | |
| Morning | 31104 | 31303 | | | |
| Afternoon | 31304 | 31685 | | | |
| Evening/Night | 31686 | 32040 | | | |
| " | 32041 | 32349 | | | |
| " | 32350 | 32465 | | | |
| " | 32466 | 32647 | | | |
| DAY 5 | | | | | |
| Morning | 32648 | 32944 | | | |
| Afternoon | 32945 | 33294 | | | |
| Evening/Night | 33295 | 33536 | | | |
| DAY 6 | | | | | |
| Morning | 33537 | 33766 | | | |
| Aft/Even/Night | 33767 | 33974 | | | |
| DAY 7 | | | | | |
| Morn/Aft/Even/Night | 33975 | 34484 | | | |

| VII SYSTEM WORDS | IN | OUT | GRAPHIC | AUDIO | OTHER |
|---|---|---|---|---|---|
| 1. Begin | 00030 | 04235 | | | wait stat |
| 2. Finished | ER 43349 | 45713 | | | |
|  | HS 44878 | 47243 | | | |
| 3. Feedback | ER 40071 | 40071 | | | |
|  | HS 52374 | 52374 | | | |
| 4. Credits | ER 43349 | 45713 | | | |
|  | HS 44878 | 47243 | | | |
| 5. End the case | Shuts down sys...ret to DOS | | | | |
| 6. Stop | ff | ff | | | wait stat |
| 7. Continue | See Intelligent Continue Stmt descr. | | | | |

| | | | | | |
|---|---|---|---|---|---|
| 8. | Sound | Activate Track 1... | | | |
| 9. | Quiet | Shut down both tracks... | | | |
| 10. | Admit the patient | 37122 | 37481 | MV Msg | See ADM |
| 11. | (Schedule) a procedure | ff | ff | MV Msg | See HS |
| 12. | (Talk) to Mr. Hall | ER 31639 | 31688 | | See HS |
| 13. | (Examine) the patient | ff | ff | MV Msg | See ER/HS |
| 14. | (Manage) the patient | ff | ff | MV Msg | See ER/HS |
| 15. | Morning | Br to middle seg of next morning... | | | |
| 16. | Afternoon | Br to middle seg of next afternoon... | | | |
| 17. | Evening | Br to middle seg of next evening... | | | |
| 18. | Night | Br to middle seg of next night... | | | |
| 19. | Results | ff | ff | MV Msg | |
| 20. | Status | ff | ff | MV Msg | |
| 21. | Discharge the patient | ER 39174 | 39540 | MV TI | See DIS |
| | | HS 52212 | 52575 | MV TI | See DIS |
| 22. | Outcome (ER) | 1) 40481 | 40970 | T1 | See DIS |
| | | 2) 40481 | 40970 | T2 | See DIS |
| | | 3) 43018 | 43348 | MV Compr | |
| | (HS) | 1) 41919 | 43522 | T1 | See DIS |
| | | 2) 41919 | 43522 | T2 | See DIS |
| | | 3) 41919 | 43054 | | Br 43523 |
| | | 43523 | 43854 | T1 | |
| 23. | Instruction | ER 45760 | 53546 | | Neuro Ex |
| | | HS 48709 | 50900 | | Heart EX |
| 24. | Thoughts | ff | ff | MV Compr | |
| 25. | Interpretation (ER) | 41180 | 42219 | MV TI | ENDOS |
| | (HS) | 39635 | 40674 | MV TI | ENDOS |
| 26. | Probability | Not developed yet... | | | |
| 27. | Yes | | | | |
| 28. | No | | | | |
| 29. | Mistake | Delete last entry in tracking... | | | |
| 30. | Try again | Not developed yet... | | | |

DISCHARGE THE PATIENT
(FROM EXAMINATION ROOM) (Disc 1)

| | | IN | OUT | GRAPHIC | AUDIO | OTHER |
|---|---|---|---|---|---|---|
| 1. | State your final diagnoses ... | | 39174 | 39540 | T1 | |
| | more? | a) | 39174 | 39230 | T2 | |
| | more? | b) | 39231 | 39283 | T2 | |
| | more? | c) | 39284 | 39328 | T2 | |
| | more? | d) | 39329 | 39387 | T2 | |
| | more? | e) | 39388 | 39454 | T2 | |
| | ok! | f) | 39455 | 39540 | T2 | BR 39541 |
| 2. | FH responds to diagones ... | | 39541 | 39655 | | BR 39656 |
| 3. | State your discharge plan ... | | 39656 | 39991 | T1 | |
| | more? | a) | 39656 | 39708 | T2 | |
| | more? | b) | 39709 | 39765 | T2 | |
| | more? | c) | 39766 | 39816 | T2 | |
| | more? | d) | 39817 | 39877 | T2 | |
| | more? | e) | 39878 | 39944 | T2 | |
| | ok! | f) | 39945 | 39991 | T2 | BR 39996 |
| 4. | FH responds to discharge plan ... | | 39996 | 40493 | | wait sta |
| 5. | "Outcome" | 1) | 40481 | 40970 | MV OT | wait sta |
| | | 2) | 40481 | 40803 | T2 | wait sta |
| | | 3) | 40018 | 40348 | T1 | wait sta |

Alternate response by FH ... requires compressed audio

| | | | | | |
|---|---|---|---|---|---|
| Mx 1 | | 39996 | 40061 | MR PR | |
| Mx 2 | | 40062 | 40145 | MV PR | |
| Mx 3 | | 40146 | 40272 | MV PR | |
| Mx 4 | | 40273 | 40337 | MV PR | |

| | | | | | |
|---|---|---|---|---|---|
| Mx 5 | | 40338 | 40393 | | MV PR |
| Mx 6 | | 40394 | 40480 | | MV PR |
| Mx n | | ff | ff | | MV PR |

| DISCHARGE THE PATIENT (FROM HOSPITAL) (Disc 2) | | IN | OUT | GRAPHIC | AUDIO | OTHER | |
|---|---|---|---|---|---|---|---|
| 1. | State your final diagnoses ... | | 52212 | 52575 | | T1 | |
| | more? | a) | 52212 | 52258 | | T2 | |
| | more? | b) | 52259 | 52309 | | T2 | |
| | more? | c) | 52310 | 52361 | | T2 | |
| | more? | d) | 52362 | 52427 | | T2 | |
| | more? | e) | 52428 | 52487 | | T2 | |
| | ok! | f) | 52488 | 52540 | | T2 | BR 52576 |
| 2. | FH responds ... | | 52576 | 52804 | | | BR 52810 |
| 3. | State your discharge plan ... | | 52810 | 53035 | | T1 | BR 52212 |
| | more? | a) | 52212 | 52258 | | T2 | |
| | more? | b) | 52259 | 52309 | | T2 | |
| | more? | c) | 52310 | 52361 | | T2 | |
| | more? | d) | 52363 | 52427 | | T2 | |
| | more? | e) | 52428 | 52487 | | T2 | |
| | ok! | f) | 52488 | 52540 | | T2 | BR 52576 |
| 4. | FH responds | | 52576 | 52804 | | | wait sta |
| 5. | "Outcome" | 1) | 41919 | 43522 | | T1 | wait sta |
| | | 2) | 41919 | 43054 | | MV OT | wait sta |
| | | 3) | 41989 | 43054 | | | -: 43523 |
| | | | 43523 | 43854 | | MV CT | |

OUTCOME

Hospital

| CRISIS TRAVELING SCENES | IN | OUT | GRAPHICS | AUDIO | OTHER INFO |
|---|---|---|---|---|---|
| 1. FH asleep..RNG..a hit... | 00050 | 02041 | | MV SU | Br-Cmd/Prob Occur A or B |

(<u>Probability Occurrence A: NO HELP</u>)

| | | | | | |
|---|---|---|---|---|---|
| 2. Harry calls Nurse who listens.. | 02042 | 02336 | blue tx | MV FB | case ends |

(<u>Probability Occurrence B: NURSE HELPS</u>)

| | | | | | |
|---|---|---|---|---|---|
| 3. Harry calls Nurse who lifts FH.. | 02678 | 03051 | | | ff/Br 04775 |

(<u>Command Intervention: USER HELPS</u>)

| | | | | | |
|---|---|---|---|---|---|
| 4. User calls nurse for help.. | 47894 | 48708 | | | ff/Br 04775 |

Command Words:
  Nurse!
  Emergency!
  Help in 317!
  Code Blue!

Ⅴ. Discharge (DIS) Section o  User is required to provide final dx and a discharge plan. Format is same as ADM section with MV prompting.

o  DxT and Mx vocabulary subsets must be available for DIS.

o  After providing final dx and discharge plan, user may request to see the outcome of his/her patient by command word "outcome."

o  "Feedback" command will cause a branch to feedback section.

IV. DIAGNOSIS VOCABULARY

| | | | IN | OUT | GRAPHIC | AUDIO | OTHER |
|---|---|---|---|---|---|---|---|
| 1. | Bleeding duodenal ulcer | (ADM) | 37122 | 37158 | cnfrm | MV PR | |
| | | (DIS) | ER 39174 | 39230 | " | MV T2 | |
| | | | HS 52212 | 52258 | " | MV T2 | |
| 2. | Bleeding gastric ulcer | (ADM) | 37122 | 37158 | cnfrm | MV PR | |
| | | (DIS) | ER 39231 | 39283 | " | MV T2 | |
| | | | HS 52212 | 52258 | " | MV T2 | |
| 3. | Gastritis | (ADM) | 37159 | 37215 | cnfrm | MV PR | |
| | | (DIS) | ER 39284 | 39328 | " | MV T2 | |
| | | | HS 52212 | 52258 | " | MV T2 | |
| 4. | Hiatus hernia | (ADM) | 37216 | 37267 | cnfrm | MV PR | |
| | | (DIS) | ER 39329 | 39387 | " | MV T2 | |
| | | | HS 52259 | 52309 | " | MV T2 | |
| 5. | Mallory-Weiss syndrome | (ADM) | 37268 | 37340 | cnfrm | MV PR | |
| | | (DIS) | ER 39388 | 39454 | " | MV T2 | |
| | | | HS 52259 | 52309 | " | MV T2 | |
| 6. | Esophageal varices | (ADM) | 37341 | 37397 | cnfrm | MV PR | |
| | | (DIS) | ER 39388 | 39454 | " | MV T2 | |
| | | | HS 52259 | 52309 | " | MV T2 | |
| 7. | Cancer | (ADM) | 37216 | 37267 | cnfrm | MV PR | |
| | | (DIS) | ER 39329 | 39384 | " | MV T2 | |
| | | | HS 52310 | 52361 | " | MV T2 | |
| 8. | Pancreatitis (Acute?) | (ADM) | 37268 | 37340 | cnfrm | MV PR | |
| | | (DIS) | ER 39284 | 39323 | " | MV T2 | |
| | | | HS 52310 | 52361 | " | MV T2 | |
| 9. | Posterior penetrating duodenal ulcer | (ADM) | 37341 | 37397 | cnfrm | MV PR | |
| | | (DIS) | ER 39284 | 39328 | " | MV T2 | |
| | | | HS 52362 | 52427 | " | MV T2 | |
| 10. | Chronic bronchitis | (ADM) | 37268 | 37340 | cnfrm | MV PR | |
| | | (DIS) | ER 39329 | 39387 | " | MV T2 | |
| | | | HS 52362 | 52427 | " | MV T2 | |
| 11. | COPD | (ADM) | 37216 | 37267 | cnfrm | MV PR | |
| | | (DIS) | ER 39388 | 39454 | " | MV T2 | |
| | | | HS 52362 | 52427 | " | MV T2 | |

| | | | | | | |
|---|---|---|---|---|---|---|
| 12. | Alcoholism (Chronic?) | (ADM) | 37159 | 37215 | cnfrm | MV PR |
| | | (DIS) | ER 39174 | 39230 | " | MV T2 |
| | | | HS 52428 | 52487 | " | MV T2 |
| 13. | Depression | (ADM) | 37122 | 37158 | cnfrm | MV PR |
| | | (DIS) | ER 39174 | 39230 | " | MV T2 |
| | | | HS 52428 | 52487 | " | MV T2 |
| 14. | Alcoholic liver disease | (ADM) | 37159 | 37215 | cnfrm | MV PR |
| | | (DIS) | ER 39174 | 39230 | " | MV T2 |
| | | | HS 52428 | 52487 | " | MV T2 |
| 15. | Hypersplenism | (ADM) | 37216 | 37267 | cnfrm | MV PR |
| | | (DIS) | ER 39231 | 39283 | " | MV T2 |
| | | | HS 52428 | 52487 | " | MV T2 |
| 16. | Tuberculosis | (ADM) | 37268 | 37340 | cnfrm | MV PR |
| | | (DIS) | ER 39231 | 39283 | " | MV T2 |
| | | | HS 52212 | 52258 | " | MV T2 |
| 17. | Perforated ulcer | (ADM) | 37341 | 37397 | cnfrm | MV PR |
| | | (DIS) | ER 39284 | 39328 | " | MV T2 |
| | | | HS 52259 | 52309 | " | MV T2 |
| 18. | Chronic liver disease | (ADM) | 37216 | 37267 | cnfrm | MV PR |
| | | (DIS) | ER 39284 | 39328 | " | MV T2 |
| | | | HS 52310 | 52361 | " | MV T2 |
| 19. | Pneumonia | (ADM) | 37122 | 37158 | cnfrm | MV PR |
| | | (DIS) | ER 39284 | 39328 | " | MV T2 |
| | | | HS 52259 | 52309 | " | MV T2 |
| 20. | Zollinger-Ellison Syndrone | (ADM) | 37341 | 37397 | cnfrm | MV PR |
| | | (DIS) | ER 39174 | 39230 | " | MV T2 |
| | | | HS 52310 | 52361 | " | MV T2 |
| 21. | Pseudoxanthoma Elasticum | (ADM) | 37268 | 37340 | cnfrm | MV PR |
| | | (DIS) | ER 39174 | 39230 | " | MV T2 |
| | | | HS 52259 | 52309 | " | MV T2 |
| 22. | "That's all" | (ADM) | 37397 | 37481 | | MV PR |
| | | (DIS) | ER 39455 | 39540 | | MV T2 |
| | | | HS 52488 | 52540 | | MV T2 |

(FH Responds)

*PR = prompt*
*OR = order test*
*SH = show scene*

*RP = report result*
*RMD = remind*
*ACK = acknowledge*

| V. MANAGEMENT VOCABULARY | | IN | OUT | GRAPHIC | AUDIO | OTHER |
|---|---|---|---|---|---|---|
| 1. IV fluids | (ER) | OR ff | ff | IV TX | MV IV | SCHED (HS) |
| | (ADM) | OR 37122 | 37158 | confrm | MV PR | SCHED (HS) |
| | (HS) | OR ff | ff | IV TX | MV IV | SCHED |
| | | SH none | | | | |
| | | RP ff | ff | IV.1 | IVRSP | SCHED |
| 2. NG suction | (ER) | OR ff | ff | NG TX | MV NG | SCHED (HS |
| | (ADM) | OR 37122 | 37158 | confrm | MV PR | SCHED |
| | (HS) | OR ff | ff | NG TX | MV NG | SCHED |
| | | SH 47252 | 47252 | | MV NGSC | |
| | | RP ff | ff | NGRSP | | |
| 3. Antacids | (ER) | OR ff | ff | ANT TX | MV ANT | SCHED |
| | (ADM) | OR 37122 | 37158 | confrm | MV PR | SCHED |
| | (HS) | OR ff | ff | ANT TX | MV ANT | SCHED |
| | | SH none | | | | |
| | | RP ff | ff | ANT.1 | ANTRSP | |
| | (DIS) (ER) | OR 39174 | 39230 | confrm | MV PR | |
| | (HS) | OR 52212 | 52258 | confrm | MV PR | |
| 4. Cimetidine IV | (ER) | OR ff | ff | CIMIV-TX | MV IV | SCHED |
| | (ADM) | OR 37122 | 37158 | Cnfrm | MV PR | SCHED |
| | (HS) | OR | | CIMIV-TX | MV CIMIV | SCHED |
| | | SH | | | | |
| | | RP | | CIMIV.1 | CIMIVRSP | |
| 5. Cimetidine PO | (ER) | OR ff | ff | CIMPO-TX | MV CIMPO | SCHED |
| | (ADM) | OR 37122 | 37158 | Cnfrm | MV PR | SCHED |
| | (HS) | OR | | CIMPO-TX | MV CIMPO | SCHED |
| | | SH | | | | |

|   |   |   |   |   |   |   |   |
|---|---|---|---|---|---|---|---|
|   |   |   | RP |   |   | CIMPO.1 | CIMPORSP |
|   | (DIS) | ER | OR |   |   | Cnfrm |   |
|   |   | HS | OR |   |   |   |   |
| 6. Bed rest | (ER) |   | OR ff | ff | | BRSP |   | SCHED |
|   | (ADM) |   | OR 37122 | 37158 | | MV BR | Confrm | SCHED |
|   | (HS) |   | OR ff | ff | | BR TX |   | SCHED |
|   |   |   | SH NONE |   |   |   |   |
|   |   |   | RP ff | ff | | BRSP.1 |   |
|   | (DIS) | ER | OR 39174 | 39230 | | Confrm | MV PR |
|   |   | HS | OR 52212 | 52258 | | Confrm | MV PR |
| 7. Oxygen | (ER) |   | OR ff | ff | | OXY TX | MV OXY | SCHED |
|   | (ADM) |   | OR 37268 | 37340 | | Confirm | MV CIMPO | SCHED |
|   | (HS) |   | OR |   |   | OXY TX | MV OXY | SCHED |
|   |   |   | SH none |   |   |   |   |
|   |   |   | RP |   |   | OXY.1 | oxyrsp |
| 8. Frequent vital | (ER) |   | OR ff | ff | | FVX TX | MV FVS | SCHED |
|   | (ADM) |   | OR 37268 | 37340 | | Cnfrm | MV PR | SCHED |
|   | (HS) |   | OR |   |   | FVS TX | MV FVS | SCHED |
|   |   |   | SH |   |   |   |   |
|   |   |   | RP |   |   | FVS.1 | FVSRSP |
| 9. Frequent urine output | (ER) |   | OR ff | ff | | FUD TX | MV FUD | SCHED |
|   | (ADM) |   | OR 37268 | 37340 | | Cnfrm | MV PR | SCHED |
|   | (HS) |   | OR |   |   | FUD TX | MV FUD | SCHED |
|   |   |   | SH |   |   |   |   |
|   |   |   | RP |   |   | FUD.1 | FUDRSP |
| 10. Demerol | (ER) |   | OR ff | ff | | DEM TX | MV DEM | SCHED |
|   | (ADM) |   | OR 37341 | 37397 | | Cnfrm | MV PR | SCHED |
|   | (HS) |   | OR |   |   | DEM TX | MV DEM | SCHED |
|   |   |   | SH |   |   |   |   |
|   |   |   | RP |   |   | DEM.1 | DEMRSP |
|   | (DIS) | ER | OR |   |   | Cnfrm |   |
|   |   | HS | OR |   |   |   |   |
| 11. Surgery | (ER) |   | OR ff | ff | | SURG TX | MV SURG | SCHED |

|     |                      |       |    |          |       |          |         |       |
| --- | -------------------- | ----- | -- | -------- | ----- | -------- | ------- | ----- |
|     |                      | (ADM) |    | OR 37341 | 37397 | Cnfrm    | MV PR   | SCHED |
|     |                      | (HS)  |    | OR       |       | SURG TX  | MV SURG | SCHED |
|     |                      |       |    | SH       |       |          |         |       |
|     |                      |       |    | RP       |       | SURG.1   | SURGRSP |       |
|     |                      | (DIS) | ER | OR       |       | Cnfrm    |         |       |
|     |                      |       | HS | OR       |       |          |         |       |
| 12. | Surgical consult     | (ER)  |    | OR ff    | ff    | CNSLT.1  | CNSLRSP |       |
|     |                      | (ADM) |    | OR       |       | Cnfrm    | MV PR   | SCHED |
|     |                      | (HS)  |    | OR       |       | CNSLT TX | MV CNSLT| SCHED |
|     |                      |       |    | SH       |       |          |         |       |
|     |                      |       |    | RP       |       | CNSLT.1  | CNSLTRSP|       |
|     |                      | (DIS) | ER | OR       |       | Cnfrm    |         |       |
|     |                      |       | HS | OR       |       |          |         |       |
| 13. | Transfusion          | (ER)  |    | OR ff    | ff    | TRANS TX | MV TRANS| SCHED |
|     |                      | (ADM) |    | OR 37159 | 37215 | Cnfrm    | MV PR   | SCHED |
|     |                      | (HS)  |    | OR       |       | TRANS TX | MV TRANS| SCHED |
|     |                      |       |    | SH       |       |          |         |       |
|     |                      |       |    | RP       |       | TRANS.1  | TRANSRSP|       |
| 14. | Alcohol counseling   | (ER)  |    | OR ff    | ff    | ALCO TX  | MV ALCO | SCHED |
|     |                      | (ADM) |    | OR 37159 | 37215 | Cnfrm    | MV PR   | SCHED |
|     |                      | (HS)  |    | OR       |       | ALCO TX  | MV ALCO | SCHED |
|     |                      |       |    | SH       |       |          |         |       |
|     |                      |       |    | RP       |       | ALCO.1   | ALCORSP |       |
|     |                      | (DIS) | ER | OR       |       | Cnfrm    |         |       |
|     |                      |       | HS | OR       |       |          |         |       |
| 15. | Nutrition counseling | (ER)  |    | OR ff    | ff    | NUTR TX  | MV NUTR | SCHED |
|     |                      | (ADM) |    | OR 37159 | 37215 | Cnfrm    | MV PR   | SCHED |
|     |                      | (HS)  |    | OR       |       | NUTR TX  | MV NUTR | SCHED |
|     |                      |       |    | SH       |       |          |         |       |
|     |                      |       |    | RP       |       | NUTR.1   | NUTRRSP |       |
|     |                      | (DIS) | ER | OR       |       | Cnfrm    |         |       |
|     |                      |       | HS | OR       |       |          |         |       |
| 16. | Psycho.              | (ER)  |    | OR ff    | ff    | PSYC TX  | MV PSYC | SCHED |

|     |                |       | 171 |       |       |       | 172      |         |       |
| --- | -------------- | ----- | --- | ----- | ----- | ----- | -------- | ------- | ----- |
|     | counseling     | (ADM) |     | OR    | 37216 | 37267 | Cnfrm    | MV PR   | SCHED |
|     |                | (HS)  |     | OR    |       |       | PSYC TX  | MV PSYC | SCHED |
|     |                |       |     | SH    |       |       |          |         |       |
|     |                |       |     | RP    |       |       | PSYC.1   | PSYCRSP |       |
|     |                | (DIS) | ER  | OR    |       |       | Cnfrm    |         |       |
|     |                |       | HS  | OR    |       |       |          |         |       |
| 17. | Family         | (ER)  |     | OR ff | ff    |       | FAM TX   | MV TX   | SCHED |
|     | counseling     | (ADM) |     | OR    | 37216 | 37267 | Cnfrm    | MV PR   | SCHED |
|     |                | (HS)  |     | OR    |       |       | FAM TX   | MV FAM  | SCHED |
|     |                |       |     | SH    |       |       |          |         |       |
|     |                |       |     | RP    |       |       | FAM.1    | FAMRSP  |       |
|     |                | (DIS) | ER  | OR    |       |       | Cnfrm    |         |       |
|     |                |       | HS  | OR    |       |       |          |         |       |
| 18. | Bland diet     | (ER)  |     | OR ff | ff    |       | DIET TX  | MV TX   | SCHED |
|     |                | (ADM) |     | OR    | 37216 | 37267 | Cnfrm    | MV PR   | SCHED |
|     |                | (HS)  |     | OR    |       |       | DIET TX  | MV DIET | SCHED |
|     |                |       |     | SH    |       |       |          |         |       |
|     |                |       |     | RP    |       |       | DIET.1   | DIETRSP |       |
|     |                | (DIS) | ER  | OR    |       |       | Cnfrm    |         |       |
|     |                |       | HS  | OR    |       |       |          |         |       |
| 19. | Librium        | (ER)  |     | OR ff | ff    |       | LIB TX   | MV LIB  | SCHED |
|     |                | (ADM) |     | OR    | 37341 | 37397 | Cnfrm    | MV PR   | SCHED |
|     |                | (HS)  |     | OR    |       |       | LIB TX   | MV LIB  | SCHED |
|     |                |       |     | SH    |       |       |          |         |       |
|     |                |       |     | RP    |       |       | LIB.1    | LIBRSP  |       |
|     |                | (DIS) | ER  | OR    |       |       | Cnfrm    |         |       |
|     |                |       | HS  | OR    |       |       |          |         |       |
| 20. | Close medical  | (DIS) | ER  | OR    |       |       | Cnfrm    |         |       |
|     |                |       | HS  | OR    |       |       |          |         |       |
| 21. | Thiamine       | (ER)  |     | OR ff | ff    |       | THIA TX  | MV THIA | SCHED |
|     |                | (ADM) |     | OR    | 37341 | 37397 | Cnfrm    | MV PR   | SCHED |
|     |                | (HS)  |     | OR ff | ff    |       | THIA TX  | MV THIA | SCHED |

|     |       |       |    |          |       |        |         |
| --- | ----- | ----- | -- | -------- | ----- | ------ | ------- |
|     |       |       |    | SH none  |       |        |         |
|     |       |       |    | RP ff    | ff    | THIA.1 | THIARSP |
|     |       | (DIS) | ER | OR       |       | Cnfrm  |         |
|     |       |       | HS | OR       |       | Cnfrm  |         |
| 22. | NPO   | (ER)  |    | OR ff    | ff    | NPO TX | MV NPO  | SCHED |
|     |       | (ADM) |    | OR 37341 | 37397 | Cnfrm  | MV PR   | SCHED |
|     |       | (HS)  |    | OR ff    | ff    | NPO TX | MV NPO  | SCHED |
|     |       |       |    | SH none  |       |        |         |
|     |       |       |    | RP ff    | ff    | NPO.1  | NPORSP  |

| VII. SYSTEM WORDS | IN | OUT | GRAPHIC | AUDIO | OTHER |
| --- | --- | --- | --- | --- | --- |
| 1. Begin | 00030 | 04235 | | | wait stat |
| 2. Finished | ER 43349 | 45713 | | | |
| | HS 44878 | 47243 | | | |
| 3. Feedback | ER 40071 | 40071 | | | |
| | HS 52374 | 52374 | | | |
| 4. Credits | ER 43349 | 45713 | | | |
| | HS 44878 | 47243 | | | |
| 5. End the case | Shuts down sys...ret to DOS | | | | |
| 6. Stop | ff | ff | | | wait stat |
| 7. Continue | See Intelligent Continue Stmt descr. | | | | |
| 8. Sound | Activate Track 1... | | | | |
| 9. Quiet | Shut down both tracks... | | | | |
| 10. Admit the patient | 37122 | 37481 | | MV Msg | See ADM |
| 11. (Schedule) a procedure | ff | ff | | MV Msg | See HS |
| 12. (Talk) to Mr. Hall | ER 31639 | 31688 | | | See HS |
| 13. (Examine) the patient | ff | ff | | MV Msg | See ER/HS |
| 14. (Manage) the patient | ff | ff | | MV Msg | See ER/HS |
| 15. Morning | Br to middle seg of next morning... | | | | |
| 16. Afternoon | Br to middle seg of next afternoon... | | | | |
| 17. Evening | Br to middle seg of next evening... | | | | |
| 18. Night | Br to middle seg of next night... | | | | |

| | | | | | |
|---|---|---|---|---|---|
| 19. | Results | ff | ff | MV Msg | |
| 20. | Status | ff | ff | MV Msg | |
| 21. | Discharge the patient | ER 39174 | 39540 | MV TI | See DIS |
| | | HS 52212 | 52575 | MV TI | See DIS |
| 22. | Outcome (ER) | 1) 40481 | 40970 | T1 | See DIS |
| | | 2) 40481 | 40970 | T2 | See DIS |
| | | 3) 43018 | 43348 | MV Compr | |
| | (HS) | 1) 41919 | 43522 | T1 | See DIS |
| | | 2) 41919 | 43522 | T2 | See DIS |
| | | 3) 41919 | 43054 | | Br 43523 |
| | | 43523 | 43854 | T1 | |
| 23. | Instruction | ER 45760 | 53546 | | Neuro Ex |
| | | HS 48709 | 50900 | | Heart EX |
| 24. | Thoughts | ff | ff | MV Compr | |
| 25. | Interpretation (ER) | 41180 | 42219 | MV TI | ENDOS |
| | (HS) | 39635 | 40674 | MV TI | ENDOS |
| 26. | Probability | Not developed yet... | | | |
| 27. | Yes | | | | |
| 28. | No | | | | |
| 29. | Mistake | Delete last entry in tracking... | | | |
| 30. | Try again | Not developed yet... | | | |

DISCHARGE THE PATIENT              IN    OUT    GRAPHICS    AUDIO    OTHER
(FROM EXAMINATION ROOM) (Disc 1)

| | | | | | |
|---|---|---|---|---|---|
| 1. | State your final diagnoses ... | 39174 | 39540 | T1 | |
| | more? | a) 39174 | 39230 | T2 | |
| | more? | b) 39231 | 39283 | T2 | |
| | more? | c) 39284 | 39328 | T2 | |
| | more? | d) 39329 | 39387 | T2 | |
| | more? | e) 39388 | 39454 | T2 | |
| | ok! | f) 39455 | 39540 | T2 | BR 39541 |
| 2. | FH responds to diagones ... | 39541 | 39655 | | BR 39656 |

| | | | | | |
|---|---|---|---|---|---|
| 3. | State your discharge plan ... | 39656 | 39991 | T1 | |
| | more? | a) 39656 | 39708 | T2 | |
| | more? | b) 39709 | 39765 | T2 | |
| | more? | c) 39766 | 39816 | T2 | |
| | more? | d) 39817 | 39877 | T2 | |
| | more? | e) 39878 | 39944 | T2 | |
| | ok! | f) 39945 | 39991 | T2 | ER 39996 |
| 4. | FH responds to discharge plan ... | 39996 | 40493 | | wait sta |
| 5. | "Outcome" | 1) 40481 | 40970 | MV OT | wait sta |
| | | 2) 40481 | 40803 | T2 | wait sta |
| | | 3) 43018 | 43348 | T1 | wait sta |

DISCHARGE THE PATIENT
(FROM EXAMINATION ROOM)

| | IN | OUT | GRAPHIC | AUDIO | OTHER |
|---|---|---|---|---|---|

Alternate response by FH ... requires
compressed audio

| | IN | OUT | GRAPHIC | AUDIO | OTHER |
|---|---|---|---|---|---|
| Mx 1 | 39996 | 40061 | | | MR PR |
| Mx 2 | 40062 | 40145 | | | MV PR |
| Mx 3 | 40146 | 40272 | | | MV PR |
| Mx 4 | 40273 | 40337 | | | MV PR |
| Mx 5 | 40338 | 40393 | | | MV PR |
| Mx 6 | 40394 | 40480 | | | MV PR |
| Mx n | ff | ff | | | MV PR |

DISCHARGE THE PATIENT
(FROM HOSPITAL) (Disc 2)

| | IN | OUT | GRAPHIC | AUDIO | OTHER |
|---|---|---|---|---|---|
| 1. State your final diagnoses ... | 52212 | 52575 | | | T1 |
| more? | a) 52212 | 52258 | | | T2 |

|     |                          |    |       |       |          |       |             |
|-----|--------------------------|----|-------|-------|----------|-------|-------------|
|     | more?                    | b) | 52259 | 52309 |          | T2    |             |
|     | more?                    | c) | 52310 | 52361 |          | T2    |             |
|     | more?                    | d) | 52362 | 52427 |          | T2    |             |
|     | more?                    | e) | 52428 | 52487 |          | T2    |             |
|     | ok!                      | f) | 52488 | 52540 |          | T2    | BR 52576    |
| 2.  | FH responds ...          |    | 52576 | 52804 |          |       | BR 52810    |
| 3.  | State your discharge plan ... |   | 52810 | 53035 |          | T1    | BR 52212    |
|     | more?                    | a) | 52212 | 52258 |          | T2    |             |
|     | more?                    | b) | 52259 | 52309 |          | T2    |             |
|     | more?                    | c) | 52310 | 52361 |          | T2    |             |
|     | more?                    | d) | 52363 | 52427 |          | T2    |             |
|     | more?                    | e) | 52428 | 52487 |          | T2    |             |
|     | ok!                      | f) | 52488 | 52540 |          | T2    | BR 52576    |
| 4.  | FH responds              |    | 52576 | 52804 |          |       | wait sta·   |
| 5.  | "Outcome"                | 1) | 41919 | 43522 |          | T1    | wait sta·   |
|     |                          | 2) | 41919 | 43054 |          | MV OT | wait sta·   |
|     |                          | 3) | 41989 | 43054 |          |       | ·· 43523    |
|     |                          |    | 43523 | 43854 |          | MV C· |             |

OUTCOME

Hospital

| CRISIS TRAVELING SCENES | IN | OUT | GRAPHICS | AUDIO | OTHER INFO |
|---|---|---|---|---|---|
| 1. FH asleep..RNG..a hit... | 00050 | 02041 |  | MV SU | Br-Cmd/Prob |
|  |  |  |  |  | Occur A or B |

(Probability Occurrence A: NO HELP)

| | | | | | |
|---|---|---|---|---|---|
| 2. Harry calls Nurse who listens.. | 02042 | 02336 | blue tx | MV FB | case ends |

(Probability Occurrence B: NURSE HELPS)

3.  Harry calls Nurse who lifts FH..   02678   03051         ff/Br 04775

(Command Intervention: USER HELPS)

4.  User calls nurse for help..   47894   48708         ff/Br 04775

Command Words:

Nurse!

Emergency!

Help in 317!

Code Blue!

Decision Point: 1              Admit the patient

Outcomes:
    1. admission
    2. referral
    3. outpatient

Influence Factors:
    1. alcohol questions
        a. no alcohol ques
        b. one alcohol ques
        c. multiple alcohol ques 2. blood workup
        a. no blood workup
        b. adequate blood workup 3. repeat admit command
        a. one admit command
        b. multiple admit commands

|         |                      | OUTCOMES  |          |            |
|---------|----------------------|-----------|----------|------------|
| ADDRESS | COMBINATIONS         | admission | referral | outpatient |
| 0       | no alcohol ques<br>no blood workup<br>one admit command | VL | UL | L |
| 1       | one alcohol ques<br>no blood workup<br>one admit command | VL | UL | L |
| 2       | no alcohol ques<br>adequate blood workup<br>one admit command | VL | UL | L |
| 3       | one alcohol ques<br>adequate blood workup<br>one admit command | UL | L | L |

| | | | | |
|---|---|---|---|---|
| 4 | no alcohol ques<br>no blood workup<br>multiple admit commands | L | UL | VL |
| 5 | one alcohol ques<br>no blood workup<br>multiple admit commands | UL | L | VL |
| 6 | no alcohol ques<br>adequate blood workup<br>multiple admit commands | UL | L | VL |
| 7 | one alcohol ques<br>adequate blood workup<br>multiple admit commands | UL | VL | VL |

Decision Point: 2        discharge from ER

Outcomes:
    1. expire
    2. recover
    3. return to hospital
    4. get sick, sue Influence Factors:
    1. duodenal ulcer
        a. duo ulcer not dx
        b. duo ulcer dx 2. alcoholism
        a. alcoholism not dx
        b. alcoholism dx 3. depression
        a. depression not dx
        b. depression dx 4. close medical followup
        a. followup not prescribed
        b. followup prescribed

| | | OUTCOMES | | | |
|---|---|---|---|---|---|
| ADDRESS | COMBINATIONS | expire | recover | return to hospital | get sick, sue |
| 0 | duo ulcer not dx<br>alcoholism not dx<br>depression not dx<br>followup not prescribed | VL | UL | L | |
| 1 | duo ulcer dx<br>alcoholism not dx<br>depression not dx<br>followup not prescribed | VL | UL | L | |
| 2 | duo ulcer not dx<br>alcoholism dx<br>depression not dx<br>followup not prescribed | VL | UL | L | |
| 3 | duo ulcer dx<br>alcoholism dx<br>depression not dx<br>followup not prescribed | UL | L | L | |

| | | | | |
|---|---|---|---|---|
| 4 | duo ulcer not dx<br>alcoholism not dx<br>depression dx<br>followup not prescribed | L | UL | VL |
| 5 | duo ulcer dx<br>alcoholism not dx<br>depression dx<br>followup not prescribed | UL | L | VL |
| 6 | duo ulcer not dx<br>alcoholism dx<br>depression dx<br>followup not prescribed | UL | L | VL |
| 7 | duo ulcer dx<br>alcoholism dx<br>depression dx<br>followup not prescribed | UL | VL | VL |

Decision Point: 3      refer the patient

Outcomes:
  1. lost to followup
  2. county hospital
  3. expire

Influence Factors:
  1. marriage info
      a. no marriage info
      b. one marriage ques
      c. mul marriage ques 2. duo ulcer diagnosed
      a. duo ulcer not dx
      b. duo ulcer dx 3. depression diagnosed
      a. depression not dx
      b. depression dx

| | | OUTCOMES | | |
|---|---|---|---|---|
| ADDRESS | COMBINATIONS | lost to followup | county hospital | expire |
| 0 | no marriage info<br>duo ulcer not dx<br>depression not dx | VL | UL | L |
| 1 | one marriage ques<br>duo ulcer not dx<br>depression not dx | VL | UL | L |
| 2 | no marriage info<br>duo ulcer dx<br>depression not dx | VL | UL | L |
| 3 | one marriage ques<br>duo ulcer dx<br>depression not dx | UL | L | L |
| 4 | no marriage info<br>duo ulcer not dx<br>depression dx | L | UL | VL |

| | | | | |
|---|---|---|---|---|
| 5 | one marriage ques<br>duo ulcer not dx<br>depression dx | UL | L | VL |
| 6 | no marriage info<br>duo ulcer dx<br>depression dx | UL | L | VL |
| 7 | one marriage ques<br>duo ulcer dx<br>depression dx | UL | VL | VL |

Decision Point: 4          crisis

Outcomes:
    1. no crisis
    2. found dead
    3. crisis in process

Influence Factors:
    1. duo ulcer diff dx
        a. no diff dx of ulcer
        b. diff dx of ulcer 2. blood workup
        a. no blood workup
        b. adequate blood workup 3. nutrition counseling
        a. no nutrition counsel
        b. nutrition counseling

| | | OUTCOMES | | |
|---|---|---|---|---|
| ADDRESS | COMBINATIONS | no crisis | found dead | crisis in process |
| 0 | no diff dx of ulcer<br>no blood workup<br>no nutrition counsel | VL | UL | L |
| 1 | diff dx of ulcer<br>no blood workup<br>no nutrition counsel | VL | UL | L |
| 2 | no diff dx of ulcer<br>adequate blood workup<br>no nutrition counsel | VL | UL | L |
| 3 | diff dx of ulcer<br>adequate blood workup<br>no nutrition counsel | UL | L | L |
| 4 | no diff dx of ulcer<br>no blood workup<br>nutrition counseling | L | UL | VL |
| 5 | diff dx of ulcer<br>no blood workup<br>nutrition counseling | UL | L | VL |
| 6 | no diff dx of ulcer<br>adequate blood workup<br>nutrition counseling | UL | L | VL |

| 7 | diff dx of ulcer<br>adequate blood workup<br>nutrition counseling | UL | VL | VL |

Decision Point: 5    crisis intervention

Outcomes:
   1. survives
   2. expires

Influence Factors:
   1. antacids
      a. no antacids prescr
      b. antacids prescr 2. cimetidine
      a. no cimetidine prescr
      b. cimetidine prescr 3. bland diet
      a. bland diet not prescr
      b. bland diet prescr

|  | | OUTCOMES | |
|---|---|---|---|
| ADDRESS | COMBINATIONS | survives | expires |
| 0 | no antacids prescr<br>no cimetidine prescr<br>bland diet not prescr | VL | UL |
| 1 | antacids prescr<br>no cimetidine prescr<br>bland diet not prescr | VL | UL |
| 2 | no antacids prescr<br>cimetidine prescr<br>bland diet not prescr | VL | UL |
| 3 | antacids prescr<br>cimetidine prescr<br>bland diet not prescr | UL | L |
| 4 | no antacids prescr<br>no cimetidine prescr<br>bland diet prescr | L | UL |
| 5 | antacids prescr<br>no cimetidine prescr<br>bland diet prescr | UL | L |
| 6 | no antacids prescr<br>cimetidine prescr<br>bland diet prescr | UL | L |
| 7 | antacids prescr<br>cimetidine prescr<br>bland diet prescr | UL | VL |

Decision Point: 6          failed to intervene

Outcomes:
   1. expire
   2. survive

Influence Factors:
   1. the luck of the draw
      a. bad draw
      b. good draw

| | | OUTCOMES | |
|---|---|---|---|
| ADDRESS | COMBINATIONS | expire | survive |
| 0 | bad draw | VL | L |
| 1 | good draw | UL | VL |

Decision Point: 7          tentative doctor

Outcomes:
   1. nurse takes over
   2. shocked to death
   3. fh gets better

Influence Factors:
   1. iv ordered
      a. iv not ordered
      b. iv ordered 2. vital signs ordered
      a. no vitals ordered
      b. vitals ordered once
      c. mul orders for vitals 3. transfusion
      a. no transfusion ordered
      b. transfusion ordered

| | | OUTCOMES | | |
|---|---|---|---|---|
| ADDRESS | COMBINATIONS | nurse takes over | shocked to death | fh gets better |
| 0 | iv not ordered<br>no vitals ordered<br>no transfusion ordered | VL | UL | L |
| 1 | iv ordered<br>no vitals ordered<br>no transfusion ordered | VL | UL | L |
| 2 | iv not ordered<br>vitals ordered once<br>no transfusion ordered | VL | UL | L |
| 3 | iv ordered<br>vitals ordered once<br>no transfusion ordered | UL | L | L |
| 4 | iv not ordered<br>no vitals ordered<br>transfusion ordered | L | VL | UL |

| | | | | |
|---|---|---|---|---|
| 5 | iv ordered<br>no vitals ordered<br>transfusion ordered | UL | L | VL |
| 6 | iv not ordered<br>vitals ordered once<br>transfusion ordered | UL | L | VL |
| 7 | iv ordered<br>vitals ordered once<br>transfusion ordered | UL | VL | VL |

Decision Point: 8  discharge from hospital

Outcomes:
1. expire on the bench
2. recover
3. revolving door

Influence Factors:
1. alcohol counseling
   a. no alcohol counsel
   b. alcohol counsel prescr 2. psychiatric counsel
   a. no psych counsel
   b. psych counsel prescr 3. medical followup
   a. no followup planned
   b. followup planned

OUTCOMES

| ADDRESS | COMBINATIONS | expire on the bench | recover | revolving door |
|---|---|---|---|---|
| 0 | no alcohol counsel<br>no psych counsel<br>no followup planned | VL | UL | L |
| 1 | alcohol counsel prescr<br>no psych counsel<br>no followup planned | VL | UL | L |
| 2 | no alcohol counsel<br>psych counsel prescr<br>no followup planned | VL | UL | L |
| 3 | alcohol counsel prescr<br>psych counsel prescr<br>no followup planned | UL | L | L |
| 4 | no alcohol counsel<br>no psych counsel<br>followup planned | L | UL | VL |
| 5 | alcohol counsel prescr<br>no psych counsel<br>followup planned | UL | L | VL |
| 6 | no alcohol counsel<br>psych counsel prescr<br>followup planned | UL | L | VL |
| 7 | alcohol counsel prescr<br>psych counsel prescr<br>followup planned | UL | VL | VL |

UNITED STATES PATENT APPLICATION
OF
WILLIAM G. HARLESS
FOR
INTERACTIVE AUDIOVISUAL METHOD AND APPARATUS
APPENDIX II
LAW OFFICES
FINNEGAN, HENDERSON
FARABOW, GARRETT
& DUNNER
1775 K STREET, N.W.
WASHINGTON, D.C. 20006
(202)293-6850
```
Screen # 0
( Frank Hall two                                      15:17 02/18/86 )
( Last change:    Screen 0001                   LP    13:03 09/26/85 )
Demonstration using NIH videodisc # 00001
Screen # 1
( Load screen                                         15:17 02/18/86 )
2 26 THRU
USING FH3 1 LOAD
```

```
Screen # 2
( video blocks                                 15:17 02/18/86 )

30   4235 BLOCK  B-BEGIN
 4236   4787 BLOCK  START-WORK-UP
( In future this sequence will be extended to a two disc
  configuration using frames 44385 - 44877 on disc two)
 4790   5335 BLOCK WHAT-PROBLEM?
 5336   5639 BLOCK PROBLEM-A
 5640   5804 BLOCK PROBLEM-B
33418  33532 BLOCK PROBLEM-X1 ( This will be expanded later)

5806   7976 BLOCK ONSET?
 7977   8285 BLOCK ONSET-A
 8285   8758 BLOCK ONSET-B
 8759   8843 BLOCK ONSET-C
33533  33644 BLOCK ONSET-X2  ( This will be expaned later)

Screen # 3
( Video blocks .. continued          LP  12:18 09/25/85 )

8844  9497 BLOCK  WIFE
 9498  9984 BLOCK  WIFE-A
 9985 12170 BLOCK  WIFE-B
12171 12257 BLOCK  WIFE-C
33056 33135 BLOCK  WIFE-X3 ( Will be expanded later)

12258 12680 BLOCK  WORK
12681 13529 BLOCK  WORK-A
13530 14153 BLOCK  WORK-B
14154 14230 BLOCK  WORK-C
   \        BLOCK  WORK-X  ( Will be expanded later)

Screen # 4
( Video blocks continued             LP  12:22 09/25/85 )

14231 14534  BLOCK  PAIN
14535 14971  BLOCK  PAIN-A
14972 15060  BLOCK  PAIN-B
15061 15194  BLOCK  PAIN-C
   \         BLOCK  PAIN-X 15195 15716  BLOCK  FAMILY
15717 16331  BLOCK  FAMILY-A
16332 16771  BLOCK  FAMILY-B
16772 16876  BLOCK  FAMILY-C
   \         BLOCK  FAMILY-X

Screen # 5
( Video blocks continued             LP  12:28 09/25/85 )

16877 17254  BLOCK  PREV-ILL
17255 17476  BLOCK  PREV-ILL-A
17477 17580  BLOCK  PREV-ILL-B
   \         BLOCK  PREV-ILL-X 17581 18070  BLOCK  MEDS
18071 18258  BLOCK  MEDS-A
18259 18433  BLOCK  MEDS-B
   \         BLOCK  MEDS-X 18434 18921  BLOCK  COUGH
18922 19169  BLOCK  COUGH-A
```

```
19170 19318  BLOCK   COUGH-B
  \          BLOCK   COUGH-X
```

Screen # 6
( Video blocks continued                    LP   12:36 09/25/85 )

```
19319 20002  BLOCK   SMOKE
20003 20302  BLOCK   SMOKE-A
20303 20424  BLOCK   SMOKE-B 20425 20780  BLOCK   STOMCH
20781 21290  BLOCK   STOMCH-A
21291 21973  BLOCK   STOMCH-B
21974 22419  BLOCK   STOMCH-C
22420 22546  BLOCK   STOMCH-D
```

Screen # 7
( Video blocks continued                    LP   12:55 09/25/85 )

```
22547 23035  BLOCK   TIRED
23036 23295  BLOCK   TIRED-A
23296 23444  BLOCK   TIRED-B 23445 23985  BLOCK CHILD
23986 24450  BLOCK CHILD-A
24451 24638  BLOCK CHILD-B
24639 24688  BLOCK CHILD-C
```

Screen # 8
( VIDEO BLOCKS CONTINUED                    LP   12:58 09/25/85 )

```
23689 24985  BLOCK   NUMB
24986 25394  BLOCK   NUMB-A
25395 25760  BLOCK   NUMB-B
25761 25843  BLOCK   NUMB-C 25844 26086  BLOCK   ACTI
26087 26133  BLOCK   ACTI-A 26134 26329  BLOCK   BOWEL
26330 26701  BLOCK   BOWEL-A
26702 26762  BLOCK   BOWEL-B
```

Screen # 9
( VIDEO BLOCKS CONTINUED                    LP   13:01 09/25/85 )

```
26763 26881  BLOCK   LIVER
26882 26991  BLOCK   LIVER-A 26992 27186  BLOCK   SALLY
27187 27350  BLOCK   SALLY-A 27351 27634  BLOCK   DEPRESS
27635 27983  BLOCK   DEPRESS-A
27984 28458  BLOCK   DEPRESS-B
28459 28502  BLOCK   DEPRESS-C
```

Screen # 10
( VIDEO BLOCKS CONTINUED                    LP   13:05 09/25/85 )

```
28503 28754  BLOCK   DRINKS
28755 29111  BLOCK   DRINKS-A
```

```
29112 29437   BLOCK   DRINKS-B
29438 29869   BLOCK   DRINKS-C
29870 30001   BLOCK   DRINKS-D 30002 30461   BLOCK   EATING
30462 30697   BLOCK   EATING-A
30698 30829   BLOCK   EATING-B
```

Screen # 11
( VIDEO BLOCKS CONTINUED                    LP  13:12 09/25/85 )

```
30830 31339   BLOCK   DIZZY
31340 31549   BLOCK   DIZZY-A
31550 31638   BLOCK   DIZZY-X  ( THIS SEQUENCE IS NOT ON THE XLIST)

32157 32250   BLOCK   MR.HALL      ( SMILE)
31639 31688   BLOCK   MR.HALL-A    ( YES)
```

( VIDEO BLOCKS FOR HISTORY END HERE)

Screen # 12
( PHYSICAL EXAM VIDEO BLOCKS                LP  13:18 09/25/85 )
```
36885 37121   BLOCK         ER.GENERAL.APPEARANCE
35206 35343   BLOCK         ER.HEENT
35344 35437   BLOCK         ER.NECK
36879 FREEZE.FRAME          ER.EXTREMITIES
36880 FREEZE.FRAME          ER.SKIN
36311 36879  BLOCK          ER.HANDS
36205 FREEZE.FRAME          ER.ABDOMEN
35438 FREEZE.FRAME          ER.CHEST.AND.LUNGS
45738 FREEZE.FRAME          ER.HEART
35440 35590   BLOCK         ER.NEUROLOGICAL
35439 FREEZE.FRAME          ER.LYMPH.NODES
36310 FREEZE.FRAME          ER.BACK
45737 FREEZE.FRAME          ER.GENITOURINARY
45744 FREEZE.FRAME          ER.RECTAL.EXAM
```

Screen # 13
( ADMIT THE PATIENT VIDEO BLOCKS            LP  13:24 09/25/85 )

```
35591 36309   BLOCK   ER.FINGER-TO-NOSE
36881 37121   BLOCK   GEN-APPEAR
35206 35343   BLOCK   ER.SCLERA 37122 37481   BLOCK   ADMIT-PT
37122 37158   BLOCK   DIFF-DX       ( IS THERE ANOTHER?)
37159 37215   BLOCK   DIFF-DX-A     ( ANOTHER?)
37216 37267   BLOCK   DIFF-DX-B     ( ANY MORE?)
37268 37340   BLOCK   DIFF-DX-C     ( IS THAT ALL?)
37341 37397   BLOCK   DIFF-DX-D     ( ANYTHING ELSE?)
37397 37481   BLOCK   DIFF-DX-E     ( OK)
```

Screen # 14
( ADMIT THE PATIENT VIDEO BLOCKS            LP  13:27 09/25/85 )

```
37482 37890   BLOCK   DX-WORKUP
37483 37528   BLOCK   DX-WORKUP-A
37529 37577   BLOCK   DX-WORKUP-B
37578 37626   BLOCK   DX-WORKUP-C
37627 37687   BLOCK   DX-WORKUP-D
37688 37757   BLOCK   DX-WORKUP-E
37258 37890   BLOCK   DX-WORKUP-F     ( OK )
```

```
Screen # 15
( ADMIT THE PATIENT VIDEO BLOCKS          LP  14:16 09/25/85 )

37891 38201   BLOCK   MGT-PLAN
37879 37892   BLOCK   MGT-PLAN-A
37880 37936   BLOCK   MGT-PLAN-B
37937 37990   BLOCK   MGT-PLAN-C
37991 38049   BLOCK   MGT-PLAN-D
38050 38119   BLOCK   MGT-PLAN-E
38120 38201   BLOCK   MGT-PLAN-F

Screen # 16
( HOSP DISCHARGE PLAN VIDEO BLOCKS        LP  14:24 09/25/85 )

38202 38570   BLOCK   FINAL-DX
38202 38244   BLOCK   FINAL-DX-A
38245 38302   BLOCK   FINAL-DX-B
38303 38353   BLOCK   FINAL-DX-C
38354 38414   BLOCK   FINAL-DX-D
38415 38486   BLOCK   FINAL-DX-E
38487 38570   BLOCK   FINAL-DX-F 38571 38805   BLOCK   FRANK.RESPONSE

Screen # 17
( HOSP DISCHARGE PLAN VIDEO BLOCKS        LP  14:23 09/25/85 )

38806 39173   BLOCK   DIS-PLAN
38806 38860   BLOCK   DIS-PLAN-A
38861 38913   BLOCK   DIS-PLAN-B
38914 38965   BLOCK   DIS-PLAN-C
38966 39026   BLOCK   DIS-PLAN-D
39027 39099   BLOCK   DIS-PLAN-E
39100 39173   BLOCK   DIS-PLAN-F

Screen # 18
( ER DISCHARGE PLAN VIDEO BLOCKS     LP  14 LP  14:29 09/25/85 )

39174 39540   BLOCK   ER-FINAL-DX
39174 39230   BLOCK   ER-FINAL-DX-A
39231 39283   BLOCK   ER-FINAL-DX-B
39284 39328   BLOCK   ER-FINAL-DX-C
39329 39387   BLOCK   ER-FINAL-DX-D
39388 39454   BLOCK   ER-FINAL-DX-E
39455 39540   BLOCK   ER-FINAL-DX-F 39541 39655   BLOCK   F-HALL-RESPONSE

Screen # 19
( ER DISCHARGE PLAN VIDEO BLOCKS          LP  14:32 09/25/85 )

39656 39991   BLOCK   ER-DISCHARGE
39656 39708   BLOCK   ER-DISCHARGE-A
39709 39765   BLOCK   ER-DISCHARGE-B
39766 39816   BLOCK   ER-DISCHARGE-C
39817 39877   BLOCK   ER-DISCHARGE-D
39878 39944   BLOCK   ER-DISCHARGE-E
39945 39991   BLOCK   ER-DISCHARGE-F 39996 40493   BLOCK   ER-FRANK-RESPONSE
```

```
Screen # 20
( ER OUTCOME VIDEO BLOCKS                    LP  14:41 09/25/85 )

40493 41049   BLOCK   ER-OUTCOME 39996 40061   BLOCK   EXPRESSIONS
40062 40145   BLOCK   EXPRESSIONS-1
40146 40272   BLOCK   EXPRESSIONS-2
40273 40337   BLOCK   EXPRESSIONS-3
40338 40393   BLOCK   EXPRESSIONS-4
40394 40480   BLOCK   EXPRESSIONS-5

Screen # 21
( DEFINE STILL FRAMES                        LP  14:47 09/25/85 )

35439 FREEZE.FRAME    ER.ARMPIT
36880 FREEZE.FRAME    GEN-APP

Screen # 22
( Variables                                      15:17 02/18/86 )

NUM.VAR   PROBLEM_CNT     NUM.VAR  ONSET_CNT
NUM.VAR   WIFE_CNT        NUM.VAR  WORK_CNT
NUM.VAR   PAIN_CNT        NUM.VAR  FAMILY_CNT
NUM.VAR   PREV-ILL_CNT    NUM.VAR  MEDS_CNT
NUM.VAR   COUGH_CNT       NUM.VAR  SMOKE_CNT
NUM.VAR   STOMCH_CNT      NUM.VAR  TIRED_CNT
NUM.VAR   CHILD_CNT       NUM.VAR  NUMB_CNT
NUM.VAR   ACTI_CNT        NUM.VAR  BOWEL_CNT
NUM.VAR   SALLY_CNT       NUM.VAR  DEPRESS_CNT
NUM.VAR   DRINKS_CNT      NUM.VAR  EATING_CNT
NUM.VAR   DIZZY_CNT       NUM.VAR  MR.HALL_CNT
NUM.VAR   ADMIT.PT_CNT    NUM.VAR  DX.WORKUP_CNT
NUM.VAR   MSG.PLAN_CNT    NUM.VAR  FINAL.DX_CNT

Screen # 23
( Continued                                      15:20 02/18/86 )

NUM.VAR   DIS.PLAN_CNT     NUM.VAR  ER.DIS_CNT
NUM.VAR   ER.OUTCOME_CNT   NUM.VAR  ABDOMEN_CNT
NUM.VAR   CHEST_CNT        NUM.VAR  ARMPIT_CNT
NUM.VAR   BACK_CNT         NUM.VAR  GEN.APP_CNT
NUM.VAR   LIVER_CNT        STR.VAR  QUERY$

Screen # 24
(                                                13:40 02/23/86 )

Screen # 25
( HOSPITAL STAY BLOCKS & FREEZE FRAMES           16:00 02/18/86 )
( ALL THIS REFERS TO 2ND SIDE OF DISK )
47254 FREEZE.FRAME    HS.GENERAL.APPEARANCE
50901 51043   BLOCK   HS.HEENT
51044 51137   BLOCK   HS.NECK
52211 FREEZE.FRAME    HS.EXTREMITIES
47259 FREEZE.FRAME    HS.SKIN
52011 52211   BLOCK   HS.HANDS
47257 FREEZE.FRAME    HS.ABDOMEN
51138 FREEZE.FRAME    HS.CHEST.AND.LUNGS
( ????? FREEZE.FRAME  HS.HEART )
51140 51290   BLOCK   HS.NEUROLOGICAL
51139 FREEZE.FRAME    HS.LYMPH.NODES
52010 FREEZE.FRAME    HS.BACK
( ????? FREEZE.FRAME  HS.GENITOURINARY )
47262 FREEZE.FRAME    HS.RECTAL.EXAM
```

```
Screen # 26
( HOSPITAL STAY BLOCKS & FREEZE.FRAMES         15:21 02/18/86 )
( SECOND SIDE OF DISK )
47263       FREEZE.FRAME  HS.PROTOSCOPY
52191 52209 BLOCK         HS.FINGER.TO.NOSE  ( NEEDS TO BE FIXED )
50901 51043 BLOCK         HS.SCLERA

DEFINE DO.FINISH
  VIDEO.OFF
  CLS
  QUIT
END.DEF

Screen # 0
( Frank Hall ... part 2                          13:31 02/23/86 )
( Last change:    Screen 0001                 LP 13:03 09/26/85 )

Screen # 1
(                                                16:16 02/18/86 )

2 48 THRU
USING FH4 1 LOAD

Screen # 2
( PROBE-X                                        16:16 02/18/86 )

DEFINE PROBE-X
  0 15 RANDOM    ( random no. between 0 & 15 )
  CASE.NUMERIC
  { 0  } 33418 33532 PLAY
  { 1  } 33533 33644 PLAY
  { 2  } 33056 33135 PLAY
  { 3  } 33910 34039 PLAY
  { 4  } 32333 32543 PLAY
  { 5  } 32543 32674 PLAY
  { 6  } 32700 32789 PLAY
  { 7  } 32790 32888 PLAY
  { 8  } 34105 34167 PLAY
  { 9  } 35104 35204 PLAY
  { 10 } 34704 34790 PLAY Screen # 3
( Continued                                      20:54 09/26/85 )

{ 11 } 34791 34912 PLAY
  { 12 } 34913 35127 PLAY
  { 13 } 32888 33009 PLAY
  { 14 } 33135 33247 PLAY
  { 15 } 33248 33417 PLAY
END.CASE
    WAIT.VIDEO

END.DEF

Screen # 4
(                                                16:50 02/18/86 )
```

```
Screen # 5
( EATING                                         16:48 02/18/86 )
DEFINE DO.EATING
BEGIN    EATING_CNT
                CASE.NUMERIC
                    { 0 } EATING
                    { 1 } EATING-A
                    { 2 } EATING-B
                    DEFAULT.CASE PROBE-X
                END.CASE   STORE *[ EATING_CNT + 1 ]* TO EATING_CNT
        INPUT TO QUERY$ QUERY$
        CASE.STRING
        { " ELSE" " MORE" }
        DEFAULT.CASE EXIT
        END.CASE
AGAIN END.DEF Screen # 6
(                                                15:51 02/24/86 )

DEFINE DEPRESS.MORE DEPRESS_CNT
        CASE.NUMERIC
        { 1 } 27983 AUTOSTOP
        { 2 } 28458 AUTOSTOP
        { 3 } 28502 AUTOSTOP
        DEFAULT.CASE PROBE-X
        END.CASE
END.DEF

Screen # 7
( DEPRESS                                        16:49 02/18/86 )
DEFINE DO.DEPRESS
        DEPRESS_CNT
            CASE.NUMERIC
                { 0 } DEPRESS
                { 1 } DEPRESS-A
                { 2 } DEPRESS-B  { 3 } DEPRESS-C
                DEFAULT.CASE PROBE-X
            END.CASE
            BEGIN   STORE *[ DEPRESS_CNT + 1 ]* TO DEPRESS_CNT
         INPUT TO QUERY$ QUERY$
        CASE.STRING
         { " ELSE" " MORE" }  DEPRESS.MORE
        DEFAULT.CASE EXIT
        END.CASE
        AGAIN END.DEF Screen # 8
(                                                15:51 02/24/86 )

Screen # 9
(                                                17:01 02/18/86 )
DEFINE DO.DRINKS
BEGIN    DRINKS_CNT
                CASE.NUMERIC
                    { 0 } DRINKS
                    { 1 } DRINKS-A
                    { 2 } DRINKS-B { 3 } DRINKS-C { 4 } DRINKS-D
                    DEFAULT.CASE PROBE-X
                END.CASE   STORE *[ DRINKS_CNT + 1 ]* TO DRINKS_CNT
         INPUT TO QUERY$ QUERY$
         CASE.STRING
```

```
        { " ELSE" " MORE" }
        DEFAULT.CASE EXIT
      END.CASE
AGAIN END.DEF

Screen # 10
(                                               17:39 02/18/86 )

Screen # 11
(                                               17:04 02/18/86 )
DEFINE DO.DIZZY
BEGIN   DIZZY_CNT
              CASE.NUMERIC
                { 0 } DIZZY
                { 1 } DIZZY-A
                DEFAULT.CASE PROBE-X
            END.CASE   STORE *[ DIZZY_CNT + 1 ]* TO DIZZY_CNT
        INPUT TO QUERY$ QUERY$
        CASE.STRING
        { " ELSE" " MORE" }
        DEFAULT.CASE EXIT
      END.CASE
AGAIN END.DEF Screen # 12
(                                               17:39 02/18/86 )

Screen # 13
( PROBLEM                                       17:04 02/18/86 )
DEFINE DO.PROBLEM
BEGIN   PROBLEM_CNT
              CASE.NUMERIC
                { 0 } WHAT-PROBLEM?
                { 1 } PROBLEM-A
                { 2 } PROBLEM-B
                DEFAULT.CASE PROBE-X
            END.CASE   STORE *[ PROBLEM_CNT + 1 ]* TO PROBLEM_CNT
        INPUT TO QUERY$ QUERY$
        CASE.STRING
        { " ELSE" " MORE" }
        DEFAULT.CASE EXIT
      END.CASE
AGAIN END.DEF Screen # 14
(                                               17:39 02/18/86 )

Screen # 15
( ONSET                                         17:16 02/18/86 )
DEFINE DO.ONSET
BEGIN   ONSET_CNT
              CASE.NUMERIC
                { 0 } ONSET?
                { 1 } ONSET-A
                { 2 } ONSET-B { 3 } ONSET-C
                DEFAULT.CASE PROBE-X
            END.CASE   STORE *[ ONSET_CNT + 1 ]* TO ONSET_CNT
        INPUT TO QUERY$ QUERY$
        CASE.STRING
        { " ELSE" " MORE" }
```

```
            DEFAULT.CASE EXIT
          END.CASE
AGAIN END.DEF

Screen # 16
(                                                          17:39 02/18/86 )

Screen # 17
( WIFE                                                     17:30 02/18/86 )
DEFINE DO.WIFE
BEGIN    WIFE_CNT
               CASE.NUMERIC
                 { 0 } WIFE
                 { 1 } WIFE-A
                 { 2 } WIFE-B { 3 } WIFE-C
                 DEFAULT.CASE PROBE-X
            END.CASE   STORE *[ WIFE_CNT + 1 ]* TO WIFE_CNT
          INPUT TO QUERY$ QUERY$
          CASE.STRING
            { " ELSE" " MORE" }
            DEFAULT.CASE EXIT
          END.CASE
AGAIN END.DEF Screen # 18
(                                                          17:39 02/18/86 )

Screen # 19
( WORK                                                     17:35 02/18/86 )
DEFINE DO.WORK
BEGIN    WORK_CNT
               CASE.NUMERIC
                 { 0 } WORK
                 { 1 } WORK-A
                 { 2 } WORK-B { 3 } WORK-C
                 DEFAULT.CASE PROBE-X
            END.CASE   STORE *[ WORK_CNT + 1 ]* TO WORK_CNT
          INPUT TO QUERY$ QUERY$
          CASE.STRING
            { " ELSE" " MORE" }
            DEFAULT.CASE EXIT
          END.CASE
AGAIN END.DEF Screen # 20
(                                                          17:39 02/18/86 )

Screen # 21
( PAIN                                                     17:35 02/18/86 )
DEFINE DO.PAIN
BEGIN    PAIN_CNT
               CASE.NUMERIC
                 { 0 } PAIN
                 { 1 } PAIN-A
                 { 2 } PAIN-B { 3 } PAIN-C
                 DEFAULT.CASE PROBE-X
            END.CASE   STORE *[ PAIN_CNT + 1 ]* TO PAIN_CNT
          INPUT TO QUERY$ QUERY$
          CASE.STRING
            { " ELSE" " MORE" }
```

```
            DEFAULT.CASE EXIT
          END.CASE
AGAIN END.DEF

Screen # 22
(                                                      17:39 02/18/86 )

Screen # 23
( FAMILY                                               17:38 02/18/86 )
DEFINE DO.FAMILY
BEGIN    FAMILY_CNT
                CASE.NUMERIC
                  { 0 } FAMILY
                  { 1 } FAMILY-A
                  { 2 } FAMILY-B   { 3 } FAMILY-C
                  DEFAULT.CASE PROBE-X
          END.CASE   STORE *[ FAMILY_CNT + 1 ]* TO FAMILY_CNT
          INPUT TO QUERY$ QUERY$
          CASE.STRING
           { " ELSE" " MORE" }
            DEFAULT.CASE EXIT
          END.CASE
AGAIN END.DEF Screen # 24
(                                                      17:42 02/18/86 )

Screen # 25
( PREVIOUS ILLNESS                                     17:38 02/18/86 )
DEFINE DO.PREV-ILLNESS
BEGIN    PREV-ILL_CNT
                CASE.NUMERIC
                  { 0 } PREV-ILL
                  { 1 } PREV-ILL-A
                  { 2 } PREV-ILL-B
                  DEFAULT.CASE PROBE-X
          END.CASE   STORE *[ PREV-ILL_CNT + 1 ]* TO PREV-ILL_CNT
           INPUT TO QUERY$ QUERY$
          CASE.STRING
           { " ELSE" " MORE" }
            DEFAULT.CASE EXIT
          END.CASE
AGAIN END.DEF Screen # 26
(                                                      17:42 02/18/86 )

Screen # 27
( MEDS                                                 17:43 02/18/86 )
DEFINE DO.MEDS
BEGIN    MEDS_CNT
                CASE.NUMERIC
                  { 0 } MEDS
                  { 1 } MEDS-A
                  { 2 } MEDS-B
                  DEFAULT.CASE PROBE-X
          END.CASE   STORE *[ MEDS_CNT + 1 ]* TO MEDS_CNT
           INPUT TO QUERY$ QUERY$
          CASE.STRING
           { " ELSE" " MORE" }
```

```
            DEFAULT.CASE EXIT
        END.CASE
AGAIN END.DEF

Screen # 28                                              17:44 02/18/86 )
(

Screen # 29                                              17:45 02/18/86 )
( COUGH
DEFINE DO.COUGH
BEGIN   COUGH_CNT
              CASE.NUMERIC
              { 0 } COUGH
              { 1 } COUGH-A
              { 2 } COUGH-B
              DEFAULT.CASE PROBE-X
        END.CASE   STORE *[ COUGH_CNT + 1 ]* TO COUGH_CNT
        INPUT TO QUERY$ QUERY$
        CASE.STRING
         { " ELSE" " MORE" }
          DEFAULT.CASE EXIT
         END.CASE
AGAIN END.DEF Screen # 30                                              13:49 02/22/86 )
( Screen # 31                                              17:45 02/18/86 )
( SMOKE
DEFINE DO.SMOKE
BEGIN   SMOKE_CNT
              CASE.NUMERIC
              { 0 } SMOKE
              { 1 } SMOKE-A
              { 2 } SMOKE-B
              DEFAULT.CASE PROBE-X
        END.CASE   STORE *[ SMOKE_CNT + 1 ]* TO SMOKE_CNT
        INPUT TO QUERY$ QUERY$
        CASE.STRING
         { " ELSE" " MORE" }
          DEFAULT.CASE EXIT
         END.CASE
AGAIN END.DEF Screen # 32                                              13:52 02/22/86 )
( Screen # 33                                              17:45 02/18/86 )
( STOMACH
DEFINE DO.STOMCH
BEGIN   STOMCH_CNT
              CASE.NUMERIC
              { 0 } STOMCH
              { 1 } STOMCH-A
              { 2 } STOMCH-B   { 3 } STOMCH-C  { 4 } STOMCH-D
              DEFAULT.CASE PROBE-X
        END.CASE   STORE *[ STOMCH_CNT + 1 ]* TO STOMCH_CNT
        INPUT TO QUERY$ QUERY$
        CASE.STRING
         { " ELSE" " MORE" }
          DEFAULT.CASE EXIT
         END.CASE
AGAIN END.DEF
```

```
Screen # 34                                      13:55 02/22/86 )
(

Screen # 35                                      13:55 02/22/86 )
( TIRED
DEFINE DO.TIRED
BEGIN    TIRED_CNT
                CASE.NUMERIC
                   { 0 } TIRED
                   { 1 } TIRED-A
                   { 2 } TIRED-B
                   DEFAULT.CASE PROBE-X
         END.CASE   STORE *[ TIRED_CNT + 1 ]* TO TIRED_CNT
         INPUT TO QUERY$ QUERY$
         CASE.STRING
           { " ELSE" " MORE" }
           DEFAULT.CASE EXIT
         END.CASE
AGAIN END.DEF Screen # 36                                      13:57 02/22/86 )
( Screen # 37                                      13:55 02/22/86 )
( CHILD
DEFINE DO.CHILD
BEGIN    CHILD_CNT
                CASE.NUMERIC
                   { 0 } CHILD
                   { 1 } CHILD-A
                   { 2 } CHILD-B   { 3 } CHILD-C
                   DEFAULT.CASE PROBE-X
         END.CASE   STORE *[ CHILD_CNT + 1 ]* TO CHILD_CNT
         INPUT TO QUERY$ QUERY$
         CASE.STRING
           { " ELSE" " MORE" }
           DEFAULT.CASE EXIT
         END.CASE
AGAIN END.DEF Screen # 38                                      13:58 02/22/86 )
( Screen # 39                                      13:59 02/22/86 )
( NUMB
DEFINE DO.NUMB
BEGIN    NUMB_CNT
                CASE.NUMERIC
                   { 0 } NUMB
                   { 1 } NUMB-A
                   { 2 } NUMB-B   { 3 } NUMB-C
                   DEFAULT.CASE PROBE-X
         END.CASE   STORE *[ NUMB_CNT + 1 ]* TO NUMB_CNT
         INPUT TO QUERY$ QUERY$
         CASE.STRING
           { " ELSE" " MORE" }
           DEFAULT.CASE EXIT
         END.CASE
AGAIN END.DEF
```

```
Screen # 40
( ACTI                                                      13:18 02/23/86 )
DEFINE DO.ACTI
BEGIN    ACTI_CNT
                 CASE.NUMERIC
                    { 0 } ACTI
                    { 1 } ACTI-A
                    DEFAULT.CASE PROBE-X
         END.CASE   STORE *[ ACTI_CNT + 1 ]* TO ACTI_CNT
         INPUT TO QUERY$ QUERY$
         CASE.STRING
          { " ELSE" " MORE" }
          DEFAULT.CASE EXIT
         END.CASE
AGAIN END.DEF Screen # 41
(                                                           13:20 02/23/86 )

Screen # 42
( BOWEL                                                     13:18 02/23/86 )
DEFINE DO.BOWEL
BEGIN    BOWEL_CNT
                 CASE.NUMERIC
                    { 0 } BOWEL
                    { 1 } BOWEL-A
                    { 2 } BOWEL-B
                    DEFAULT.CASE PROBE-X
         END.CASE   STORE *[ BOWEL_CNT + 1 ]* TO BOWEL_CNT
         INPUT TO QUERY$ QUERY$
         CASE.STRING
          { " ELSE" " MORE" }
          DEFAULT.CASE EXIT
         END.CASE
AGAIN END.DEF Screen # 43
(                                                           13:22 02/23/86 )

Screen # 44
( LIVER                                                     13:18 02/23/86 )
DEFINE DO.LIVER
BEGIN    LIVER_CNT
                 CASE.NUMERIC
                    { 0 } LIVER
                    { 1 } LIVER-A
                    DEFAULT.CASE PROBE-X
         END.CASE   STORE *[ LIVER_CNT + 1 ]* TO LIVER_CNT
         INPUT TO QUERY$ QUERY$
         CASE.STRING
          { " ELSE" " MORE" }
          DEFAULT.CASE EXIT
         END.CASE
AGAIN END.DEF Screen # 45
(                                                           13:23 02/23/86 )
```

Screen # 46     13:18 02/23/86 )
( SALLY
DEFINE DO.SALLY
BEGIN   SALLY_CNT
          CASE.NUMERIC
          { 0 } SALLY
          { 1 } SALLY-A
          DEFAULT.CASE PROBE-X
    END.CASE  STORE *[ SALLY_CNT + 1 ]* TO SALLY_CNT
    INPUT TO QUERY$ QUERY$
    CASE.STRING
     { " ELSE" " MORE" }
     DEFAULT.CASE EXIT
    END.CASE
AGAIN END.DEF Screen # 47     13:28 02/23/86 )
( Screen # 48     13:28 02/23/86 )
( MR.HALL
DEFINE DO.MR.HALL
BEGIN   MR.HALL_CNT
          CASE.NUMERIC
          { 0 } MR.HALL
          { 1 } MR.HALL-A
          DEFAULT.CASE PROBE-X
    END.CASE  STORE *[ MR.HALL_CNT + 1 ]* TO MR.HALL_CNT
    INPUT TO QUERY$ QUERY$
    CASE.STRING
     { " ELSE" " MORE" }
     DEFAULT.CASE EXIT
    END.CASE
AGAIN END.DEF Screen # 49

Screen # 50

Screen # 0     18:18 02/18/86 )
( Frank Hall ... part 2
( Last change:   Screen 0018     15:54 03/25/86 )

Screen # 1     13:33 02/23/86 )
( 2 25 THRU

THIS MODULE IMPLEMENTS THE PROBABILISTIC APPROACH IN THE
FRANK HALL MODEL

AS IMPLEMENTED IN THE IMSATT-2000 SYSTEM

```
Screen # 2
( Initialize                                      15:34 02/23/86 )
DEFINE INITIAL  STORE
0 TO  PROBLEM_CNT     0 TO  ONSET_CNT
0 TO  WIFE_CNT        0 TO  WORK_CNT
0 TO  PAIN_CNT        0 TO  FAMILY_CNT
0 TO  PREV-ILL_CNT    0 TO  MEDS_CNT
0 TO  COUGH_CNT       0 TO  SMOKE_CNT
0 TO  STOMCH_CNT      0 TO  TIRED_CNT
0 TO  CHILD_CNT       0 TO  NUMB_CNT
0 TO  ACTI_CNT        0 TO  BOWEL_CNT
0 TO  SALLY_CNT       0 TO  DEPRESS_CNT
0 TO  DRINKS_CNT      0 TO  EATING_CNT
0 TO  DIZZY_CNT       0 TO  MR.HALL_CNT
0 TO  ADMIT.PT_CNT    0 TO  DX.WORKUP_CNT
0 TO  MSG.PLAN_CNT    0 TO  FINAL.DX_CNT Screen # 3
( continued                                       15:35   23/86 )
0 TO  DIS.PLAN_CNT    0 TO     ER.DIS_CNT
0 TO  ER.OUTCOME_CNT  0 TO     ABDOMEN_CNT
0 TO  CHEST_CNT       0 TO     ARMPIT_CNT
0 TO  BACK_CNT        0 TO     GEN.APP_CNT
STORE "  " TO QUERY$
END.DEF
DEFINE DO.ER.OUTCOME INPUT TO QUERY$ END.DEF
DEFINE DO.ER.DIS  INPUT TO QUERY$ END.DEF
DEFINE DO.DIS.PLAN INPUT TO QUERY$ END.DEF
DEFINE DO.FINAL.DX INPUT TO QUERY$ END.DEF
DEFINE DO.MGT.PLAN INPUT TO QUERY$ END.DEF
DEFINE DO.DX.WORKUP INPUT TO QUERY$ END.DEF
DEFINE DO.DXTESTS INPUT TO QUERY$ END.DEF
STR.VAR OUTTCOM1 STR.VAR OUTCOME2 STR.VAR OUTCOME3 STR.VAR
OUTCOME4

Screen # 4
( ADMIT THE PATIENT                               15:16 02/24/86 )
DEFINE DO.ADMIT.PT
\    VOICE.KEYS DIFFNAT CLS
        TO.MED.RES
     STORE 1 TO XLOC    STORE 1 TO YLOC
        37122 SEARCH STILL
        PLAYBACK STATE CLS
        BEGIN   XLOC YLOC AT
            INPUT TO QUERY$ QUERY$
            CASE.STRING
                { " CANCER" }  PRINT " CANCER"
                { " ESOPHAGEAL VARICES" }
                    PRINT " ESOPHAGEAL VARICES"
                { " HEMORHAGIC GASTRITIS" }
                    PRINT  " HEMORHAGIC GASTRITIS"
                { " ULCER" }  PRINT " ULCER"

Screen # 5                                        15:23 02/24/86 )
(
                { " BLEEDING DUODENAL ULCER" }
                    PRINT " BLEEDING DUODENAL ULCER "
                { " MALLORY-WEISS SYNDROME " }
                    PRINT " MALLORY-WEISS SYNDROME "
                { " ALCOHOLISM " } PRINT " ALCOHOLISM "
```

```
                    { " CHRONIC DEPRESSION " }
                        PRINT " CHRONIC DEPRESSION "
                    { " THAT'S ALL"  " NO" } PLAYBACK OKAY
                        DO.DXTESTS EXIT
                END.CASE
                1 5 RANDOM
                CASE.NUMERIC
                    { 1 }   PLAYBACK MORE1
                    { 2 }   PLAYBACK MORE2
```

Screen # 6                                                15:28 02/24/86  )
(
```
                    { 3 }   PLAYBACK MORE3
                    { 4 }   PLAYBACK MORE4
                    { 5 }   PLAYBACK MORE5
                END.CASE
                STORE *[ YLOC + 2 ]* TO YLOC
                YLOC
                CASE.NUMERIC
                    { 23 }  STORE 21 TO XLOC
                            STORE 1 TO YLOC
                END.CASE
            AGAIN
    END.DEF
```

Screen # 7                                                15:54 03/25/86  )
(
( SET UP THE DATABASE FOR TRUTH TABLES )
DEFINE DATABASE
```
*[ ( DRINKS_CNT = 0 ) AND ( ABDOMEN_CNT = 0 )
              AND ( MARRIAGE_CNT = 0 ) ]*
IF.TRUE STORE " UL" TO OUTCOME1 " VL" TO OUTCOME2
    " LI" TO OUTCOME3   " ??" TO OUTCOME4 ELSE         ( 1 )
*[ ( DRINKS_CNT = 1 ) AND ( ABDOMEN_CNT = 0 )
              AND ( MARRIAGE_CNT = 0 ) ]*
TORE " UL" TO OUTCOME1  " LI" TO OUTCOME2              ( 2 )
" UL" TO OUTCOME3   " ??" TO OUTCOME4 ELSE
*[ ( DRINKS_CNT = 0 ) AND ( ABDOMEN_CNT = 1 )
              AND ( MARRIAGE_CNT = 0 ) ]*              ( 3 )
STORE " UL" TO OUTCOME1  " LI" TO OUTCOME2
" LI" TO OUTCOME3   " ??" TO OUTCOME4 ELSE
```

Screen # 8                                                15:46 02/24/86  )
(
```
*[ ( DRINKS_CNT = 1 ) AND ( ABDOMEN_CNT = 1 )
              AND ( MARRIAGE_CNT = 0 ) ]*              ( 4 )
STORE " LI" TO OUTCOME1  " LI" TO OUTCOME2
" LI" TO OUTCOME3   " ??" TO OUTCOME4 ELSE
*[ ( DRINKS_CNT = 0 ) AND ( ABDOMEN_CNT = 0 )
              AND ( MARRIAGE_CNT = 1 ) ]*              ( 5 )
STORE " LI" TO OUTCOME1  " UL" TO OUTCOME2
" VL" TO OUTCOME3   " ??" TO OUTCOME4 ELSE
*[ ( DRINKS_CNT = 1 ) AND ( ABDOMEN_CNT = 0 )
              AND ( MARRIAGE_CNT = 1 ) ]*
STORE " LI" TO OUTCOME1  " UL" TO OUTCOME2             ( 6 )
" LI" TO OUTCOME3   " ??" TO OUTCOME4 ELSE
*[ ( DRINKS_CNT = 0 ) AND ( ABDOMEN_CNT = 1 )
              AND ( MARRIAGE_CNT = 1 ) ]*
STORE " LI" TO OUTCOME1  " UL" TO OUTCOME2             ( 7 )
```

```
Screen # 9
(                                                        15:35 02/23/86 )
" VL" TO OUTCOME3    " ??" TO OUTCOME4 ELSE
*[ ( DRINKS_CNT = 1 ) AND ( ABDOMEN_CNT = 1 )
              AND ( MARRIAGE_CNT = 1 ) ]*
STORE " VL" TO OUTCOME1    " UL" TO OUTCOME2           ( 8 )
" UL" TO OUTCOME3    " ??" TO OUTCOME4
END.IF
END.DEF Screen # 10
(                                                        15:54 03/25/86 )
STR.VAR VAR$
NUM.VAR PROB
DEFINE GET.PROB
VAR$
CASE.STRING
        { " UL" } STORE 0 33 RANDOM TO PROB
        { " VL" } STORE 66 100 RANDOM TO PROB
        { " LI" } STORE 33 66 RANDOM TO PROB
END.CASE
END.DEF Screen # 11
(                                                        15:54 03/25/86 )

Screen # 12
( DO CUMULATIVE PROBABILITIES                            15:54 03/25/86 )
NUM.VAR P1 NUM.VAR P2 NUM.VAR P3 NUM.VAR P4
NUM.VAR P
DEFINE  DO.CUMULATIVE.PROB
DATABASE
STORE OUTCOME1 TO VAR$ GET.PROB STORE PROB TO P1
STORE OUTCOME2 TO VAR$ GET.PROB STORE PROB TO P2
STORE OUTCOME3 TO VAR$ GET.PROB STORE PROB TO P3
STORE OUTCOME4 TO VAR$ GET.PROB STORE PROB TO P4

*[ P = P1 + P2 + P3 + P4 ]*

STORE *[ 100 * P1 / P ]*   TO P1
STORE *[ ( 100 * P2 / P ) + P1 ]*  TO P2
STORE *[ ( 100 * P3 / P ) + P2 ]*  TO P3
STORE *[ ( 100 * P4 / P ) + P3 ]*  TO P4       END.DEF

Screen # 13
(                                                        15:46 02/24/86 )
NUM.VAR OP
DEFINE  OUTCOME.PROBABILITY  DO.CUMULATIVE.PROB
    STORE
    0 100 RANDOM
    TO OP
        *[ OP > P4 ]* IF.TRUE *[ ADMISSIONS.PROBABILITY = 4 ]*
        ELSE
        *[ OP > P3 ]* IF.TRUE *[ ADMISSIONS.PROBABILITY = 3 ]*
        ELSE
        *[ OP > P2 ]* IF.TRUE *[ ADMISSIONS.PROBABILITY = 2 ]*
        ELSE
        *[ OP > P1 ]* IF.TRUE *[ ADMISSIONS.PROBABILITY = 1 ]*
        END.IF
END.DEF   .

Screen # 14
(                                                        15:54 03/25/86 )
```

```
Screen # 15
( REFERRALS AND                                      15:47 02/24/86 )

DEFINE DO.REFERRAL

PLAYBACK REFER
DO.ADMIT
END.DEF

DEFINE DO.OUTPT
DO.OUTPT
END.DEF

Screen # 16
(                                                    15:54 03/25/86 )

Screen # 17
( ADMISSIONS PROBABILITY MODULE TYPE A               15:54 03/25/86 )

DEFINE DO.ADMIT.PROB
OUTCOME.PROBABILITY ( THIS ROUTINE GOES THROUGH THE PROBABILITY MODEL TO FIND
WHICH OF THREE POSSIBLE OUTCOMES WILL ENSUE )

ADMISSIONS.PROBABILITY
        CASE.NUMERIC
        { 1 } DO.ADMIT.PT
        { 2 } DO.REFERRAL
        { 3 } DO.OUTPT
        { 4 } ( DO.NOTHING )
        END.CASE
END.DEF

Screen # 18
(                                                    15:54 03/25/86 )

Screen # 19
( EXAMINE IN ER                                      22:33 09/26/85 )
DEFINE   DO.ER.EXAMINE VOICE.RETURN.ON
                      VOICE.KEYS PX
                                    CLS INPUT TO QUERY$
  BEGIN  QUERY$
         CASE.STRING
         { " GENERAL APPEARANCE" } ER.GENERAL.APPEARANCE
         { " VITAL SIGNS"        } ( ER.VITAL.SIGNS??? )
         { " EYES"               } ER.HEENT
         { " NECK"               } ER.NECK
         { " EXTREMITIES"        } ER.EXTREMITIES
         { " SKIN"               } ER.SKIN
         { " HANDS"              } ER.HANDS
         { " ABDOMEN"            } ER.ABDOMEN ( PUT A COUNTER )
         { " CHEST AND LUNGS"    } ER.CHEST.AND.LUNGS
         { " HEART"              } ER.HEART Screen # 20
( EXAMINE CONTINUED                                  15:41 02/23/86 )

{ " NEURO"              } ER.NEUROLOGICAL
         { " LYMPH NODES"        } ER.LYMPH.NODES
```

```
        { " MUSCULO"              }  ( ER.MUSCULO-SKELETAL?? )
        { " BACK"                 }  ER.BACK
        { " GENITO"               }  ER.GENITOURINARY
        { " RECTAL EXAM"          }  ER.RECTAL.EXAM
        { " PROCTOSCOPY"          }  ( ER.PROCTOSCOPY??? )
        { " FINGER-TO-NOSE"       }  ER.FINGER-TO-NOSE
        { " SCLERA"               }  ER.SCLERA
        DEFAULT.CASE VOICE.KEYS HX CLS EXIT
        END.CASE
        INPUT TO QUERY$
   AGAIN
END.DEF

Screen # 21                                                 18:16 02/18/86 )
(

DEFINE MAIN
        BEGIN
    QUERY$
    CASE.STRING
      { " WHAT PROBLEM"   }    DO.PROBLEM
      { " ONSET" }              DO.ONSET
      { " WIFE" }               DO.WIFE
      { " WORK" }               DO.WORK
      { " PAIN" }               DO.PAIN
      { " FAMILY" }             DO.FAMILY
      { " PREVIOUS ILLINESS" }  DO.PREV-ILLNESS
      { " MEDICATION" }         DO.MEDS
      { " COUGH" }              DO.COUGH
      { " SMOKING" }            DO.SMOKE

Screen # 22                                                 18:08 03/14/86 )
( Main..continued { " STOMACH" }      DO.STOMCH
        { " TIRED" }        DO.TIRED
        { " CHILDHOOD" }    DO.CHILD
        { " NUMBNESS" }     DO.NUMB
        { " ACTIVITIES" }   DO.ACTI
        { " BOWELS" }       DO.BOWEL
        { " LIVER" }        DO.LIVER
        { " SALLY" }        DO.SALLY
        { " DEPRESSION" }   DO.DEPRESS
        { " DRINKING" }     DO.DRINKS
        { " EATING" }       DO.EATING
        { " DIZZY" }        DO.DIZZY
        { " MR HALL" }      DO.MR.HALL Screen # 23                                                 18:08 03/14/86 )
( Main..continued { " ADMIT PT" }                DO.ADMIT.PROB    EXIT
        { " DX WORKUP" }               DO.DX.WORKUP
        { " MGT PLAN" }                DO.MGT.PLAN
        { " FINAL DX" }                DO.FINAL.DX
        { " DISCHARGE PLAN" }          DO.DIS.PLAN
        { " ER DISCHARGE" }            DO.ER.DIS
        { " ER OUTCOME" }              DO.ER.OUTCOME
        { " EXAMINE THE PATIENT" }           DO.ER.EXAMINE
        { " FINISH SIMULATION" }  DO.FINISH
            DEFAULT.CASE
    END.CASE
        AGAIN
    END.DEF
```

Screen # 24
(                                                          18:16 02/18/86 )

Screen # 25
(                                                          18:16 02/18/86 )

```
DEFINE FRANK
   INITIAL              ( Set all counters to zero)
   INIT.PLAYER   CLS   ECHO.OFF
   VIDEO.ON VOICE.KEYS HX   CLS
   AUDIO1.ON AUDIO2.OFF
   30 SEARCH
   INPUT TO QUERY$ QUERY$
       CASE.STRING
         { " BEGIN" } B-BEGIN
         { " START WORKUP" } START-WORK-UP
       END.CASE
     INPUT TO QUERY$
      MAIN
```

Screen # 26
(                                                          18:16 02/18/86 )

UNITED STATES PATENT APPLICATION

OF

WILLIAM G. HARLESS

FOR

INTERACTIVE AUDIOVISUAL METHOD AND APPARATUS

APPENDIX III

12/31/85

Creating a

TIME Probability-Based Decision Table

I.  Determining the variables for decision making

A.  For a given decision point (DP) in the case study, determine and name
        the outcome possibilities.  For example, rebleed, recover and revolve
        are the Outcome Possibilities at the final DP of Frank Hall.

B. Determine and assign descriptive labels to the influence factors (IF) for these outcome possibilities. For example, in Frank Hall the following independent IF's exist at the final DP:

```
An = Antacids
 C = Cimetidine
C+ = Cimetidine in Excess
AL = Alcohol Counseling
 N = Nutrition Counseling
 P = Psychiatric Counseling
Cr = Close Medical Followup
```

C. Assign a binary code to each <u>independent</u> IF for vector addressing: null = 1.

D. Determine and store the entire list of combinations of the IF's.

E. Compute the binary codes for the IF combinations.

F. Sort this list so that each <u>independent</u> IF is followed by it's respective set of IF combinations. Underline each <u>independent</u> IF label.

G. Print a form table with: a) rows comprised of the IF's (including combinations), ordered according to the sort described in item IV above; and b) columns comprised of the occurrence/outcome possibilities. For example:

| IF | Occurrence/Outcome Possibilities | | |
|---|---|---|---|
| | Rebleed | Recover | Revolve |
| <u>Null</u> | | | |
| <u>An</u> | | | |
| <u>An</u>,C | | | |
| An,C+ | | | |
| An,C,AL | | | |
| AL,N | | | |
| An,C+,AL | | | |

II. Obtaining the data

A. Obtain the expert opinion (consensus) of the likelihood of each possible outcome given the IF or IF combination. For any situation:

```
UL = unlikely
 L = likely
VL = very likely.
```

B. Enter the expert opinions by assigning a likelihood value (UL, L or VL) to each Outcome Possibility on each IF row. These stored likelihood values comprise the TIME decision table for the decision point in question. Each vector should be displayed on the screen to be filled in by the expert. The table will appear as follows:

| IF | Occurrence/Outcome Possibilities | | |
|---|---|---|---|
| | Rebleed | Recover | Revolve |
| Null | UL | L | VL |
| An | UL | L | VL |
| An,C | UL | VL | UL |
| An,C+ | UL | UL | VL |
| An,C,AL | UL | L | L |
| etc. | | | |

C. Print the table for review by the expert. Changes to any table value should be possible (and easy).

III. Making the decision

A. The probability value for a given outcome will be computed from the decision table at the time during the program when the decision point is encountered.

B. The computation is accomplished using the following method of converting likelihood values into probability ratios. For a given IF vector:

1. Generate a random number between 0 and .33 for each UL entry selected in the IF vector. That number becomes the probability estimate for that UL entry.

2. Generate a random number between .33 and .66 for each L entry selected in the IF vector. That number becomes the probability estimate for that L entry.

3. Generate a random number between .66 and .99 for each VL entry selected in the IF vector. That number becomes the probability estimate for that VL entry.

4. Determine the sum of these probability estimates, then compute the ratios so that P = 1. These ratios are the probability values for the various Outcome Possibilities for that IF condition.

5. Generate a random number between 0 and 1 to compare to the probability value in order to decide the path to be taken.

IV. User features

The program should be developed to display, under voice command, the UL's, L's and VL's for any IF at any time and the probability ratios for the last decision made ... also, to note when an "unlikely" outcome is chosen and when a "very likely" outcome is not chosen.

1/31/86

TIME PROJECT PROBABILITY ALGORITHMS

I. Introduction

The method I am proposing for developing and implementing the probability features of the TIME model is based on the notation developed for the N-way cross-classification (factorial) model in statistical experimental design. The level of a factor closely parallels the concept of the presence or absence of an attribute in a contingency table. The notation and concepts associated with this model will provide for the easy tabulation in the development stage of all influences on the final probabilities as well as be the basis for the associated computer algorithms.

The N-way cross-classification model assumes that there are N "factors," each at two or more "levels," to be considered. Levels will be defined in detail later. As an example, let N=3, for three factors: A, B, C.

Let A have two levels, $a_0$ and $a_1$; let B have three levels, $b_0$, $b_1$, and $b_2$; and let C have two levels, $c_0$ and $c_1$. A and C could represent diagnostic tests where $a_0$ means Test A was not ordered, $a_1$ means Test A was ordered, etc. The factor B could represent a drug that was not ordered ($b_0$), ordered correctly ($b_1$), or ordered when contraindicated ($b_2$). It is important to note that each level of a factor represents a separate event and that the levels in aggregate list all possible events.

The tabular lay-out of these three potential influences would be as follows. The body of the table would contain the information used to compute the probabilities.

|   |   | C |   |   |   |   |   |
|---|---|---|---|---|---|---|---|
|   | B | $c_0$ | | | $c_2$ | | |
|   |   | $b_0$ | $b_1$ | $b_2$ | $b_0$ | $b_1$ | $b_2$ |
| A | $a_0$ | | | | | | |
|   | $a_1$ | | | | | | |

This three-dimensional (hyper) matrix provides a "cell" for each possible occurrence of the three influences. Thus, if during the simulation Test A was ordered, Test C was not ordered, and Drug B was ordered correctly, then the $a_2 b_2 c_1$ cell would be flagged. The "influence" of this outcome would have been pre-determined and would be used to compute the relevant probability coefficient as described below. These influences will be in the form of the likelihood of the outcome given the influence.

II. Levels

A. The Null Level

At the start of the simulation it is assumed that each probability-based event has an assigned likelihood. If none of the potential influences are triggered then there will be no adjustment to these initial coefficients.

B. Dichotomous Levels

Some influences (factors) can have only two states, either they happen or they don't. This is the simplest case.

C. Repetition

It may be that a given factor has only two states (no, yes) but that the "yes" state can be involved more than once. As an example, a procedure might be ordered (and performed) twice, ...g given a second time, etc. In this case, if the repetition is important, multiple levels would be defined, one for each possible contingency. In order for a level to be "important" it must have a different influence on the target probability, either <u>directly</u> (compared to its other levels at the zero level of all other factors) or <u>interactively</u> (compared to its other levels across the different levels of the other factors).

D. Amount

If the influence of a factor depends on the "amount" that is involved, then that factor would be partitioned into discrete categories (levels) and an effect assigned to each level.

E. Temporality

Should the timing of an order for a drug or a procedure, or any other intervention, be important, then the appropriate levels must be defined. Thus, if factor A (no, yes) has a different effect depending on whether it precedes or follows factor B (no, yes), then the levels of A would be: $a_0 = 0$; $a_1 = $ <u>A before B</u>; and, $a_2 = $ <u>B before A</u>.

F. Omission/Commission

I have taken the point of view that the state of the patient, and hence the probabilities associated with the various outcomes, does not depend on the operator's knowledge about the patient but does depend on active intervention by the operator. That is, the <u>results</u> of a test or a procedure do not influence the probability coefficients but the procedure implicit in the test might. Also, the failure to intervene even when the data acquired indicate that the proper medical practice is to do so does not alter outcome probabilities. Thus, at every moment there is an operant set of probabilities that can be altered only by active intervention, or acts of commission.

III. <u>Degrees of Freedom</u>

A. The Complete Model

A useful way to keep track of the number of numerical influences which must be defined is to apply the statistical concept of "degrees of freedom." Let factor A have I levels $a_i$, $i = 0,1,2,\ldots,I-1$; let factor B have J levels $b_j$, $j=0,1,2,\ldots,J-1$, etc. Recalling that the effect of null level for all factors is defined initially, we must specify effects for I-1 levels of factor A, at the null level of all other factors, J-1 effects for levels for factor B at the null levels of all other factors, and so forth. Then we must define the effects for the (I-1) x (J-1) joint levels of A and B at the null levels of all other factors. Continuing, we would have to define the effects for each of the (I-1) x (J-1) x (K-1) joint levels of A, B and C at the null levels of the rest of the factors, and so on.

The complete model is shown below for factors A through H.

| Term | Degrees of Freedom |
|---|---|
| A | I-1 |
| B | J-1 |
| AB | (I-1) x (J-1) |
| C | K-1 |
| AC | (I-1) x (K-1) |
| BC | (J-1) x (K-1) |
| ABC | (I-1) x (J-1) x (K-1) |
| . | |
| . | |
| ABC...H | (I-1) x (J-1) x (K-1)x...x (N-1) |
| Total | I x J x K x ... x N - 1 |

Thus it is seen that the complete model would require knowledge of all of the I x J x K x...xN cells in the cross-classification of all of the factors.

B. Level Combinations

A useful way to list all of the levels and level combinations is shown below.

| Level Combination | # in List |
|---|---|
| Null | 1 |
| $a_1$ | 2 |
| $a_2$ | 3 |

| | |
|---|---|
| . | . |
| . | . |
| . | . |
| $a_{I-1}$ | $I$ |
| $b_1$ | $I+1$ |
| $a_1 b_1$ | $I+2$ |
| $a_2 b_1$ | $I+3$ |
| . | . |
| . | . |
| . | . |
| $a_{I-1} b_1$ | $2I$ |
| $b_2$ | $2I+1$ |
| $a_1 b_2$ | $2I+2$ |
| $a_2 b_2$ | $2I+3$ |
| . | . |
| . | . |
| . | . |
| $a_{I-1} b_2$ | $3I$ |
| . | . |
| . | . |
| $a_{I-1} b_{j-1}$ | $IJ$ |
| $c_1$ | $IJ+1$ |
| $a_1 c_1$ | $IJ+2$ |
| . | . |
| . | . |
| $a_{I-1} b_{j-1} c_1$ | $2IJ$ |
| . | . |
| . | . |
| $a_{I-1} b_{J-I} \cdots h_{N-1}$ | $IJK\ldots N$ |

In other words, the procedure is to start with the null (i.e., no action taken at all with respect to the influence factors), then list the levels of the first factor. Next list the first level of the second factor and then all of its combinations with levels of the first factor. Repeat for the second level of the second factor, then with the third level of the second factor, etc. Then list the first level of the third factor and then all of its combinations with all preceding levels and level combinations of the first and second factors. Continue in this fashion until all possible combinations are <u>systematically</u> exhausted. Note that the various levels within a factor do not combine. The list is numbered sequentially beginning with line 1 for the null and ending with line IxJxKx...xN.

If the line number for any entry is denoted by $[a_i b_j c_k \ldots g_m h_m]$, then $[a_i b_j c_k \ldots g_m h_m] = i + jI + kIJ + \ldots + NIJKM + 1$. $i=0,1,\ldots,I-1$; $j=0,1,\ldots,J-1$; $\ldots$; $n=0,1,\ldots,N-1$.

As an example, suppose that factor A has four levels, factor B has two levels, and factor C has three levels. The level combinations would then be as listed below with the position in the list given by:

$[a_i b_j c_k] = i + 4j + 8k + 1$, $i=0,1,2,3$; $j=0,1$; $k=0,1,2$.

| Level Combination | # in List |
|---|---|
| null ($a_0 b_0 c_0$) | 1 |
| $a_1$ ($a_1 b_0 c_0$) | 2 |
| $a_2$ | 3 |
| $a_3$ | 4 |
| $b_1$ | 5 |
| $a_1 b_1$ | 6 |
| $a_2 b_1$ | 7 |
| $a_3 b_1$ | 8 |
| $c_1$ | 9 |
| $a_1 c_1$ | 10 |
| $a_2 c_1$ | 11 |
| $a_3 c_1$ | 12 |
| $b_1 c_1$ | 13 |
| $a_1 b_1 c_1$ | 14 |
| $a_2 b_1 c_1$ | 15 |
| $a_3 b_1 c_1$ | 16 |
| $c_2$ | 17 |
| $a_1 c_2$ | 18 |
| $a_2 c_2$ | 19 |
| $a_3 c_2$ | 20 |
| $b_1 c_2$ | 21 |
| $a_1 b_1 c_2$ | 22 |
| $a_2 b_1 c_2$ | 23 |
| $a_3 b_1 c_2$ | 24 |

This list of the level combinations forms a logical ordering which can be presented to the medical consultants to get their assignment of the "influence" that each level combination has on the various outcomes. These influences will then be stored in vector form in <u>exactly the same sequence as listed</u> to be used to compute the final probabilities at the decision point. In this fashion, the influences can be stored as a vector (a 1-dimensional array) called the Influence Factor (IF) vector and easily addressed.

C. Address Codes and Factor Switches

There is an alternate mechanism for generating the position of any factor level combination in the array. This method utilizes the assignment of an "address code" to certain levels of the factors and then using combinations of these address codes to compute the address of the level combination in the array.

Using the factors A,B,C,...,H at levels I,J,K,...,N as before, construct the following table:

| Level | Address Code |
|---|---|
| $a_1$ | 1 |
| $a_2$ | 2 |
| . | . |
| . | . |
| $a_{I-1}$ | I-1 |
| $b_1$ | 1xI |
| $b_2$ | 2xI |
| . | |
| . | |
| $b_{j-1}$ | (J-1)xI |
| $c_1$ | 1xIxJ |
| $c_2$ | 2xIxJ |
| . | |
| . | |
| $c_{k-1}$ | (K-1)xIxJ |
| . | |
| . | |
| $h_{n-1}$ | (-1)IxJxK...xM |

Then the address for any non-null combination of levels is given by:

$$[a_i b_j c_k \ldots h_n] = [a_i] + [b_j] + ]c_k] + \ldots + [h_m] + 1$$

where the brackets indicate the address code for that particular level.

In the example given before with A at four levels, B at two levels, and C at three levels, the address codes are:

| Level | Address Code |
|-------|--------------|
| $a_1$ | 1 |
| $a_2$ | 2 |
| $a_3$ | 3 |
| $b_1$ | 4 |
| $c_1$ | 8 |
| $c_2$ | 16 |

The address for the combination $a_3 b_1 c_1$ is then:

$$[a_3 b_1 c_1] = [a_3] + [b_1] + [c_1] + 1$$
$$= 3 + 4 + 8 + 1$$
$$= 16$$

which can be verified from the listing of level combinations. The list of address codes will be referred to as the address (A) vector.

When a factor influences the probabilities associated with an occurrence or outcome, a mechanism must be available to keep track of whether that factor has been invoked during the simulation. This information for all factors relevant to the DP can then be used to select the appropriate probabilities to be used. The following flow diagram illustrates the process.

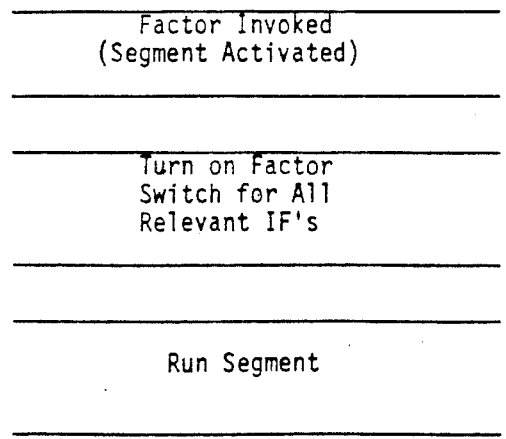

In this scheme each IF will have a switch vector (S) which will contain the switch configuration at any point in the simulation. For factors A,B,C,...,H at I,J,K,...,N levels respectively, the switch vector would have $(I-1)+(J-1)+(K-1)+...+(N-1)+1$ positions with the first entry in the vector <u>always</u> set at 1 (on) and the other entries set at 0 (off) at the start of the simulation.

Finally, it is seen that there are at least three vectors associated with each IF: 1) the vector(s) of influences, IF; 2) the vector of address codes, A; and 3) the switch vector, S. The address code vector is multiplied by the switch vector (in vector multiplication) to yield the address of the influence coefficient stored in the influence vector.

As an illustration, let Factor A have three levels and Factor B have two levels which can influence a DP. The level combinations for each IF and the address codes are:

| Level Combination | Address Code |
|---|---|
| Null | 1 |
| $a_1$ | 1 |
| $a_2$ | 2 |
| $a_3$ | 3 |
| $b_1$ | 4 |
| $b_2$ | 8 |

If during the simulation the fourth level of Factor A ($a_3$), and the third level of Factor B ($b_2$) had been invoked, then the switch vector configuration would be (1,0,0,1,0,1), and the address of the relevant contents of the IF vector would be:

$$(1,0,0,1,0,1) \begin{array}{c} 1 \\ 1 \\ 2 \\ 3 \\ 4 \\ 8 \end{array} = 12$$

D. Example

To illustrate this process, let the Decision Point (DP) be the post-hospitalization course for Frank Hall. This DP has three outcome possibilities: the patient goes on a "binge" shortly after leaving the hospital and bleeds to death from his ulcer (Rebleed); the patient gets his disease under control (Recover); or he becomes a "revolving door" patient, returning periodically to the emergency room and hospitalization (Revolve). When the simulation reaches this decision point, a random number is generated (as described below) to decide which outcome is displayed.

Suppose that it has been decided that there are six factors which can influence the post-hospitalization of Frank Hall. These are the prescription of antacids and cimetidine, arranging for nutritional, alcohol, and psychiatric counseling, and whether he suffered a life-threatening crisis during his hospital stay. With the exception of the prescription of cimetidine, the factors have two levels, either yes or no. For cimetidine there is the possibility of prescribing an excess dosage which could have deleterious consequences. Thus, cimetidine has three levels, not ordered, ordered correctly, ordered in excess. This leads to $2 \times 2 \times 2 \times 2 \times 2 \times 3 = 96$ level combinations to be assigned the appropriate influences. The request to medical consultants might take the format suggested in the following section. This would provide the data in the proper form for data entry and programming.

The assignment of probabilities might be requested from the medical consultants as follows:

In the simulation of Frank Hall there are three possible post-hospitalization courses he can take (describe the three outcomes here). The factors which might influence these outcomes are (describe the factors here). Please estimate from your experience the likelihood of each of these outcomes for Frank Hall given these factors and their combinations. The outcomes are to be judged to be "unlikely" (UL), "likely" (L), or "very likely" (VL).

| Factor | Acronym |
|---|---|
| Antacid | An |
| Cimetidine | C |
| Cimetidine in Excess | C+ (excess) |
| Alcohol Counseling | Al |

Nutritional Counseling      N
Psychiatric Counseling      P
Crisis While Hospitalized      Cr Occurrence/Outcome Possibilities

| Level Combinations | Address | If Vectors | | |
|---|---|---|---|---|
| | | Rebleed | Recover | Revolve |
| Null | 1 | UL | L | L |
| An | 2 | UL | L | L |
| C | 3 | UL | L | L |
| An,C | 4 | UL | L | L |
| C+ | 5 | UL | UL | VL |
| An,C+ | 6 | UL | UL | VL |
| Al | 7 | UL | L | UL |
| An,Al | 8 | UL | VL | UL |
| C,Al | 9 | UL | VL | UL |
| An,C,Al | 10 | UL | VL | UL |
| C+,Al | 11 | UL | L | L |
| An,C+,Al | 12 | UL | L | L |
| . | . | . | . | . |
| . | . | . | . | . |
| . | . | . | . | . |

In the actual presentation to the medical consultants it is clear that the more factors there are, the more complicated the presentation of the task. Clearly, for more than three factors, this process will be tedious and specific for each outcome.

The address code vector for these IF vectors is:

$$A^1 = (1,1,2,4,6,12,24,48)$$

and the initial switch vector is:

$$S^1 = (1,0,0,0,0,0,0,0).$$

As an example, suppose that antacids (An) and Cimetidine (C) had been prescribed and alcohol counseling (Al) ordered. The switch configuration would be:

$$S^1 = (1,1,1,0,1,0,0,0)$$

and:     $S^1 A = 1+1+2+6 = 10$ which is seen to be the correct line in the occurrence/outcome table.

Note that restarting or branching back in the simulation will require the proper re-initialization of the factor switches and the factor switch registers. Also, a storing of the factor switch configuration every time a factor switch is turned on would give the path taken to the final configuration.

IV. Selection of the DP Outcome

The probability values for a given outcome will be computed at the time during the program when the DP is encountered. The switch vector S and the address code vector A will be used to compute the proper address to retrieve the influence value from each IF. If the influence value corresponds to a UL, select a random number between 0 and .33; for an L select a random number between .33 and .66; for VL select a random number between .66 and 1.00. This is to be done for each IF vector associated with the DP.

Suppose there are k IF vectors for a DP. Then corresponding to each IF there will be a random number, $p_i^1$, i=1,2,...,k, based on the likelihood for the selected position in the IF. These are to be normalized into the final probabilities for choosing the outcome for the DP.

Let $P_i = p_i^1/(p_1^1+p_i^1+...+p_k^1)$. Then $P_i$ is the probability of the ith outcome of the DP.

Let the final probabilities of Rebleed, Recover and Revolve (the three possible outcomes of the post-hospitalization DP for Frank Hall) be $p_1$, $p_2$, and $p_3$ respectively. From the system random number generator, draw a uniform random number between 0 and 1. Call this number RN. If RN_$p_1$, then select the Rebleed segment. If $p_1$_RN_$p_1$+$p_2$, select the Recover segment. Otherwise, select the Revolve segment.

In the example above, if antacids and the proper dose of cimetidine were ordered, and alcohol counseling was arranged (this corresponds to the acronym An,C,Al in the influence table), then we would have the likelihood of a rebleed be UL, the likelihood of recovering be VL, and the likelihood of becoming a revolving door patient be UL. These likelihood values would be stored in the 10th position of the influence vectors and would be used by the system to select a random number within each of these ranges and compute the probabilities from these numbers. The following probabilities might result: $p_1$=0.10, $p_2$=0.75, and $p_3$=0.15. Then if the random number selected was 0.87, the "Revolve" segment would be selected.

V. Programming Considerations

For each DP with k_2 outcomes, there will need to be stored k influence vectors. Each influence vector has a null entry in position 1 and additional entries for each factor level combination for the factors which influence that DP. The entries in each influence vector are addressed according to the scheme described above.

Every factor which influences a DP has a corresponding "switch" which is turned on when that factor is invoked during the case study. The switch vector is organized consonant with the address vector and is used to compute the address of the relevant entries in the influence vector. Thus, subroutines are needed to initialize the switch vectors, to set the switches properly during the simulation, to compute the proper address when a DP is reached, and to fetch the probabilities for the random selection algorithm. Also, re-initialization routines for the proper switches will be necessary if there is "branch-back" possible for pedagogical reasons.

Finally, the random selection process must be translated into an address for the segment which is to be displayed.

I claim:

1. An interactive audiovisual system, comprising:
   means for storing a plurality of prerecorded audio and video scene signals representative of dramatic scenes;
   means for designating specific ones of said scene signals as type one, type two, type three, or type four scene signals respectively representing scenes for which relevant thoughts exist, scenes for which no relevant thoughts exists, scenes depicting relevant thoughts, and scenes depicting non-relevant thoughts, for associating each of type three scene signals with one of said type one scene signals, and for associating each of said type four scene signals with all of said type two scene signals;
   voice recognition means for receiving a voice signal and for generating interrupt signals representative of the meaning of words contained in said voice signals;
   audiovisual output means for providing audible and visual outputs representative of said scene signals;
   logic means for selectively presenting specific ones of said scene signals to said audiovisual output means in response to interrupt signals, for responding to said interrupt signals during presentation of said type one scene signals to alter presentation of the type one scene signal being presented, initiate presentation of one of said associated type three scene signals, and resume presentation of the type one scene signal being presented, and for responding to said interrupt signals during presentation of said type two scene signals to alter presentation of the type two scene signal being presented, initiate presentation of one of said type four scene signals, and resume presentation of the type two scene signal being presented.

2. A system as recited in claim 1, wherein said means for storing prerecorded audio and video scene signals comprises a read-only device and said logic means comprises a programmable computer.

3. A system as recited in claim 2 wherein said read-only device comprises a programmable videodisc player.

4. A system as recited in claim 3 comprising a read-write memory device for storing said type three and type four scene signals including audio components of dramatic scenes, and wherein said logic means is responsive to said interrupt signals to simultaneously supply to said audiovisual output means said audio components of said type three and type four scene signals from said read-write memory device and video components of said type one and type two scene signals from said videodisc player.

5. A system as recited in claim 4 wherein said type three and type four scene signals stored in said read-write memory device comprise digital signals representative of human speech and said logic means comprises means for generating electrical signals convertable by said audiovisual output means to human speech.

6. An interactive audiovisual system, comprising:
   voice recognition means for receiving voice input signals and for generating interrupt signals representative of the meaning of words contained in said voice input signals;

means for storing a plurality of prerecorded audio and video scene signals representative of dramatic scenes;

means for designating a plurality of said dramatic scenes as a scene group, for designating specified ones of said interrupt signals as an interrupt signal group, and for associating scenes of said scene group with interrupt signals of said interrupt signal group;

audiovisual output means for providing audible and visual outputs representative of said scene signals; and logic means for selectively presenting specific ones of said scene signals to said audiovisual output means in response to said interrupt signals, for supplying only one of said scenes of said scene group to said audiovisual output means upon occurrence of one of said interrupt signals of said interrupt signal group, for recording which of said dramatic scenes have been supplied to said audiovisual output means, and for ensuring that repetitive generation of any of said interrupt signals of said interrupt signal group will result in no more than a single display of a scene of said scene group.

7. An interactive computer system, comprising:

means for receiving input signal and for generating interrupt signals representative of said input signals;

means for storing a plurality of prerecorded output signals and for storing a subset of said output signals as decision point outcome signals;

means for storing a plurality of addresses each associated with one of said output signals and for storing a subset of said addresses as decision point addresses each associated with a predetermined plurality of said decision point outcome signals;

audiovisual output means for displaying said prerecorded output signals; and logic means for selectively presenting specific ones of said stored output signals to said audiovisual output means in response to said input signals, said logic means comprising decision point means for selecting a specified one of said decision point outcome signals based on predetermined probability factors, whereby the sequence of said output signals presented to said audiovisual output means varies in accordance with said predetermined probability factors.

8. A system as recited in claim 7 wherein said logic means further comprises means for interpreting specified ones of said input signals as influence factors and for altering said predetermined probability factors according to said influence factors.

9. A system as recited in claim 8, wherein said means for interpreting specified ones of said input signals as influence factors and for altering said predetermined probability factors comprises means for storing a plurality of probability ranges each associated with a specified combination of said influence factors, means for storing a record of the occurrence of said influence factors contained in said specified combinations, and means for replacing said predetermined probability factors with revised discrete probability values calculated from said stored record of the occurrence of said input signals contained in said specified combinations and from said probability ranges.

10. A system as recited in claim 9, wherein said means for replacing said probability ranges comprises:

means for associating random discrete probability component values to each of said probability ranges, said random discrete probability component values each being within the associated probability range; and means for calculating said probability values for each of said combinations of influence factors according to said random discrete probability component values.

11. A system as recited in claim 9 wherein said logic means comprises means for supplying said probability values to said audiovisual output means in response to a specified interrupt signal.

12. A method for providing an interactive drama, comprising the steps of:

storing a plurality of prerecorded scene signals representative of dramatic scenes;

designating specific ones of said scene signals as type one, type two, type three, or type four scene signals respectively representing scenes for which relevant thoughts exist, scenes for which no relevant thoughts exist, scenes depicting relevant thoughts, and scenes depicting nonrelevant thoughts;

receiving voice input signals and generating interrupt signals representative of the meaning of words in said voice input signals;

associating said type three scene signals with specific ones of said type one scene signals;

selectively displaying specific ones of said stored dramatic scenes in response to said interrupt signals;

responding to selected ones of said interrupt signals during presentation of said type one scene signals to alter presentation of said type one scene signal being presented, initiate presentation of one of said associated type three scene signals, and resume presentation of said type one scene signal originally presented; and responding to said selected ones of said interrupt signals during presentation of said type two scene signals to alter presentation of said type two scene signal being presented, initiate presentation of one of said associated type four scene signals, and resume presentation of said type two scene signal originally presented.

13. A method as recited in claim 12, wherein said step of storing scene signals comprises the substep of storing audio and visual components of said dramatic scenes on a read-only device.

14. A method as recited in claim 13 wherein said step of storing scene signals comprises the substep of storing audio and visual components of said dramatic scenes on a read-only videodisc.

15. A method as recited in claim 14 wherein said step of storing scene signals comprises the substep of storing said type three and type four scene signals as digital signals representative of human speech.

16. A method as recited in claim 15 wherein said step of designating said scene signals comprises the additional step of designating a subset of said scene signals as type five scene signals and wherein the step of storing scene signals comprises the substep of storing a plurality of attribute signals which associate specified ones of said interrupt signals with a plurality of said type five scene signals, and wherein said step of displaying dramatic scenes in response to interrupt signals comprises the substeps of responding to said specified ones of said interrupt signals by displaying only one of said associated type five dramatic scenes, recording which of said associated type five dramatic scenes have been displayed, and responding to said specific ones of said interrupt signals by displaying one of said associated type five scene signals which has not been previously displayed, whereby none of said associated type five dramatic scenes are displayed more than once.

17. A method as recited in claim 16 wherein the step of storing said scene signals comprises the substep of contiguously storing type five scene signals associated with a specified one of said interrupt signals, whereby said associated type five scenes can be displayed in sequence without initiating a search.

18. A method as recited in claim 17 comprising the additional step of storing type six scene signals representative of type six dramatic scenes and responding to one of said specified interrupt signals after display of all of the type five scenes associated with said one of said specified interrupt signals by displaying one of said type six dramatic scenes.

19. A method for providing interactive output of prerecorded output signals, comprising the steps of:
receiving input signals and generating interrupt signals representative of said input signals;
storing a plurality of prerecorded output signals, storing a first subset of said output signals as decision point signals, and storing a second subset of said output signals as decision point outcome signals, each of said decision point signals having associated therewith a plurality of decision point outcome signals;
selectively outputting specific ones of said stored output signals in response to said input signals;
selectively outputting, after output of one of said decision point signals, one of said decision point outcome signals associated with said one of said decision point signals, the choice of outputted decision point outcome signal being based on predetermined probability factors, whereby the sequence of said output signals being outputted varies in accordance with said predetermined probability factors.

20. A method as recited in claim 19 wherein said step of selectively outputting output signals comprises the substeps of interpreting specified ones of said input signals as influence factors and altering said predetermined probability factors according to said influence factors.

21. A method as recited in claim 20, wherein said substeps of interpreting specified ones of said input signals as influence factors and altering said predetermined probability factors comprise additional substeps of storing a plurality of probability ranges each associated with a specified combination of said influence factors, storing a record of the occurrence of said influence factors contained in said specified combinations, and replacing said predetermined probability factors with revised discrete probability values calculated from said stored record of the occurrence of said input signals contained in said specified combinations and from said probability ranges.

22. A method as recited in claim 21 wherein said step of replacing probability ranges comprises the substeps of:
associating random discrete probability component values with each of said probability ranges, said random discrete probability component values being within the associated probability range; and
calculating said probability values for each of said combinations of influence factors according to said random discrete probability component values.

23. A system as recited in claim 21 comprising the additional step of outputting said probability values in response to a specified interrupt signal.

24. An interactive audiovisual system, comprising:
means for storing a plurality of prerecorded audio and video scene signals representative of a speaking human being, said scene signals including decision point scene signals and non-decision point scene signals;
voice recognition means for storing a plurality of voice signals representative of the meaning of specified words, for receiving input voice signals, and for selectively generating interrupt signals representative of the meaning of words in said received input voice signals; and
means for selectively outputting specific ones of said scene signals in response to said interrupt signals to provide an audiovisual representation of a human being speaking a meaningful response to said received input voice signals, said voice recognition means being responsive to said received input voice signals and said outputting means being responsive to said interrupt signals during output of said non-decision point signals;
wherein said storing means comprises means for storing cueless scene signals devoid of indicators specifying voice input signals, and wherein said outputting means is responsive to said interrupt signals during output of said cueless scene signals;
wherein said outputting means comprises means for selectively outputting specific ones of said scene signals independent of scene signals previously outputted.

25. An interactive audiovisual system, comprising:
means for storing a plurality of prerecorded audio and video scene signals representative of a speaking human being, said scene signals including cueless scene signals devoid of indicators specifying voice input signals;
means for receiving voice input signals and for generating interrupt signals representative of the meaning of words in said voice input signals; and
means for selectively outputting specific ones of said scene signals in response to said interrupt signals to provide an audiovisual representation of a human being speaking a meaningful response to said received voice input signals, said outputting means being responsive to said interrupt signals during output of said cueless scene signals;
wherein said outputting means comprises means for selectively outputting specific ones of said scene signals independent of scene signals previously outputted.

26. An interactive audiovisual system, comprising:
means for storing a plurality of prerecorded audio and video scene signals representative of a speaking human being;
means for storing a plurality of voice signals representative of the meaning of specified words, for receiving voice input signals and for selectively generating interrupt signals representative of the meaning of words in said stored voice signals; and
means for selectively outputting specific ones of said scene signals, independent of scene signals previously outputted, in response to said interrupt signals to provide an audiovisual representation of a human being speaking a meaningful response to said received voice input signals.

27. A method for providing an interactive drama, comprising the steps of:
    storing a plurality of prerecorded audio and video scene signals representative of a speaking human being, said scene signals including decision point scene signals and to non-decision point scene signals;
    receiving voice signals and generating interrupt signals representative of the meaning of words in said voice signals; and
    selectively outputting specific ones of said scene signals in response to said interrupt signals to provide an audiovisual representation of a human being speaking a meaningful response to said received voice signals;
    said receiving and generating step including the substeps of receiving voice signals and generating interrupt signals during output of said non-decision point scene signals;
    wherein said storing step includes the substep of storing cueless scene signals devoid of indicators specifying voice input signals, and said receiving and generating step includes the substep of receiving voice input signals and generating interrupt signals during output of said cueless scene signals; and
    wherein said outputting step includes the substep of selectively outputting specific ones of said scene signals independently of previously outputted scene signals.

28. A method for providing an interactive drama, comprising the steps of:
    storing a plurality of prerecorded audio and video scene signals representative of a speaking human being including cueless scene signals devoid of indicators specifying voice input signals;
    receiving voice signals and generating interrupt signals representative of the meaning of words and said voice signals; and
    selectively outputting specific ones of said scene signals and response to said interrupt signals to provide an audiovisual representation of a human being speaking a meaningful response to said received voice signals;
    said receiving and generating step including the substep of receiving voice signals and generating interrupt signals during the output of said cueless scene signals; and
    wherein said outputting step includes the substep of selectively outputting specific ones of said scene signals independently of previously outputted scene signals.

29. A method for providing an interactive drama, comprising the steps of:
    storing a plurality of prerecorded audio and video scene signals representative of a speaking human being;
    storing a plurality of voice signals representative of the meaning of specified words;
    receiving voice signals and selectively generating interrupt signals representative of the meaning of words in said stored voice signals; and
    selectively outputting specific ones of said scene signals independently of previously outputted scene signals in response to said interrupt signals to provide an audiovisual representation of a human being speaking a meaningful response to said received voice signals.

* * * * *